United States Patent
Kobayashi et al.

(10) Patent No.: US 10,082,702 B2
(45) Date of Patent: Sep. 25, 2018

(54) LIQUID-CRYSTAL DISPLAY APPARATUS AND METHOD OF GIVING A PRETILT TO LIQUID-CRYSTAL MOLECULES

(71) Applicant: SONY CORPORATION, Tokyo (JP)

(72) Inventors: Chikashi Kobayashi, Kanagawa (JP); Shunichi Suwa, Kanagawa (JP); Masashi Miyakawa, Tokyo (JP); Yoji Nagase, Kanagawa (JP); Sumito Shiina, Kanagawa (JP); Seiji Shibahara, Chiba (JP); Hiroki Takahashi, Kanagawa (JP); Hiromasa Mitani, Kanagawa (JP); Kunihiko Nagamine, Kanagawa (JP); Koji Hidaka, Tokyo (JP); Masahiko Mizuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/512,108

(22) PCT Filed: Aug. 7, 2015

(86) PCT No.: PCT/JP2015/072457
§ 371 (c)(1),
(2) Date: Mar. 17, 2017

(87) PCT Pub. No.: WO2016/047290
PCT Pub. Date: Mar. 31, 2016

(65) Prior Publication Data
US 2017/0285410 A1     Oct. 5, 2017

(30) Foreign Application Priority Data
Sep. 26, 2014  (JP) .................... 2014-196546

(51) Int. Cl.
G02F 1/1337    (2006.01)
G02F 1/1362    (2006.01)
G02F 1/1343    (2006.01)

(52) U.S. Cl.
CPC .. G02F 1/133707 (2013.01); G02F 1/134336 (2013.01); G02F 1/136286 (2013.01); *G02F 2001/133742* (2013.01)

(58) Field of Classification Search
CPC ........ G02F 1/133707; G02F 1/136286; G02F 1/134309; G02F 1/134336; G02F 1/134327; G02F 1/133753; G02F 2001/133776
See application file for complete search history.

(56) References Cited

U.S. PATENT DOCUMENTS

2009/0147162 A1* 6/2009 Yeom ................ G02F 1/133707
                                                                 349/33
2011/0260957 A1* 10/2011 Jeong ................ G02F 1/133707
                                                                 345/98

(Continued)

FOREIGN PATENT DOCUMENTS

CN      103809334 A      5/2014
JP      2003-270653 A    9/2003

(Continued)

OTHER PUBLICATIONS

International Search Report and Written Opinion of PCT Application No. PCT/JP2015/072457, dated Oct. 27, 2015, 06 pages of English Translation and 07 pages of ISRWO.

(Continued)

*Primary Examiner* — Jia Pan
(74) *Attorney, Agent, or Firm* — Chip Law Group

(57) ABSTRACT

A liquid-crystal display apparatus includes a plurality of rectangular pixels. Each pixel includes a first electrode and a second electrode. A slit region and a concave and convex (Continued)

portion are formed in the first electrode. It further includes a control circuit. The plurality of pixels are constituted of a first pixel group and a second pixel group. First data lines and for applying a voltage on the first electrode are provided closer to the first substrate than the first electrode. In each pixel that constitutes the first pixel group, a second data line extension extending from a second data line is provided adjacent to a first data line. In each pixel that constitutes the second pixel group, a first data line extension extending from the first data line is provided adjacent to the second data line.

6 Claims, 49 Drawing Sheets

(56) References Cited

U.S. PATENT DOCUMENTS

2013/0242239 A1* 9/2013 Chang ............... G02F 1/133707
349/106
2014/0111753 A1* 4/2014 Kobayashi ........ G02F 1/133753
349/123
2014/0125896 A1* 5/2014 Suwa ................ G02F 1/133753
349/33
2015/0002798 A1* 1/2015 Miyakawa ........ G02F 1/133707
349/123
2015/0131040 A1* 5/2015 Suwa ................ G02F 1/133707
349/106

FOREIGN PATENT DOCUMENTS

JP          2014-95783 A      5/2014
KR    10-2014-0059714 A      5/2014

OTHER PUBLICATIONS

International Preliminary Report on Patentability of PCT Application No. PCT/JP2015/072457, dated Apr. 6, 2017, 08 pages of English Translation and 04 pages of IPRP.

* cited by examiner

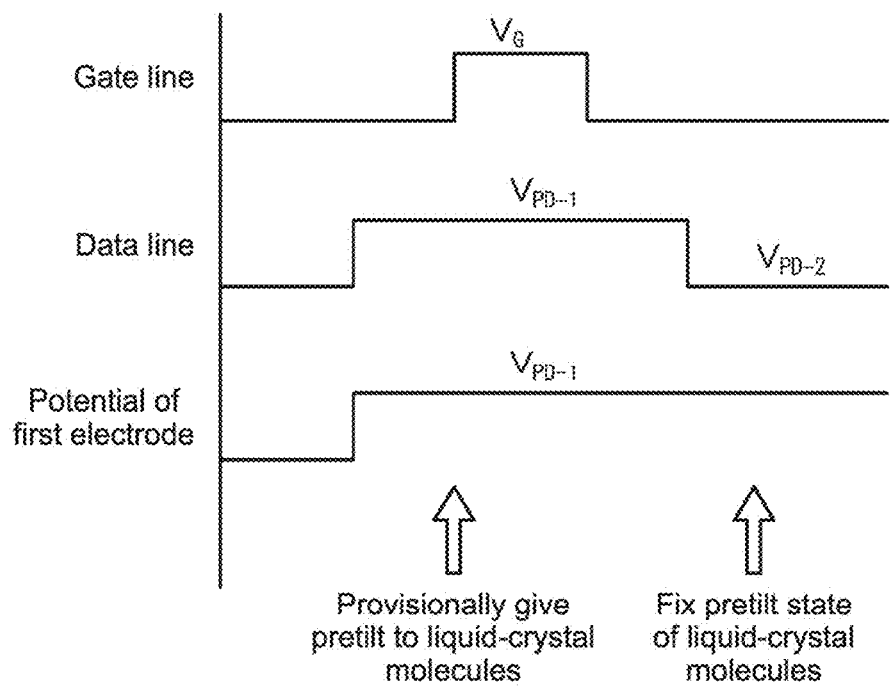
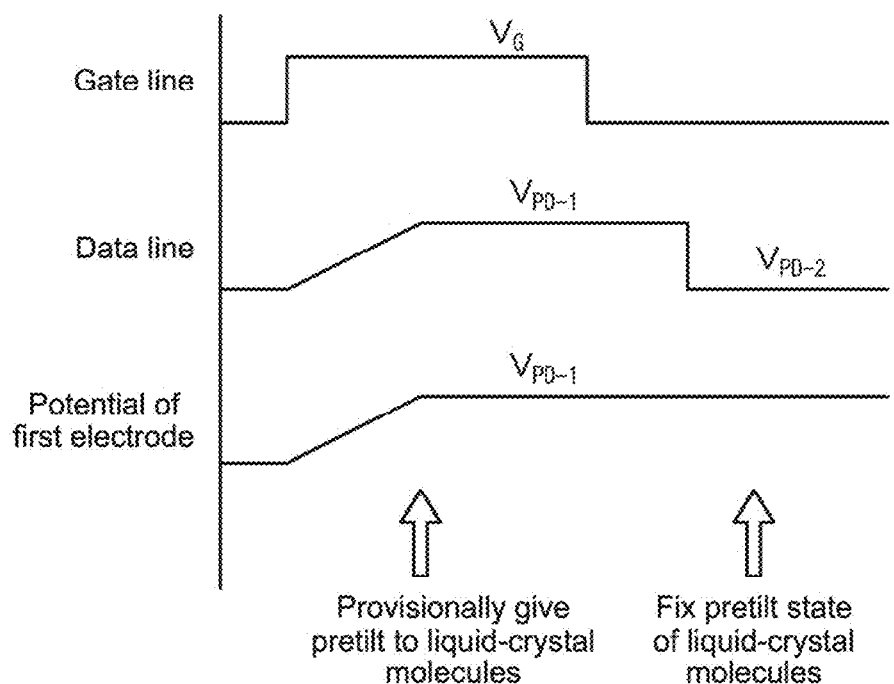

LIQUID-CRYSTAL DISPLAY APPARATUS AND METHOD OF GIVING A PRETILT TO LIQUID-CRYSTAL MOLECULES

CROSS REFERENCE TO RELATED APPLICATIONS

This application is a U.S. National Phase of International Patent Application No. PCT/JP2015/072457 filed on Aug. 7, 2015, which claims priority benefit of Japanese Patent Application No. JP 2014-196546 filed in the Japan Patent Office on Sep. 26, 2014. Each of the above-referenced applications is hereby incorporated herein by reference in its entirety.

TECHNICAL FIELD

The present disclosure relates to a liquid-crystal display apparatus including a liquid-crystal display device whose liquid-crystal layer is sealed between a pair of substrates including alignment films on opposed surfaces, and to a method of giving a pretilt to liquid-crystal molecules.

BACKGROUND ART

In recent years, a liquid-crystal display (LCD) has been widely used as a display monitor of a liquid-crystal television receiver, a notebook personal computer, a car navigation apparatus, or the like. This liquid-crystal display is classified into various display modes (types) in accordance with molecular array (alignment) of liquid-crystal molecules included in a liquid-crystal layer sandwiched between substrates. For example, a TN (Twisted Nematic) mode on which liquid-crystal molecules are aligned to be twisted in a state in which a voltage is not applied is well known as one of the display modes. On the TN mode, the liquid-crystal molecules have a positive dielectric anisotropy, that is, a characteristic that a dielectric constant of the liquid-crystal molecules in a long-axis direction is higher than that in the short-axis direction. Therefore, the liquid-crystal molecules have a structure in which an alignment direction of the liquid-crystal molecules is sequentially rotated in a plane parallel to a substrate surface to be aligned perpendicularly to the substrate surface.

On the other hand, a VA (Vertical Alignment) mode on which the liquid-crystal molecules are aligned perpendicularly to the substrate surface in a state in which a voltage is not applied has attracted attention. On the VA mode, the liquid-crystal molecules have a negative dielectric anisotropy, that is, a characteristic that the dielectric constant of the liquid-crystal molecules in the long-axis direction is lower than in the short-axis direction. Thus, a wider viewing angle can be provided as compared with the TN mode. The liquid-crystal display on the VA mode has a configuration in which, when a voltage is applied, the liquid-crystal molecules aligned perpendicularly to the substrate react to fall down in parallel with the substrate due to the negative dielectric anisotropy, to thereby cause light to transmit therethrough. However, the liquid-crystal molecules aligned perpendicularly to the substrate fall down in random directions, and hence the alignment of the liquid-crystal molecules is disturbed by voltage application, which causes deterioration of a response characteristic to a voltage.

In view of this, various methods for regulating the alignment of the liquid-crystal molecules during voltage application have been proposed. For example, an MVA (Multi-domain Vertical Alignment) method, a PVA (Patterned Vertical Alignment) method, or a technique using an optical alignment film has been proposed. In the MVA method, alignment control is performed by using a slit or rib (protrusion) while providing a high viewing angle. Other than this, a structure (also called fine-slit structure) has been recently proposed. In this structure, a plurality of fine slits are provided in an electrode (specifically, pixel electrode) formed on one substrate, and an electrode (specifically, opposed electrode) formed on the other substrate is set to be a so-called solid electrode without slits. However, there is a problem in that light transmittance is lowered in the fine-slit structure. It is because a slit formed of minute line and space has a portion on which the electric field is not applied, and, in addition, the alignment state of the liquid-crystal molecules takes a twist structure in the vicinity of edges of the line during voltage application.

Japanese Patent Application Laid-open No. 2014-095783 has disclosed a technology for solving such a problem, that is, a technology of forming a plurality of fine slits and a plurality of concave and convex portions in a pixel electrode (hereinafter, referred to as "first electrode").

CITATION LIST

Patent Literature

Patent Literature 1: Japanese Patent Application Laid-open No. 2014-095783

DISCLOSURE OF INVENTION

Technical Problem

The technology of forming the plurality of fine slits and the plurality of concave and convex portions in the first electrode, which has been disclosed in the unexamined patent publication above, is an excellent technology for solving the above-mentioned problem. However, it was found that the following problems may occur in some arrangement states of data lines for applying a voltage on the first electrode. That is, as shown in schematic partial sectional views of FIGS. 50A and 50B, regarding a region (for the sake of convenience, referred to as "region A") in which a data line is provided directly under a slit region 12 provided in a first electrode 22 and a region (for the sake of convenience, referred to as "region B") in which a data line is provided directly under the concave and convex portion 11 provided in the first electrode 22, a difference can occur between the electric field generated in a portion of the first electrode 22, which occupies the region A, and the electric field generated in a portion of the first electrode 22, which occupies the region B due to an influence of an electric field generated when a voltage is applied on the data line. Therefore, there is a fear that a difference may occur between the alignment states of the liquid-crystal molecules occupying the region A and of the liquid-crystal molecules occupying the region B, and display quality of an image may be deteriorated, for example. Note that, for details of the reference numerals in FIGS. 50A and 50B, please see a description of a liquid-crystal display apparatus of Example 1 (in particular, description relating to FIG. 3).

Thus, it is an object of the present disclosure to provide a liquid-crystal display apparatus having a configuration and a structure in which deterioration of image quality due to arrangement of data lines is prevented, and a method of giving a pretilt to liquid-crystal molecules.

Solution to Problem

A liquid-crystal display apparatus according to a first aspect of the present disclosure for accomplishing the above-mentioned object includes:

a first substrate; and a second substrate, in which a plurality of pixels are arrayed between the first substrate and the second substrate in a two-dimensional matrix form in a first direction and a second direction extending in a direction orthogonal to the first direction, each pixel has a rectangular shape including a first side extending in the first direction, a third side opposed to the first side, a second side extending in the second direction, and a fourth side opposed to the second side, and includes a first electrode formed on an opposed surface of the first substrate, which is opposed to the second substrate, a first alignment film that covers the first electrode and the opposed surface of the first substrate, a second electrode formed on an opposed surface of the second substrate, which is opposed to the first substrate, a second alignment film that covers the second electrode and the opposed surface of the second substrate, and a liquid-crystal layer that is provided between the first alignment film and the second alignment film and contains liquid-crystal molecules, in each pixel, a pretilt is given to the liquid-crystal molecules, a slit region is formed in the first electrode and a concave and convex portion is formed in a region of the first electrode, in which the slit region is not formed, each pixel further includes, on the first substrate, a control circuit that controls application of a voltage on the first electrode, the plurality of pixels arrayed in the first direction are constituted of a first pixel group constituted of a plurality of odd-numbered pixels and a second pixel group constituted of a plurality of even-numbered pixels, in the vicinity of the first sides of the plurality of pixels arrayed in the first direction, a first data line that extends in the first direction and is for applying a voltage on the first electrode via the control circuit is provided closer to the first substrate than the first electrode, in the vicinity of the third sides of the plurality of pixels arrayed in the first direction, a second data line that extends in the first direction and is for applying a voltage on the first electrode via the control circuit is provided closer to the first substrate than the first electrode, the slit region is disposed above the first data line and the second data line, in each pixel that constitutes the first pixel group, a second data line extension extending from the second data line is provided adjacent to the first data line, and in each pixel that constitutes the second pixel group, a first data line extension extending from the first data line is provided adjacent to the second data line.

Assuming that a length of a portion of the slit region, which is adjacent to the first side or the third side, is denoted by $L_{S-1}$ and a maximum length of the pixel in the first direction is denoted by $L_{PX-1}$, it is favorable to satisfy $0.02 \leq L_{S-1}/L_{PX-1} \leq 0.5$.

A liquid-crystal display apparatus according to a second or third aspect of the present disclosure for accomplishing the above-mentioned object includes:

a first substrate; and a second substrate, in which a plurality of pixels are arrayed between the first substrate and the second substrate in a two-dimensional matrix form in a first direction and a second direction extending in a direction orthogonal to the first direction, each pixel has a rectangular shape including a first side extending in the first direction, a third side opposed to the first side, a second side extending in the second direction, and a fourth side opposed to the second side, and includes a first electrode formed on an opposed surface of the first substrate, which is opposed to the second substrate, a first alignment film that covers the first electrode and the opposed surface of the first substrate, a second electrode formed on an opposed surface of the second substrate, which is opposed to the first substrate, a second alignment film that covers the second electrode and the opposed surface of the second substrate, and a liquid-crystal layer that is provided between the first alignment film and the second alignment film and contains liquid-crystal molecules, in each pixel, a pretilt is given to the liquid-crystal molecules, a slit region is formed in the first electrode and a concave and convex portion is formed in a region of the first electrode, in which the slit region is not formed, each pixel further includes, on the first substrate, a control circuit that controls application of a voltage on the first electrode, and in the vicinity of the first sides of the plurality of pixels arrayed in the first direction, a data line that extends in the first direction and is for applying a voltage on the first electrode via the control circuit is provided closer to the first substrate than the first electrode.

In the liquid-crystal display apparatus according to the second aspect of the present disclosure, assuming that an area of the entire slit region is denoted by $S_1$ and an area of a portion of the slit region, which is provided in a portion of the first electrode, which is positioned above the data line is denoted by $S_2$, $$0 < S_2/S_1 \leq 0.1$$

is satisfied. Three or more and 20 or less in each of a first quadrant, a second quadrant, a third quadrant, and a fourth quadrant to be described later can be exemplified as a desirable number of space portions in a slit region having a line-and-space configuration to be described later.

Further, in the liquid-crystal display apparatus according to the third aspect of the present disclosure, the slit region is not formed in the portion of the first electrode, which is positioned above the data line.

In the liquid-crystal display apparatus according to the third aspect of the present disclosure, assuming that lengths of the portion of the first electrode, which is positioned above the data line and in which the slit region is not formed, in the first direction and the second direction are denoted by $L_{El-1}$ and $L_{El-2}$, respectively, it is favorable to satisfy $$2 \times 10^{-5} \text{ m} \leq L_{El-1} \leq 3 \times 10^{-4} \text{ m}$$

$$0 \leq L_{El-2} \leq 3 \times 10^{-4} \text{ m}$$

favorably, $$2 \times 10^{-5} \text{ m} \leq L_{El-2} \leq 3 \times 10^{-4} \text{ m}.$$

Irregularities may be formed in the portion of the first electrode in which the slit region is not formed or the portion of the first electrode may be flat. In either case, a transparent conductive material layer is formed. Note that the transparent conductive material layer also constitutes the first electrode. Alternatively, the transparent conductive material layer is not formed in the portion of the first electrode in which the slit region is not formed, the portion of the first electrode is a cutout, and a base layer on which the first electrode is formed is exposed. The cutout is provided in a side of the first electrode that extends parallel to the first direction (specifically, provided in the first side, provided in the third side, or provided in the first side and the third side).

A method of giving a pretilt to liquid-crystal molecules of the present disclosure for accomplishing the above-mentioned object is a method of giving a pretilt to liquid-crystal molecules in any one of the liquid-crystal display apparatuses according to the first to third aspects of the present disclosure, including:

provisionally giving the pretilt to the liquid-crystal molecules by applying a first predetermined voltage on a first electrode from a data line via a control circuit and applying a second predetermined voltage on a second electrode; and then fixing a pretilt state of the liquid-crystal molecules in a state in which the application of the first predetermined voltage on the first electrode from the data line via the control circuit is suspended and a potential of the first electrode is retained at the first predetermined voltage. Note that it is favorable that the application of the first predetermined voltage on the first electrode is suspended, and then the second predetermined voltage is applied on the first electrode. It is needless to say that, although the pretilt state of the liquid-crystal molecules is fixed in the above steps, an alignment state of the liquid-crystal molecules changes in a manner that depends on an electric field generated between the first electrode and the second electrode when the liquid-crystal display apparatus displays an image.

Advantageous Effects of Invention

In the liquid-crystal display apparatus according to the first aspect of the present disclosure, the second data line extension extending from the second data line is provided adjacent to the first data line in each pixel that constitutes the first pixel group. The first data line extension extending from the first data line is provided adjacent to the second data line in each pixel that constitutes the second pixel group. By disposing the data line extension adjacent to the data line in this manner, a voltage different from a voltage applied on the data line can be applied on the data line extension. Therefore, also in the liquid-crystal display apparatus having a structure in which the slit region is formed above the data line, an influence of an electric field generated by the data line on alignment of the liquid-crystal molecules can be suppressed using an electric field generated by the data line extension. Thus, it is possible to provide a liquid-crystal display apparatus having a configuration and a structure in which the image quality is not deteriorated due to arrangement of data line.

In the liquid-crystal display apparatus according to the second aspect of the present disclosure, a relationship between the area of the entire slit region and the area of the portion of the slit region, which is provided in the portion of the first electrode, which is positioned above the data line is defined. Therefore, also in the liquid-crystal display apparatus having a structure in which the slit region is formed above the data line, it is possible to suppress the influence of the electric field generated by the data line on the alignment of the liquid-crystal molecules. It is possible to provide a liquid-crystal display apparatus having a configuration and a structure in which the image quality is not deteriorated due to the arrangement of the data line.

In the liquid-crystal display apparatus according to the third aspect of the present disclosure, the slit region is not formed in the portion of the first electrode that is positioned above the data line. Therefore, it is possible to suppress the influence of the electric field generated by the data line on the alignment of the liquid-crystal molecules. It is possible to provide a liquid-crystal display apparatus having a configuration and a structure in which the image quality is not deteriorated due to the arrangement of the data line.

In the method of giving a pretilt to liquid-crystal molecules of the present disclosure, by, first of all, applying the first predetermined voltage on the first electrode from the data line via the control circuit and applying the second predetermined voltage on the second electrode, the pretilt can be reliably provisionally given to the liquid-crystal molecules. Then, in the state in which the control circuit for applying a voltage on the first electrode is turned OFF and the potential of the first electrode is retained at the first predetermined voltage, the pretilt state of the liquid-crystal molecules is fixed. Therefore, it is possible to provide a liquid-crystal display apparatus having a configuration and a structure in which the pretilt state of the liquid-crystal molecules is not adversely influenced by the electric field generated by the data line and the image quality is not deteriorated due to the arrangement of the data line.

Note that the effects described herein are merely examples and not limitative and additional effects may be provided.

BRIEF DESCRIPTION OF DRAWINGS

FIGS. 10A and 10B are timing charts showing a state of voltage application on the first electrode and the like in assembling the liquid-crystal display apparatus of Example 1.

FIG. 48 is a schematic plan view of some of branch convex portions and the like for describing a formation pitch of the branch convex portions, a width of the branch convex portion, a width of a tip end portion of the branch convex portion, and the like.

FIG. 49 is a schematic plan view of some of branch convex portions and the like for describing a formation pitch of the branch convex portions, a width of the branch convex portion, a width of a tip end portion of the branch convex portion, and the like.

MODE(S) FOR CARRYING OUT THE INVENTION

Figure 1:
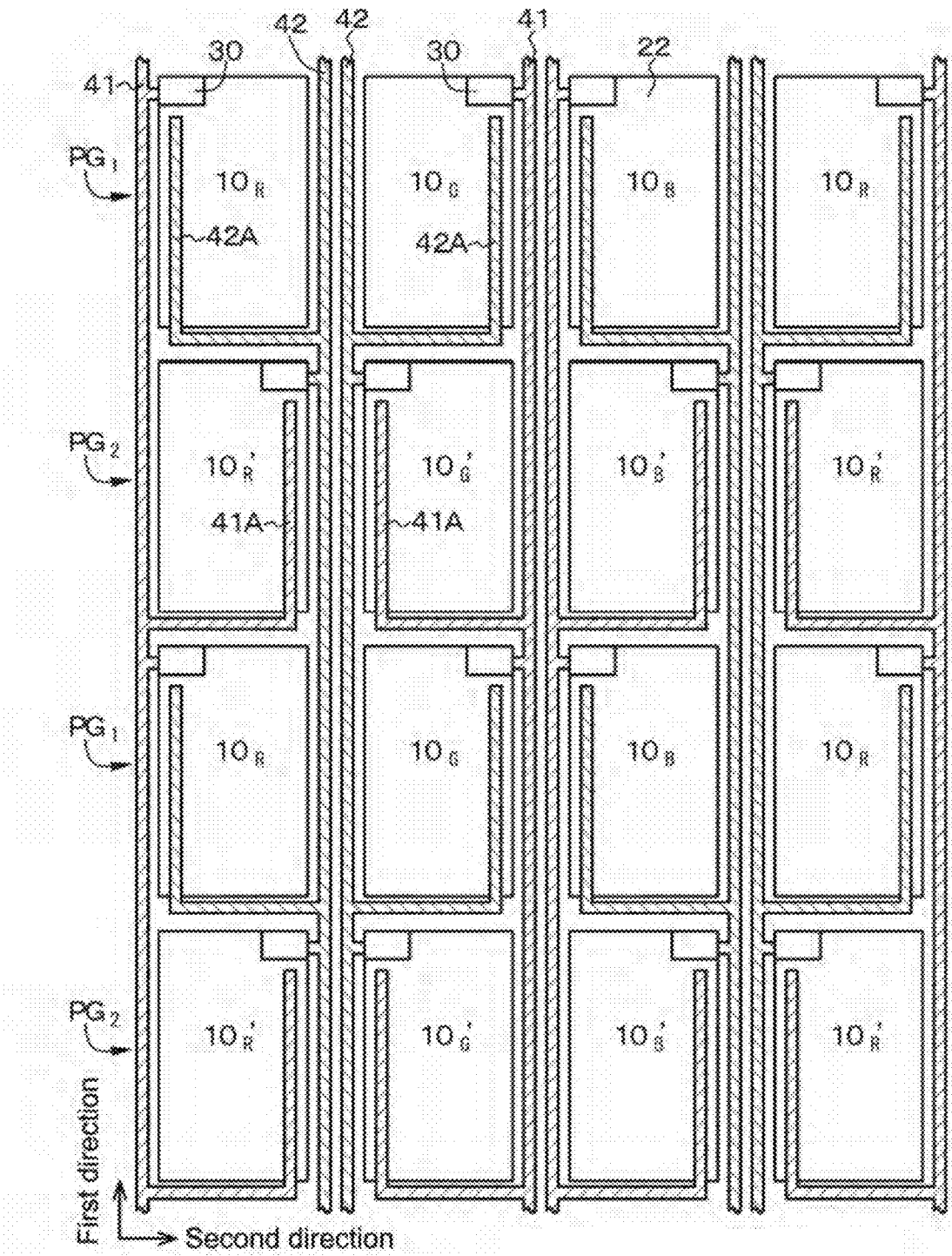
FIG. 1 is a diagram conceptually showing an arrangement state of 4×4 (=16) pixels, driving circuits, data lines, and data line extensions in a liquid-crystal display apparatus of Example 1.

Hereinafter, the present disclosure will be described on the basis of examples with reference to the drawings. However, the present disclosure is not limited to those examples and various numerical values and materials in the examples are illustrative. Note that descriptions will be made in the following order.
1. Liquid-Crystal Display Apparatuses According to First to Third Aspects of Present Disclosure, Overall Description
2. Example 1 (First Aspect of Present Disclosure, Specifically, Liquid-Crystal Display Apparatus According to First (A) Aspect)
3. Example 2 (Second Aspect of Present Disclosure, Specifically, Liquid-Crystal Display Apparatus According to Second(A) Aspect)
4. Example 3 (Third Aspect of Present Disclosure, Specifically, Liquid-Crystal Display Apparatus According to Third (A) Aspect)
5. Example 4 (Variant of Example 3)
6. Example 5 (Variant of Examples 1 to 4, Specifically, Liquid-Crystal Display Apparatuses According to First(C) Aspect, Second(C) Aspect, and Third(C) Aspect of Present Disclosure and Liquid-Crystal Display Apparatuses According to First(B) (3) Aspect, Second(B) (3) Aspect, And Third(B) (3) Aspect of Present Disclosure)
7. Example 6 (Variant of Examples 1 to 4, Specifically, Liquid-Crystal Display Apparatuses According to First(B) Aspect, Second(B) Aspect, and Third(B) Aspect of Present Disclosure)
8. Example 7 (Variant of Example 6, Specifically, Liquid-Crystal Display Apparatuses According to First(B) (2) Aspect, Second(B) (2) Aspect, and Third(B) (2) Aspect of Present Disclosure and Liquid-Crystal Display Apparatuses According to First(C) Aspect, Second(C) Aspect, and Third (C) Aspect of Present Disclosure)
9. Example 8 (Variant of Example 6, Specifically, Liquid-Crystal Display Apparatuses According to First(B) (4) Aspect, Second(B) (4) Aspect, and Third(B) (4) Aspect of Present Disclosure and Liquid-Crystal Display Apparatuses According to First(C) Aspect, Second(C) Aspect, and Third (C) Aspect of Present Disclosure)
10. Example 9 (Variant of Examples 1 to 8)
11. Example 10 (Variant of Examples 1 to 9)
12. Example 11 (Variant of Examples 1 to 10, Specifically, Liquid-Crystal Display Apparatuses According to First(D) Aspect, Second(D) Aspect, and Third(D) Aspect of Present Disclosure)
13. Example 12 (Variant of Examples 1 to 11)
14. Example 13 (Variant of Examples 1 to 12)
15. Others <Liquid-Crystal Display Apparatuses According to First to Third Aspects of Present Disclosure, Overall Description>

A slit region is disposed above a first data line and a second data line or a data line. The slit region is not disposed immediately on the first data line and the second data line or the data line. Actually, the slit region is disposed obliquely above the first data line and the second data line or the data line. That is, a projection image of a first electrode to a first substrate does not include a projection image of the first data line and the second data line or the data line to the first substrate. A first data line extension extends from the first data line. The first data line extension is constituted of a first portion extending in a second direction and a second portion extending from the first portion in a first direction. The second portion is provided adjacent to the second data line. A second data line extension extends from the second data line. The second data line extension is constituted of the first portion extending in the second direction and the second portion extending in the first direction from the first portion. The second portion is provided adjacent to the first data line. A planar shape of each of the first data line extension and the second data line extension is an "L"-shape. A projection image of the second portion to the first substrate includes a projection image of the first electrode to the first substrate. A projection image of the first portion to the first substrate may be included in the projection image of the first electrode to the first substrate or does not need to be included in the projection image of the first electrode to the first substrate.

In a liquid-crystal display apparatus according to a first aspect of the present disclosure, the first data line and the second data line are provided. Further, in some cases, the first data line and the second data line are provided also in each of liquid-crystal display apparatuses according to second and third aspects of the present disclosure. In those cases, assuming that a voltage (e.g., image signal voltage) applied on the first data line is denoted by $V_{D\text{-}1}$, a voltage (e.g., image signal voltage) applied on the second data line is denoted by $V_{D\text{-}2}$, and a voltage applied on the second electrode is denoted by $V_2$, it is only necessary to set the respective voltages to satisfy, for example, $$V_{D\text{-}1} - V_2 \geq 0 \text{ (volt)}$$

$$V_{D\text{-}2} - V_2 \leq 0 \text{ (volt)}.$$

That is, the voltage (e.g., image signal voltage) $V_{D\text{-}1}$ applied on the first data line and the voltage (e.g., image signal voltage) $V_{D\text{-}2}$ applied on the second data line are in inverted states in a sense when the voltage $V_2$ applied on the second electrode is used as a reference.

In each of the liquid-crystal display apparatuses according to the first to third aspects of the present disclosure, it is possible to employ an embodiment in which, in each pixel, the slit region extends toward a first side from a pixel center, extends toward a third side from the pixel center, extends toward a second side from the pixel center, and extends toward a fourth side from the pixel center. Specifically, it is possible to employ an embodiment in which, in each pixel, the slit region extends toward the first side from the pixel center, extends toward the third side from the pixel center, extends halfway between the pixel center and the second side toward the second side, and extends halfway between the pixel center and the fourth side toward the fourth side. More specifically, in the liquid-crystal display apparatus according to the first or second aspect of the present disclosure, it is possible to employ an embodiment in which, in each pixel, the slit region extends between the pixel center and the first side toward the first side, extends between the pixel center and the third side toward the third side, extends halfway between the pixel center and the second side toward the second side, and extends halfway between the pixel center and the fourth side toward the fourth side. Further, in the liquid-crystal display apparatus according to the third aspect of the present disclosure, it is possible to employ an embodiment in which, specifically, in each pixel, the slit region extends toward the first side from the pixel center, extends between the pixel center and the third side toward the third side, extends halfway between the pixel center and the second side toward the second side, and extends halfway between the pixel center and the fourth side toward the fourth side. In addition, in a favorable embodiment of the liquid-crystal display apparatus according to the third aspect of the present disclosure, it is possible to employ an embodiment in which the slit region extends from the pixel center up to the vicinity of a cutout provided on the side (first side or third side or first side and third side) of the first electrode, which extends parallel to the first direction, extends halfway between the pixel center and the second side toward the second side, and extends halfway between the pixel center and the fourth side toward the fourth side.

In each of the liquid-crystal display apparatuses according to the first to third aspects of the present disclosure including the above-mentioned favorable embodiment, it is possible to employ a configuration in which, assuming that an axial line passing through a pixel center of each pixel and extending parallel to the first direction is an X-axis and an axial line passing through the pixel center of each pixel and extending parallel to the second direction is a Y-axis, in each pixel, a concave and convex portion are constituted of a stem convex portion extending on the X-axis and on the Y-axis and a plurality of branch convex portions extending from lateral sides of the stem convex portion toward a peripheral portion of the pixel. Note that, for the sake of convenience, such a configuration, such a configuration will be sometimes referred to as a "liquid-crystal display apparatus according to the first(A) aspect of the present disclosure", a "liquid-crystal display apparatus according to the second(A) aspect of the present disclosure", or a "liquid-crystal display apparatus according to the third(A) aspect of the present disclosure".

In this case, it is possible to employ a configuration in which
a plurality of branch convex portions occupying a first quadrant extend parallel to a direction in which a value of a Y-coordinate increases when a value of an X-coordinate increases,
a plurality of branch convex portions occupying a second quadrant extend parallel to a direction in which the value of the Y-coordinate increases when the value of the X-coordinate decreases,
a plurality of branch convex portions occupying a third quadrant extend parallel to a direction in which the value of the Y-coordinate decreases when the value of the X-coordinate decreases, and
a plurality of branch convex portions occupying a fourth quadrant extend parallel to the direction in which the value of the Y-coordinate decreases when the value of the X-coordinate increases. Such an arrangement state of the branch convex portions is called multi-domain electrode structure. A region in which extending directions of the branch convex portions are different is formed within one pixel. Therefore, it is possible to achieve an improvement in a viewing-angle characteristic. The same applies to the following description. It is favorable to employ a configuration in which each of axial lines of the plurality of branch convex portions occupying the first quadrant extends to form 45 degrees together with the X-axis, axial lines of a plurality of branch convex portions occupying a second quadrant extend to form 135 degrees together with the X-axis, axial lines of a plurality of branch convex portions occupying a third quadrant extend to form 225 degrees together with the X-axis, and axial lines of a plurality of branch convex portions occupying a fourth quadrant extend to form 315 degrees together with the X-axis, though not limited to those values (angles). The same applies hereinafter.

Alternatively, in the liquid-crystal display apparatuses according to the first to third aspects of the present disclosure including the above-mentioned favorable embodiment, it is possible to employ a configuration in which,
assuming that an axial line passing through a pixel center of each pixel and extending parallel to the first direction is an X-axis and an axial line passing through the pixel center of each pixel and extending parallel to the second direction is a Y-axis,
a plurality of convex portions occupying a first quadrant extend parallel to a direction in which a value of a Y-coordinate increases when a value of an X-coordinate increases,
a plurality of convex portions occupying a second quadrant extend parallel to a direction in which the value of the Y-coordinate increases when the value of the X-coordinate decreases,
a plurality of convex portions occupying a third quadrant extend parallel to a direction in which the value of the Y-coordinate decreases when the value of the X-coordinate decreases, and
a plurality of convex portions occupying a fourth quadrant extend parallel to a direction in which the value of the Y-coordinate decreases when the value of the X-coordinate increases. Note that, for the sake of convenience, such a configuration will be sometimes referred to as a "liquid-crystal display apparatus according to the first(B) aspect of the present disclosure", a "liquid-crystal display apparatus according to the second(B) aspect of the present disclosure", or a "liquid-crystal display apparatus according to the third (B) aspect of the present disclosure".

In such a configuration, a portion of the convex portion that extends parallel to the X-axis or a portion of the convex portion that extends parallel to the Y-axis is not present or has a very short length even if present. Thus, it is possible to cause an alignment direction of the liquid-crystal molecules to correspond to an extending direction of the convex portion as much as possible. Production of dark lines in a region corresponding to the X-axis and the Y-axis can be suppressed. As a result, it is possible to provide a liquid-crystal display apparatus capable of providing a more uniform and higher light transmittance. Further, it is possible to provide a liquid-crystal display apparatus having a configuration and a structure by which a pretilt can be given to the liquid-crystal molecules in short time.

Alternatively, in the liquid-crystal display apparatuses according to the first to third aspects of the present disclosure including the above-mentioned favorable embodiment, it is possible to employ a configuration in which the concave and convex portion is constituted of a stem convex portion formed in a frame-like shape in a pixel peripheral portion and a plurality of branch convex portions extending toward a pixel inside from the stem convex portion. Note that, for the sake of convenience, such a configuration will be sometimes referred to as a "liquid-crystal display apparatus according to the first(C) aspect of the present disclosure", a "liquid-crystal display apparatus according to the second(C) aspect of the present disclosure", or a "liquid-crystal display apparatus according to the third(C) aspect of the present disclosure".

In this case, it is possible to employ a configuration in which
assuming that an axial line passing through a pixel center of each pixel and extending parallel to the first direction is an X-axis and an axial line passing through the pixel center of each pixel and extending parallel to the second direction is a Y-axis, a plurality of branch convex portions occupying a first quadrant extend parallel to the direction in which the value of the Y-coordinate increases when a value of an X-coordinate increases, a plurality of branch convex portions occupying a second quadrant extend parallel to the direction in which the value of the Y-coordinate increases when the value of the X-coordinate decreases, a plurality of branch convex portions occupying a third quadrant extend parallel to the direction in which the value of the Y-coordinate decreases when the value of the X-coordinate decreases, and a plurality of branch convex portions occupying a fourth quadrant extend parallel to the direction in which the value of the Y-coordinate decreases when the value of the X-coordinate increases.

Alternatively, in the liquid-crystal display apparatus according to the first(B) aspect, the second(B) aspect, or the third(B) aspect of the present disclosure including the above-mentioned favorable embodiment, it is possible to employ a configuration in which some of the convex portions occupying the first quadrant and some of the convex portions occupying the fourth quadrant are formed in a connected state, others of the convex portions occupying the first quadrant and some of the convex portions occupying the second quadrant are formed in a connected state, others of the convex portions occupying the second quadrant and some of the convex portions occupying the third quadrant are formed in a connected state, and others of the convex portions occupying the third quadrant and others of the convex portions occupying the fourth quadrant are formed in a connected state. Note that, for the sake of convenience, such a configuration will be sometimes referred to as a "liquid-crystal display apparatus according to the first(B) (1) aspect of the present disclosure", a "liquid-crystal display apparatus according to the second(B) (1) aspect of the present disclosure", or a "liquid-crystal display apparatus according to the third(B) (1) aspect of the present disclosure".

In the liquid-crystal display apparatus according to the first(B) (1) aspect or the second(B) (1) aspect of the present disclosure or the third(B) (1) aspect of the present disclosure, it is possible to employ a configuration in which a joined part of two convex portions is provided with a projection extending in a direction of a peripheral portion of the pixel. Here, it is possible to employ a configuration in which the projection is surrounded by a plurality of line segments. It is also possible to employ a configuration in which the projection is surrounded by a single curve. It is also possible to employ a configuration in which the projection is surrounded by a plurality of curves. It is also possible to employ a configuration in which the projection is surrounded by a combination of a line segment with a curve. A tip end of the projection may be held in contact with the joined part of the two convex portions adjacent to each other in the direction of the peripheral portion of the pixel.

In the liquid-crystal display apparatus according to the first(B) (1) aspect, the second(B) (1) aspect, or the third(B) (1) aspect of the present disclosure, it is possible to employ a configuration in which some of the convex portions occupying the first quadrant and some of the convex portions occupying the fourth quadrant are formed in a deviated state, others of the convex portions occupying the first quadrant and some of the convex portions occupying the second quadrant are formed in a deviated state, others of the convex portions occupying the second quadrant and some of the convex portions occupying the third quadrant are formed in a deviated state, and others of the convex portions occupying the third quadrant and others of the convex portions occupying the fourth quadrant are formed in a deviated state. Note that, for the sake of convenience, such a configuration will be sometimes referred to as a "liquid-crystal display apparatus according to the first(B) (2) aspect of the present disclosure", a "liquid-crystal display apparatus according to the second(B) (2) aspect of the present disclosure", or a "liquid-crystal display apparatus according to the third(B) (2) aspect of the present disclosure".

Alternatively, in the liquid-crystal display apparatus according to the first(B) aspect, the second(B) aspect, or the third(B) aspect, or the third(B) aspect of the present disclosure of the present disclosure including the above-mentioned favorable embodiment, it is possible to employ a configuration in which some of the convex portions occupying the first quadrant and some of the convex portions occupying the fourth quadrant are not joined to each other, others of others of the convex portions occupying the first quadrant and some of the convex portions occupying the second quadrant are not joined to each other, others of the convex portions occupying the second quadrant and some of the convex portions occupying the third quadrant are not joined to each other, and others of the convex portions occupying the third quadrant and others of the convex portions occupying the fourth quadrant are not joined to each other. Note that, for the sake of convenience, such a configuration will be sometimes referred to as a "liquid-crystal display apparatus according to the first(B) (3) aspect of the present disclosure", a "liquid-crystal display apparatus according to the second(B) (3) aspect of the present disclosure", or a "liquid-crystal display apparatus according to the third(B) (3) aspect of the present disclosure".

In the liquid-crystal display apparatus according to the first(B) (3) aspect, the second(B) (3) aspect, or the third(B) (3) aspect of the present disclosure, it is possible to employ a configuration in which some of the convex portions occupying the first quadrant and some of the convex portions occupying the fourth quadrant are formed in a deviated state, others of the convex portions occupying the first quadrant and some of the convex portions occupying the second quadrant are formed in a deviated state, others of the convex portions occupying the second quadrant and some of the convex portions occupying the third quadrant are formed in a deviated state, others of the convex portions occupying the third quadrant and others of the convex portions occupying the fourth quadrant are formed in a deviated state. Note that, for the sake of convenience, such a configuration will be sometimes referred to as a "liquid-crystal display apparatus according to the first(B) (4) aspect of the present disclosure", a "liquid-crystal display apparatus according to the second(B) (4) aspect of the present disclosure", or a "liquid-crystal display apparatus according to the third(B) (4) aspect of the present disclosure".

By forming the convex portion and the convex portion in the unjoined state or forming the convex portion and the convex portion in the deviated state, an electric field generated by the first electrode at the center of the pixel is distorted in a desired state in the vicinity of the center of the pixel and a falling direction of the liquid-crystal molecules is defined. As a result, it is possible to increase an alignment regulation force for the liquid-crystal molecules in the vicinity of the center of the pixel. It is possible to accurately define a tilt state of the liquid-crystal molecules in the vicinity of the center of the pixel. A liquid-crystal layer is exposed to a desired electric field, in order to give a pretilt to the liquid-crystal molecules, for a predetermined time during manufacture of the liquid-crystal display apparatus in this manner. It is possible to reduce a time required until the alignment of the liquid-crystal molecules exposed to the desired electric field is stabilized. That is, it becomes possible to give a pretilt to the liquid-crystal molecules in short time, and it is possible to achieve a reduction in manufacturing time of the liquid-crystal display apparatus.

In the liquid-crystal display apparatus according to the first(B) (2) aspect, the second(B) (2) aspect, or the third(B) (2) aspect of the present disclosure or the liquid-crystal display apparatus according to the first(B) (4) aspect, the second(B) (4) aspect, or the third(B) (4) aspect of the present disclosure, it is favorable to employ an embodiment in which, assuming that a formation pitch of the convex portions along the X-axis is denoted by $P_X$ and a formation pitch of the convex portions along the Y-axis is denoted by $P_Y$, the some of the convex portions occupying the first quadrant and the some of the convex portions occupying the fourth quadrant are formed in a state deviated from each other by $(P_X/2)$, the others of the convex portions occupying the first quadrant and the some of the convex portions occupying the second quadrant are formed in a state deviated from each other by $(P_Y/2)$, the others of the convex portions occupying the second quadrant and the some of the convex portions occupying the third quadrant are formed in a state deviated from each other by $(P_X/2)$, and the others of the convex portions occupying the third quadrant and the others of the convex portions occupying the fourth quadrant are formed in a state deviated from each other by $(P_Y/2)$.

Further, in the liquid-crystal display apparatus according to the first(B) (1) aspect, the second(B) (1) aspect, or the third(B) (1) aspect of the present disclosure, the first(B) (2) aspect, the second(B) (2) aspect, or the third(B) (2) aspect of the present disclosure, the first(B) (3) aspect, the second(B) (3) aspect, or the third(B) (3) aspect of the present disclosure, or the first(B) (4) aspect, the second(B) (4) aspect, or the third(B) (4) aspect of the present disclosure, a portion of the convex portion that extends parallel to the X-axis or a portion of the convex portion that extends parallel to the Y-axis is not present or has a very short length even if present. Thus, it is possible to cause the alignment direction of the liquid-crystal molecules to correspond to the extending direction of the convex portion as much as possible. Production of dark lines in a region corresponding to the X-axis and the Y-axis can be suppressed. As a result, it is possible to provide a liquid-crystal display apparatus capable of providing a more uniform and higher light transmittance. Further, it is possible to provide a liquid-crystal display apparatus having a configuration and a structure by which a pretilt can be given to the liquid-crystal molecules in short time.

In each of the liquid-crystal display apparatuses according to the first to third aspects of the present disclosure including the above-mentioned various favorable embodiments or configurations (hereinafter, sometimes collectively and simply referred to as "liquid-crystal display apparatus or the like of the present disclosure"), it is favorable that the concave and convex portion has a difference in level of $5 \times 10^{-8}$ m to $3 \times 10^{-7}$ m.

Although not limited thereto, it is favorable to employ a line-and-space configuration in which the slit region is constituted of a line portion in which a transparent conductive material layer that constitutes the first electrode is formed and a space portion (slit) in which the transparent conductive material layer is not formed. In the space portion, a base layer on which the first electrode is formed is exposed. The line portion that constitutes the slit region (hereinafter, sometimes simply referred to as "line portion") is conductive with (connected to) the concave and convex portion of the first electrode. Due to the provision of the slit region, the electric field generated by the first electrode is distorted in the vicinity of the space portion that constitutes the slit region (hereinafter, sometimes simply referred to as "space portion"), and the falling direction of the liquid-crystal molecules is rigidly defined. As a result, it is possible to increase the alignment regulation force for the liquid-crystal molecules in the vicinity of the slit region. It is possible to accurately define the tilt state of the liquid-crystal molecules in the vicinity of the space portion. Not only the slit region but also the concave and convex portion are provided, and hence the problem in a conventional fine-slit structure does not occur. As a width of the line portion, 1 μm to 8 μm, favorably, 2 μm to 3 μm can be exemplified. Further, 1 μm to 6 μm, favorably, 2 μm to 3 μm can be exemplified as a width of the space portion. The same applies to the following description of the slit region. The transparent conductive material layer is formed in the concave and convex portion.

The first electrode is formed on the base layer. For example, by forming irregularities in the base layer and forming the transparent conductive material layer on those irregularities, the concave and convex portion of the first electrode can be obtained. Further, a flat concave portion region may be formed in the base layer and the slit region may be formed in that concave portion region. However, it is favorable to form a flat convex portion region in the base layer and form the slit region in that convex portion region. In such a configuration, it is possible to employ a configuration in which the slit region is provided in the convex portion region including a central region (central portion) of the pixel. Alternatively, it is possible to employ a configuration in which the slit region is formed in the convex portion region extending toward the central region of the pixel. Alternatively, it is possible to employ a configuration in which the slit region is formed in the convex portion region provided in a region sandwiched by the branch convex portion extending toward the central region of the pixel and the Y-axis.

Alternatively, it is also possible to employ a configuration in which a space portion extending parallel to the convex portion is formed in a top portion of the convex portion on which the transparent conductive material layer is formed. It is also possible to employ a configuration in which a space portion extending parallel to the concave portion is formed in a bottom portion of the concave portion on which the transparent conductive material layer is formed. The slit region is also constituted of those configurations. In those cases, the space portion may be formed over the entire convex portion in a length direction or the space portion may be formed in a part of the convex portion in the length direction. In the case where the space portion is formed in the part of the convex portion in the length direction, it is desirable to form the space portion in the central region (central portion) of the pixel and the convex portion in the vicinity thereof. Further, the space portion may be formed over the entire concave portion in the length direction or the space portion may be formed in a part of the concave portion in the length direction. In the case where the space portion is formed in the part of the concave portion in the length direction, it is desirable to form the space portion in the central region (central portion) of the pixel and the concave portion in the vicinity thereof. Alternatively, it is also possible to employ a configuration in which the space portion extending parallel to the convex portion is formed in the top portion of the convex portion and the space portion extending parallel to the concave portion is formed in the bottom portion of the concave portion. In this case, the space portion may be formed over the entire of the convex portion in the length direction or the space portion may be formed in the part of the convex portion in the length direction. Further, the space portion may be formed over the entire of the concave portion in the length direction or the space portion may be formed in the part of the concave portion in the length direction. The transparent conductive material layer is formed in a part of a top surface of the convex portion in which the space portion is not provided and the transparent conductive material layer is formed in a part of the bottom portion of the concave portion in which the space portion is not provided. It is necessary to form the space portion such that a convex portion electrically isolated from other convex portions is not formed by the space portion or such that a concave portion electrically isolated from other concave portions is not formed by the space portion. In a display apparatus of a so-called multi-pixel drive type in which one pixel is divided into a plurality of regions and each of the regions is independently driven, it is only necessary to form the space portion in each region such that a convex portion electrically isolated from other convex portions is not formed by the space portion or such that the concave portion electrically isolated from other concave portions is not formed by the space portion. In the case where the space portion is provided in the top surface of the convex portion, as the width of the convex portion and the width of the space portion, $0.2 \leq$ (width of space portion/width of convex portion) $\leq 0.8$ can be exemplified. In the case where the space portion is provided in a bottom surface of the concave portion, as the width of the concave portion and the width of the space portion, $0.2 \leq$ (width of space portion/width of concave portion) $\leq 0.8$ can be exemplified. The same applies to the following description of the slit region or the space portion.

In the liquid-crystal display apparatus or the like of the present disclosure including the above-mentioned various favorable embodiments and configurations, the control circuit can be constituted of a thin-film transistor (TFT), for example. One source/drain electrode of the TFT is connected to the data line, the first data line, and the second data line. The other source/drain electrode of the TFT is connected to the first electrode. The gate electrode of the TFT is connected to a gate line extending in the second direction. The gate line is shared by pixels arrayed in the second direction. On the other hand, the data line, the first data line, and the second data line are shared by pixels arrayed in the first direction. The TFT has well-known configuration and structure.

In the liquid-crystal display apparatus or the like of the present disclosure, the first data line, the second data line, the data line, the first data line extension, and the second data line extension are formed in an identical plane. They are formed in the plane different from that of the first electrode. A part (first portion) of the first data line extension and a part (first portion) of the second data line extension may be positioned outside the pixel. In this case, it is favorable that they are provided below a black matrix. Further, it is also possible to employ a structure in which a part of the data line extension or the entire data line extension constitutes a so-called storage capacitance.

In addition, in the liquid-crystal display apparatus or the like of the present disclosure including the above-mentioned various favorable embodiments and configurations, it is possible to employ an embodiment in which a black matrix is provided, and a projection image of the portion of the first substrate that is positioned between the pixels and a projection image of the pixel peripheral portion overlap a projection image of the black matrix.

In addition, in the liquid-crystal display apparatus or the like of the present disclosure including the above-mentioned various favorable embodiments and configurations, it is possible to employ an embodiment in which a first alignment film that covers the first electrode and a second alignment film that covers the second electrode are further provided, and after a predetermined electric field is applied on the liquid-crystal layer and a pretilt is provisionally given to the liquid-crystal molecules, the pretilt is given to the liquid-crystal molecules (i.e., a pretilt state of the liquid-crystal molecules is fixed) by causing a polymerizable monomer (alignment control material having photosensitive group or cross-linking photosensitive group) that constitutes at least the first alignment film to react in a state in which the application of the electric field on the liquid-crystal layer is suspended.

Alternatively, in the liquid-crystal display apparatus or the like of the present disclosure including the above-mentioned various favorable embodiments and configurations, it is possible to employ an embodiment in which a first alignment film that covers the first electrode and a second alignment film that covers the second electrode are further provided, and after a predetermined electric field is applied on the liquid-crystal layer and a pretilt is provisionally given to the liquid-crystal molecules, the pretilt is given to the liquid-crystal molecules (i.e., a pretilt state of the liquid-crystal molecules is fixed) by causing a polymerizable monomer (alignment control material) contained in the liquid-crystal layer to react in a state in which the application of the electric field on the liquid-crystal layer is suspended.

In the liquid-crystal display apparatus or the like of the present disclosure including the above-mentioned various favorable embodiments and configurations, assuming that an average film thickness of the first alignment film is denoted by $T_1$ and an average film thickness of the second alignment film is denoted by $T_2$, it is favorable to satisfy $0.5 \leq T_2/T_1 \leq 1.5$ desirably, $0.8 \leq T_2/T_1 \leq 1.2$.

Here, the average film thickness of the alignment film is a value obtained by dividing the volume of the alignment film that occupies one pixel (or one sub-pixel) by an area of the one pixel (or one sub-pixel). By defining the value of $T_2/T_1$ in this manner, that is, setting the average film thickness of the first alignment film and the average film thickness of the second alignment film to be equal or approximately equal to each other, the occurrence of image sticking and the like can be reliably prevented.

In the liquid-crystal display apparatus or the like of the present disclosure including the above-mentioned favorable embodiments and configurations, it is possible to employ a configuration in which a convex structure is formed from the portion of the first substrate that is positioned between the pixels to the portion of the first substrate, which corresponds to the pixel peripheral portion, and a peripheral portion of the concave and convex portion is formed on the convex structure. If the peripheral portion of the concave and convex portion is formed on the convex structure in this manner, a more intense electric field is generated in the peripheral portion of the concave and convex portion in comparison with the case where the peripheral portion of the concave and convex portion is flat. As a result, it is possible to increase the alignment regulation force for the liquid-crystal molecules in the peripheral portion of the concave and convex portion. It is possible to accurately define the tilt state of the liquid-crystal molecules in the peripheral portion of the concave and convex portion. Therefore, it is possible to retain a favorable voltage response characteristic. It is possible to employ an embodiment in which the convex structure is formed on the basis of a black matrix formed of a well-known material.

Alternatively, in the liquid-crystal display apparatus or the like of the present disclosure including the above-mentioned favorable embodiments and configurations, it is possible to employ a configuration in which a width of the branch convex portion provided in the first electrode decreases toward a tip end portion. By setting the width of the branch convex portion provided in the first electrode to decrease toward the tip end portion in this manner, generated dark lines can be further reduced. That is, a more uniform and higher light transmittance can be provided, and generation of dark lines can be suppressed. It is possible to employ an embodiment in which the width of the branch convex portion is largest at a part of the branch convex portion that is joined to the stem convex portion and decreases toward the tip end portion from the part joined to the stem convex portion. Two opposed sides of the branch convex portion from the part joined to the stem convex portion to the tip end portion will be referred to as "lateral sides" for the sake of convenience.

It is possible to employ an embodiment in which, regarding the width of the branch convex portion, the branch convex portion is linearly narrowed toward the tip end portion from the part joined to the stem convex portion (embodiment in which each lateral side that constitutes the branch convex portion is constituted of a single line segment and the rate of change of the width is constant), though not limited thereto. It is also possible to employ an embodiment in which the branch convex portion is narrowed in a curved shape (embodiment in which each lateral side that constitutes the branch convex portion is constituted of a single smooth curve and the rate of change of the width changes). It is also possible to employ an embodiment in which each lateral side that constitutes the branch convex portion is constituted of two or more line segments or curves. It is also possible to employ an embodiment in which the branch convex portion is narrowed in a ladder-shape (embodiment in which each lateral side that constitutes the branch convex portion has a ladder-shape).

Alternatively, in the liquid-crystal display apparatus or the like of the present disclosure including the above-mentioned favorable embodiments and configurations, it is possible to employ a configuration in which a depression is provided in the first electrode in the central region of the pixel. That is, the concave and convex portion, the slit region, and the depression are formed in the first electrode. The transparent conductive material layer that constitutes the first electrode is formed in the depression. Note that, for the sake of convenience, such a configuration will be sometimes referred to as a "liquid-crystal display apparatus according to the first(D) aspect of the present disclosure", a "liquid-crystal display apparatus according to the second(D) aspect of the present disclosure", or a "liquid-crystal display apparatus according to the third(D) aspect of the present disclosure". In this manner, due to the provision of the depression, the liquid-crystal molecules positioned in the vicinity of the depression fall down toward the center of the pixel. Here, it is possible to employ a configuration in which the depression decreases in size toward the first substrate. That is, it is possible to employ a configuration in which the depression has a so-called forward taper slope. It should be noted that the depression is not limited thereto, and it is also possible to employ a configuration in which the depression includes a perpendicular surface. It is possible to employ a configuration in which, in the configuration in which the depression decreases in size toward the first substrate, an angle of inclination of the depression is 5 degrees to 60 degrees, favorably, 20 degrees to 30 degrees. A shape of an outer edge of the depression can be circular or can be rectangular. In the latter case, an angle formed by the rectangular outer edge of the depression and an extending direction of the concave and convex portion (angle formed by the rectangular outer edge of the depression and the extending direction of the concave and convex portion in which this outer edge and an extension of the concave and convex portion intersect each other) may be 90 degrees or may be an acute angle. The shape of the outer edge of the depression is not limited thereto and may be any shape as long as it has a structure that enables the liquid-crystal molecules to fall down toward the center of the pixel. Further, it is possible to employ a configuration in which a central portion of the depression forms a part of the contact hole.

As an average width of the branch convex portion and the concave portion, 1 µm to 20 µm, favorably, 2 µm to 10 µm can be exemplified. If the average width of the branch convex portion and the concave portion is 1 µm or less, there is a fear that it may be difficult to form the branch convex portion and the concave portion and a sufficient manufacturing yield may not be ensured. On the other hand, if the average width of the branch convex portion and the concave portion exceeds 20 µm, there is a fear that, when a driving voltage is applied on the first electrode and the second electrode, it may be difficult to generate a favorable oblique electric field between the first electrode and the second electrode. As an average width of the stem convex portion, $2 \times 10^{-6}$ m to $2 \times 10^{-5}$ m, favorably, $4 \times 10^{-6}$ m to $1.5 \times 10^{-5}$ m can be exemplified. As an average height from the concave portion to the convex portion, $5 \times 10^{-8}$ m to $1 \times 10^{-6}$ m, favorably, $5 \times 10^{-8}$ m to $3 \times 10^{-7}$ m, more favorably, $1 \times 10^{-7}$ m to $3 \times 10^{-7}$ m can be exemplified. With this, favorable alignment control becomes possible, a sufficient manufacturing yield can be ensured, and a reduction in light transmittance and prolongation of the process time can be prevented.

Alternatively, as a minimum width and a maximum width of the branch convex portion and the concave portion, 1 µm and 25 µm, favorably, 2 µm and 20 µm can be exemplified. If the minimum width of the branch convex portion and the concave portion is 1 µm or less, there is a fear that it may be difficult to form the branch convex portion and the concave portion and a sufficient manufacturing yield may not be ensured. On the other hand, if the maximum width of the branch convex portion and the concave portion exceeds 25 µm, there is a fear that, when a driving voltage is applied on the first electrode and the second electrode, it may be difficult to generate a favorable oblique electric field between the first electrode and the second electrode. As a width of the stem convex portion, $2\times10^{-6}$ m to $2\times10^{-5}$ m, favorably, $4\times10^{-6}$ m to $1.5\times10^{-5}$ m can be exemplified. As the average height from the concave portion to the convex portion, $5\times10^{-8}$ m to $1\times10^{-6}$ m, favorably, $5\times10^{-8}$ m to $3\times10^{-7}$ m, more favorably, $1\times10^{-7}$ m to $3\times10^{-7}$ m can be exemplified. With this, favorable alignment control becomes possible, a sufficient manufacturing yield can be ensured, and a reduction in light transmittance and prolongation of the process time can be prevented.

Although it depends on configurations and structures, in the liquid-crystal display apparatus or the like of the present disclosure, it is favorable that the branch convex portions are line-symmetrical with respect to the X-axis and also line-symmetrical with respect to the Y-axis. Alternatively, in the liquid-crystal display apparatus or the like of the present disclosure, it is favorable that the branch convex portions are rotationally symmetrical (point-symmetrical) with respect to the center of the pixel by 180 degrees.

Figure 48:
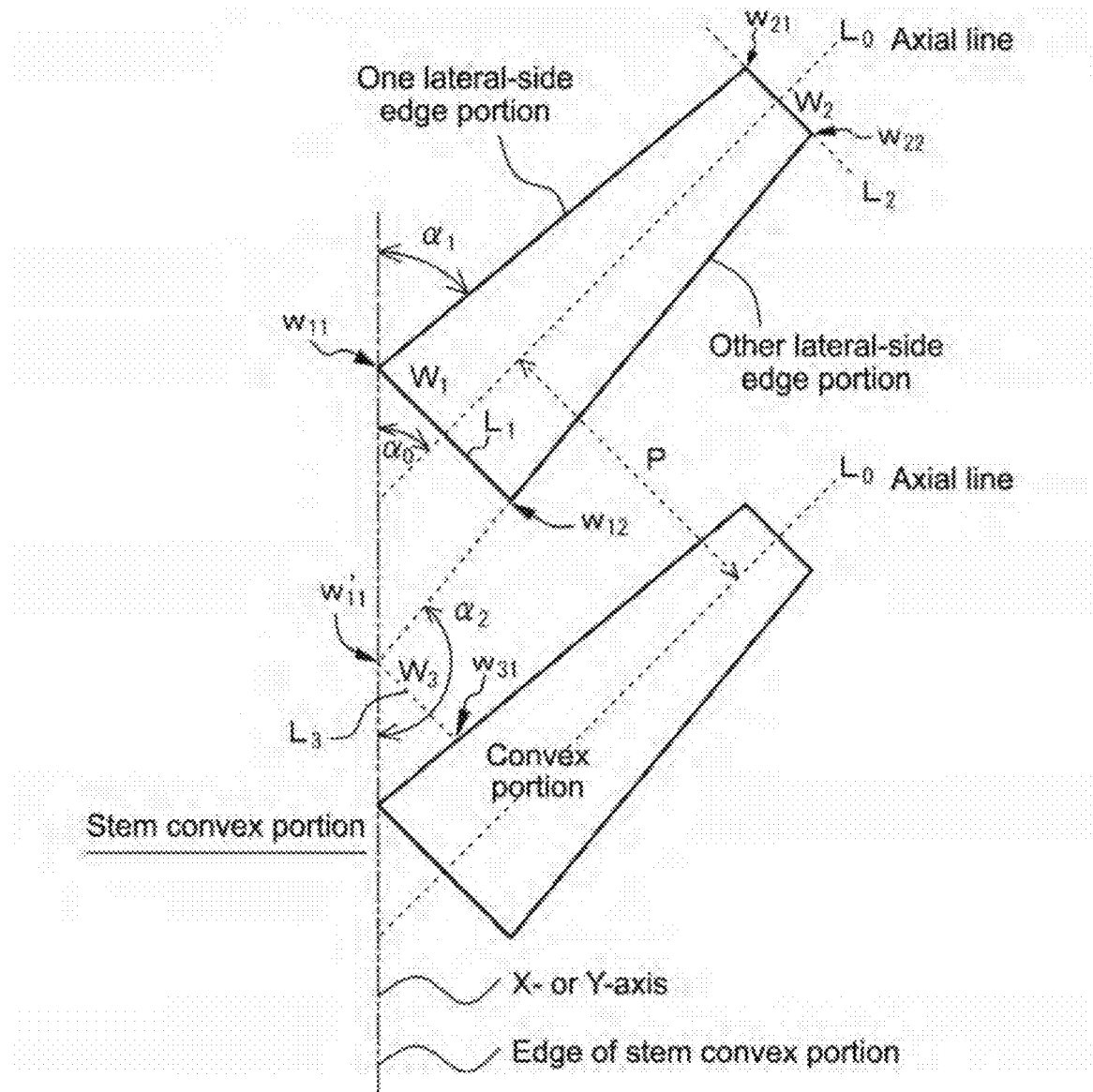
Figure 49:
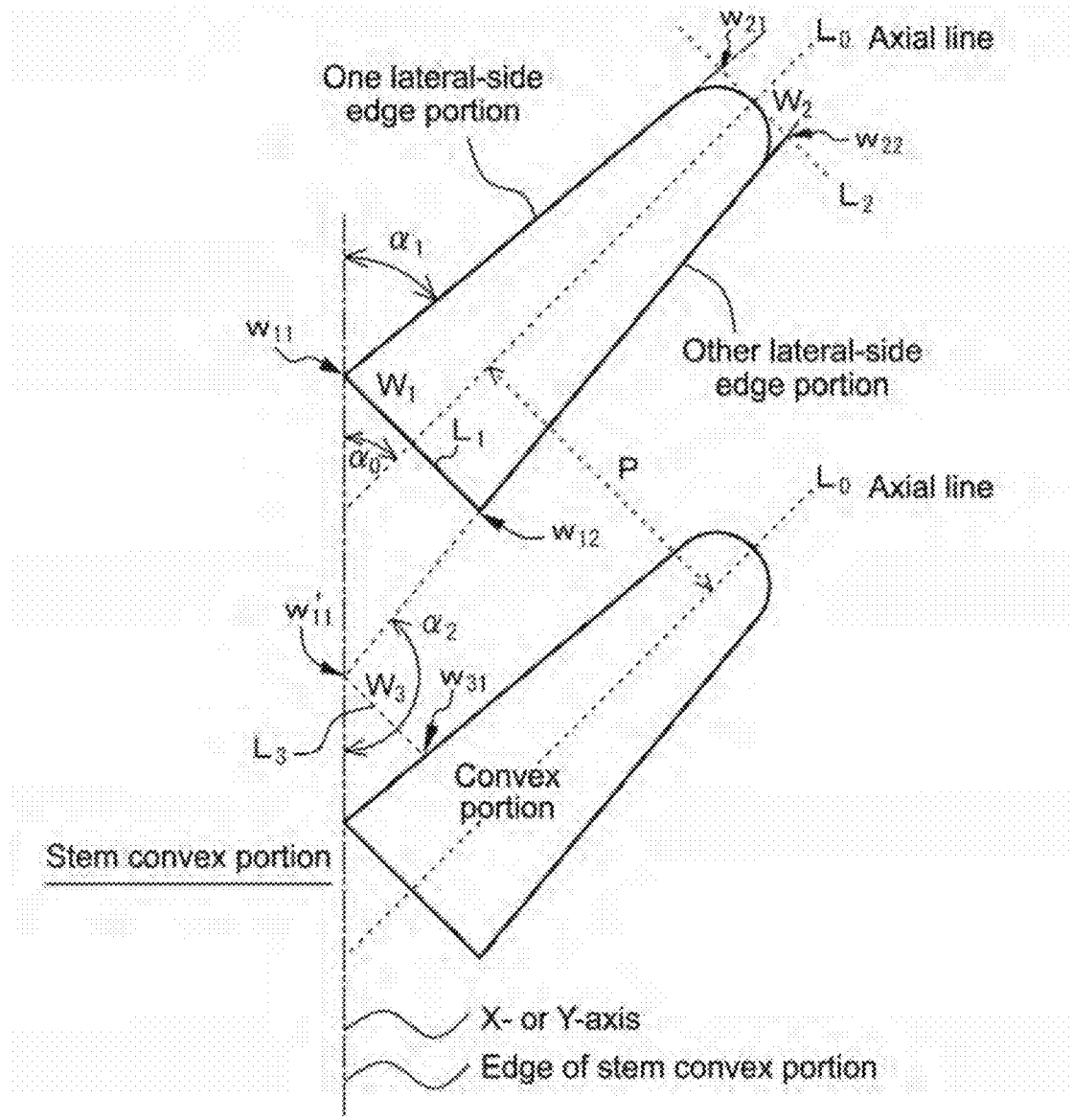
Figure 50A:
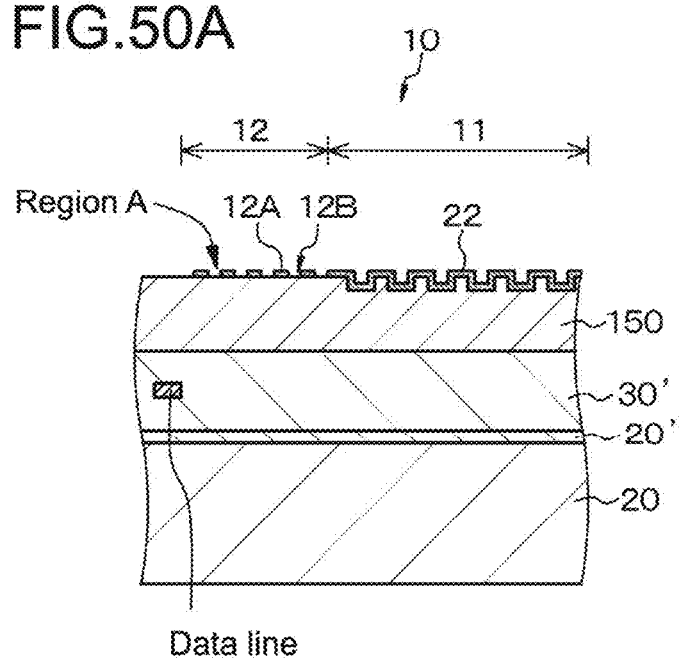
FIGS. 50A and 50B are diagrams for describing a problem in a conventional liquid-crystal display apparatus.
Figure 50B:
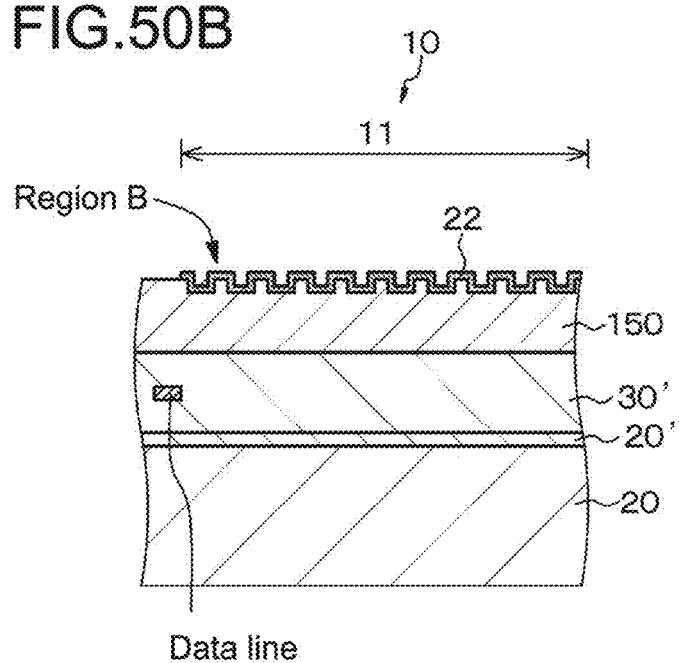

In the liquid-crystal display apparatus or the like of the present disclosure including the above-mentioned favorable embodiments and configurations, as described above, it is possible to employ an embodiment in which the width of the branch convex portion is largest in the part of the branch convex portion that is joined to the stem convex portion or a part of the branch convex portion in the X-axis or in the vicinity thereof or in the Y-axis or in the vicinity thereof (for the sake of convenience, referred to as "root of the branch convex portion") and decreases toward the peripheral portion of the pixel, that is, the tip end portion of the branch convex portion. Here, it is assumed that a formation pitch of the branch convex portions is denoted by "P", a width of the root of the branch convex portion is denoted by "$W_1$", and a width of the tip end portion of the branch convex portion is denoted by "$W_2$". As shown in FIGS. 48 and 49, assuming that an angle formed by an edge of the stem convex portion in which the stem convex portion and the branch convex portion are joined to each other and one edge portion (lateral-side edge portion) of the branch convex portion (angle formed by the X-axis or the Y-axis and one edge portion (lateral-side edge portion) of the branch convex portion) is denoted by $\alpha_1$ and an angle formed by an outer edge of the stem convex portion in which the stem convex portion and the branch convex portion are joined to each other and the other lateral-side edge portion of the branch convex portion (or angle formed by the X-axis or the Y-axis and the other lateral-side edge portion of the branch convex portion) is denoted by $\alpha_2$, an angle $\alpha_0$ formed by an axial line $L_0$ of the branch convex portion and the outer edge of the stem convex portion in the vicinity of the outer edge of the stem convex portion (or angle formed by the X-axis or the Y-axis and the axial line $L_0$ of the branch convex portion) can be expressed as follows:

$$\alpha_0=\{\alpha_1+(180-\alpha_2)\}/2.$$

It should be noted that $0<\alpha_1\leq90$ degrees and $90\leq\alpha_2<180$ degrees are established. In such a case, assuming that an intersection point of the outer edge of the stem convex portion and the one lateral-side edge portion of the branch convex portion (or the intersection point of the X-axis or the Y-axis and the one lateral-side edge portion of the branch convex portion) is denoted by $w_{11}$, an intersection point of the X-axis or the Y-axis and the other lateral-side edge portion of the branch convex portion is denoted by $w'_{11}$, and a point at which a straight line $L_1$ that passes through the intersection point $w_{11}$ and is orthogonal to the axial line $L_0$ of the branch convex portion intersects the other lateral-side edge portion of the branch convex portion is denoted by $w_{12}$, a distance between the intersection point $w_{11}$ and the intersection point $w_{12}$ is defined as the width $W_1$ of the root of the branch convex portion. Further, assuming that an intersection point of a straight line $L_2$ that is a straight line orthogonal to the axial line $L_0$ of the branch convex portion and is in contact with the tip end portion of the branch convex portion and the one lateral-side edge portion of the branch convex portion (or intersection point with an extension line of the one lateral-side edge portion of the branch convex portion) is denoted by $w_{21}$ and an intersection point of the straight line $L_2$ and the other lateral-side edge portion of the branch convex portion (or intersection point with an extension line of the other lateral-side edge portion of the branch convex portion) is denoted by $w_{22}$, a distance between the intersection point $w_{21}$ and the intersection point $w_{22}$ is defined as the width $W_2$ of the tip end portion of the branch convex portion. Note that, in FIG. 49, the extension lines of the lateral-side edge portions are indicated by the long dashed short dashed lines. In addition, a distance between axial lines $L_0$ of adjacent branch convex portions is defined as a formation pitch P of the branch convex portions. Further, assuming that a point at which a straight line $L_3$ that passes the intersection point $w'_{11}$ and is parallel to the straight line $L_1$ intersects the one lateral-side edge portion of the branch convex portion that is opposed to (adjacent to) the other lateral-side edge portion of the branch convex portion is $w_{31}$, a distance between the intersection point $w'_{11}$ and the intersection point $w_{31}$ is defined as a distance $W_3$ between the branch convex portions. An entire taper width TP of the branch convex portion can be defined as $$TP=W_1-W_2.$$

Further, an average width $W_{ave1}$ of the branch convex portions and an average width $W_{ave2}$ of the concave portions can be expressed as follows:

$$W_{ave1}=(W_1W_2)/2$$

$$W_{ave2}=P-W_{ave1}.$$

Here, 1 µm to 10 µm, favorably, 2 µm to 5 µm can be exemplified as the value of $W_3$, 1 µm to 10 µm, favorably, 2 µm to 5 µm can be exemplified as the value of $W_2$, and 2 µm to 20 µm, favorably, 2 µm to 10 µm can be exemplified as the value of P. Further, 0.1 to 10 times $W_3$ can be exemplified as the value of TP. Note that those values only need to be applied to a branch convex portion having a largest length.

In the liquid-crystal display apparatus or the like of the present disclosure including the above-mentioned favorable embodiments and configurations, although it depends on configurations and structures, it is possible to employ an embodiment in which an alignment restriction portion is formed in a portion of the second electrode, which corresponds to the stem convex portion. By forming the alignment restriction portion in the portion of the second electrode, which corresponds to the stem convex portion, an electric field generated by the second electrode is distorted in the vicinity of the alignment restriction portion or the falling direction of the liquid-crystal molecules in the vicinity of the alignment restriction portion is defined. As a result, it is possible to increase the alignment regulation force for the liquid-crystal molecules in the vicinity of the alignment restriction portion, and it is possible to accurately define the tilt state of the liquid-crystal molecules in the vicinity of the alignment restriction portion. Therefore, the occurrence of the problem in that dark lines may be, when an image is displayed, generated in a portion of the image, which corresponds to the stem convex portion, can be reliably suppressed. That is, it is possible to provide a liquid-crystal display apparatus capable of providing a more uniform and higher light transmittance while keeping a favorable voltage response characteristic. It is possible to achieve a cost reduction and a reduction in power consumption of a light source that constitutes a back light. Further, it is also possible to achieve an improvement of the reliability of the TFT.

Here, it is possible to employ an embodiment in which the alignment restriction portion is formed of a second-electrode slit structure provided in the second electrode. Alternatively, it is possible to employ an embodiment in which the alignment restriction portion is formed of a second-electrode protrusion portion provided in the second electrode. Alternatively, the alignment restriction portion can also be constituted of a portion of the second electrode that is formed in a protrusion-shape. The second-electrode protrusion portion is formed of, for example, a resist material and the second electrode is not formed thereon. For providing the portion of the second electrode that is formed in the protrusion-shape, it is only necessary to form a convex portion below the second electrode. It is also possible to provide the portion of the second electrode that is formed in the protrusion-shape by a method similar to the formation method for the convex portion in the first electrode. It is desirable that a width of the second-electrode slit structure, the second-electrode protrusion portion, or the portion of the second electrode that is formed in the protrusion-shape is smaller than the width of the stem convex portion.

Further, in the liquid-crystal display apparatus or the like of the present disclosure including the above-mentioned favorable embodiments and configurations, although it depends on configurations and structures, it is possible to employ an embodiment in which a first-electrode slit structure or a first-electrode protrusion portion that passes through the pixel center and is parallel to the pixel peripheral portion is formed in the first electrode. By forming the first-electrode slit structure or the first-electrode protrusion portion that passes through the pixel center and is parallel to the pixel peripheral portion in the first electrode, that is, forming, for example, the first-electrode slit structure or the first-electrode protrusion portion in the stem convex portion, the electric field generated by the first electrode is distorted in the vicinity of the first-electrode slit structure or the falling direction of the liquid-crystal molecules in the vicinity of the first-electrode protrusion portion is defined in comparison with the case where a flat concave portion in which the first-electrode slit structure or the first-electrode protrusion portion is not present is formed in the first electrode. As a result, it is possible to increase the alignment regulation force for the liquid-crystal molecules in the vicinity of the first-electrode slit structure or the first-electrode protrusion portion and it is possible to accurately define the tilt state of the liquid-crystal molecules in the vicinity of the first-electrode slit structure or the first-electrode protrusion portion. Therefore, the occurrence of the problem in that dark lines may be, when an image is displayed, generated in a portion of the image, which corresponds to the stem convex portion, can be reliably suppressed. That is, it is possible to provide a liquid-crystal display apparatus capable of providing a more uniform and higher light transmittance while keeping a favorable voltage response characteristic. It is possible to achieve a cost reduction and a reduction in power consumption of a light source that constitutes a back light. Further, it is also possible to achieve an improvement of the reliability of the TFT.

The first-electrode protrusion portion is formed of, for example, a resist material and the first electrode is not formed thereon. Alternatively, it is possible to employ an embodiment in which a radial (e.g., cross-shaped) convex portion passing through the pixel center is formed in the first electrode while being surrounded by the concave portion. Such a radial convex portion can be provided by forming a radial convex portion below the first electrode or may be provided by the method similar to the formation method for the convex portion in the first electrode. Alternatively, a radial (e.g., cross-shaped) concave portion passing through the pixel center may be provided instead of the first-electrode slit structure or the first-electrode protrusion portion (rib).

Note that the first-electrode slit structure and the first-electrode protrusion portion (rib) can also be combined with the alignment restriction portion.

In the liquid-crystal display apparatus or the like of the present disclosure including the above-mentioned favorable embodiments and configurations, although it depends on configurations and structures, it is possible to employ a configuration in which a extending direction of a lateral-side portion of the stem convex portion that is not joined to the branch convex portion is not parallel to the X-axis and is not parallel to the Y-axis. That is, the extending direction of the lateral-side portion of the stem convex portion that is not joined to the branch convex portion is a direction different from those of the X-axis and the Y-axis. With such a configuration, generation of dark lines in a region corresponding to the X-axis and the Y-axis can be suppressed. As a result, it is possible to provide a liquid-crystal display apparatus capable of providing a more uniform and higher light transmittance. Further, it is possible to provide a liquid-crystal display apparatus having a configuration and a structure by which a pretilt can be given to the liquid-crystal molecules in short time.

It is possible to employ an embodiment in which the lateral-side portion of the stem convex portion that is not joined to the branch convex portion has a linear shape and/or a curved shape. In other words, it is possible to employ an embodiment in which the lateral-side portion of the stem convex portion has a linear shape, a curved shape, or a combination of the linear shape and the curved shape. Alternatively, it is possible to employ an embodiment in which a width of the portion of the stem convex portion that is not joined to the branch convex portion decreases toward a tip end portion of the stem convex portion.

In the liquid-crystal display apparatus or the like of the present disclosure including the above-mentioned various favorable embodiments and configurations, it is possible to employ an embodiment in which the liquid-crystal molecules have a negative dielectric anisotropy, though not limited thereto. Depending on a driving method for the liquid-crystal display apparatus, it is also possible to employ an embodiment in which the liquid-crystal molecules have a positive dielectric anisotropy.

The liquid-crystal display apparatus or the like of the present disclosure or a liquid-crystal display device can be obtained in accordance with a manufacturing method for a liquid-crystal display apparatus or a liquid-crystal display device, the method including the steps of:

forming a first electrode on a first substrate and forming a first alignment film on an opposed surface of the first substrate that is opposed to a second substrate and on the first electrode;

forming a second electrode on the second substrate and forming a second alignment film on an opposed surface of the second substrate that is opposed to the first substrate and on the second electrode;

disposing the first substrate and the second substrate such that the first alignment film and the second alignment film are opposed to each other and sealing a liquid-crystal layer between the first alignment film and the second alignment film; and applying a predetermined electric field on the liquid-crystal layer and provisionally giving a pretilt to liquid-crystal molecules, and then fixing a pretilt state of the liquid-crystal molecules in a state in which the application of the electric field on the liquid-crystal layer is suspended, and aligning the liquid-crystal molecules.

In this case, it is favorable to apply the electric field such that the liquid-crystal molecules are arrayed obliquely to a surface of at least one substrate of the pair of substrates. Note that, basically, an azimuthal angle (declination) of the liquid-crystal molecules in giving the pretilt is defined by the intensity and direction of the electric field and a polar angle (zenith angle) is defined by the intensity of the electric field. In some cases, the azimuthal angle (declination or polar angle (zenith angle) of the liquid-crystal molecules in giving the pretilt can also be further defined by a molecule structure of an alignment film material.

The step of aligning the liquid-crystal molecules includes a step of fixing the pretilt state of the liquid-crystal molecules by causing the alignment control material to react in the liquid-crystal layer containing the liquid-crystal molecules and a polymerizable monomer (alignment control material). Such a manufacturing method for a liquid-crystal display apparatus is called PSA method (Polymer Stabilized Alignment method). Alternatively, the step of aligning the liquid-crystal molecules includes a step of forming an alignment film containing a polymerizable monomer (alignment control material having photosensitive group or cross-linking photosensitive group) on an opposed surface and an electrode of at least one substrate and causing the alignment control material to react, to thereby fix the pretilt state of the liquid-crystal molecules. Such a manufacturing method for a liquid-crystal display apparatus is called FPA method (Field-induced Photo-reactive Alignment method).

The pair of substrates are constituted of a substrate including a pixel electrode and a substrate including an opposed electrode. For example, it is only necessary to use the first substrate as the substrate including the pixel electrode and use the substrate including the opposed electrode as the second substrate. The color filter layer is formed on the side of the substrate (second substrate) including the opposed electrode or the color filter layer is formed on the side of the substrate (first substrate) including the pixel electrode. A control circuit formed of a TFT and the like for controlling and driving a pixel is provided in the substrate (first substrate) including the pixel electrode. Note that a layer including the control circuit formed of the TFT and the like for driving the pixel will be sometimes referred to as a "TFT layer". In the case where the color filter layer is formed on the side of the substrate (second substrate) including the opposed electrode, a smoothing film corresponding to the base layer is formed on the TFT layer and the first electrode is formed on the smoothing film. On the other hand, in the case where the color filter layer is formed on the side of the substrate (first substrate) including the pixel electrode, the color filter layer is formed on the TFT layer and the first electrode is formed on the color filter layer (corresponding to base layer), on an overcoat layer (corresponding to base layer) formed on the color filter layer, or on a passivation film (corresponding to base layer) formed of an inorganic material. In the case where the pixel is constituted of a plurality of sub-pixels in the liquid-crystal display apparatus, it is only necessary to replace the pixel by the sub-pixels. The first electrode and the second electrode only need to be formed of a transparent conductive material having transparency, for example, ITO (indium tin oxide), IZO, ZnO, or SnO. Further, the second electrode can be a so-called solid electrode (electrode not subjected to patterning). For example, a first polarization plate is bonded to an outer surface of the first substrate and a second polarization plate is bonded to an outer surface of the second substrate. The first polarization plate and the second polarization plate are disposed such that absorption axes thereof are orthogonal to each other. It is favorable to employ an embodiment in which the absorption axis of the first polarization plate is parallel to the X-axis or the Y-axis and the absorption axis of the second polarization plate is parallel to the Y-axis or the X-axis, though not limited thereto.

The liquid-crystal display apparatus is illuminated by a well-known planar light source apparatus (back light). The planar light source apparatus may be a direct-type planar light source apparatus or may be an edge light-type (also called side light-type) planar light source apparatus. Here, the direct-type planar light source apparatus is constituted of, for example, a light source disposed within a casing, a reflection member that is disposed in a portion of the casing that is positioned below the light source and upwardly reflects light emitted from the light source, and a diffusion plate that is attached to a casing aperture positioned above the light source and causes light emitted from the light source and reflection light from the reflection member to pass therethrough in a diffused state. On the other hand, the edge light-type planar light source apparatus is constituted of, for example, a light guiding plate and a light source disposed on a side surface of the light guiding plate. A reflection member is disposed below the light guiding plate and a diffusion sheet and a prism sheet are disposed above the light guiding plate. The light source is, for example, formed of a cold-cathode fluorescent lamp and emits white light. Alternatively, for example, it is formed of a light-emitting device such as an LED and a semiconductor laser device. An image can be displayed in the liquid-crystal display apparatus by the liquid-crystal display apparatus controlling passage of light from the planar light source apparatus (back light).

Note that, in some alignment states of the liquid-crystal molecules, light from the planar light source apparatus may pass through the liquid-crystal layer, which may result in a non-uniform image contrast (light transmittance of the liquid-crystal layer) of a portion of the pixel. In such a case, it is favorable to provide a light-shielding region to prevent light from entering such a portion of the pixel. In some cases, it is also possible to employ an embodiment in which a wiring layer also serves as the light-shielding region.

It is needless to say that the above-mentioned various favorable embodiments and configurations are applicable to the liquid-crystal display apparatuses according to the first to third aspects of the present disclosure in a method of giving a pretilt to liquid-crystal molecules of the present disclosure.

Example 1

Figure 2:
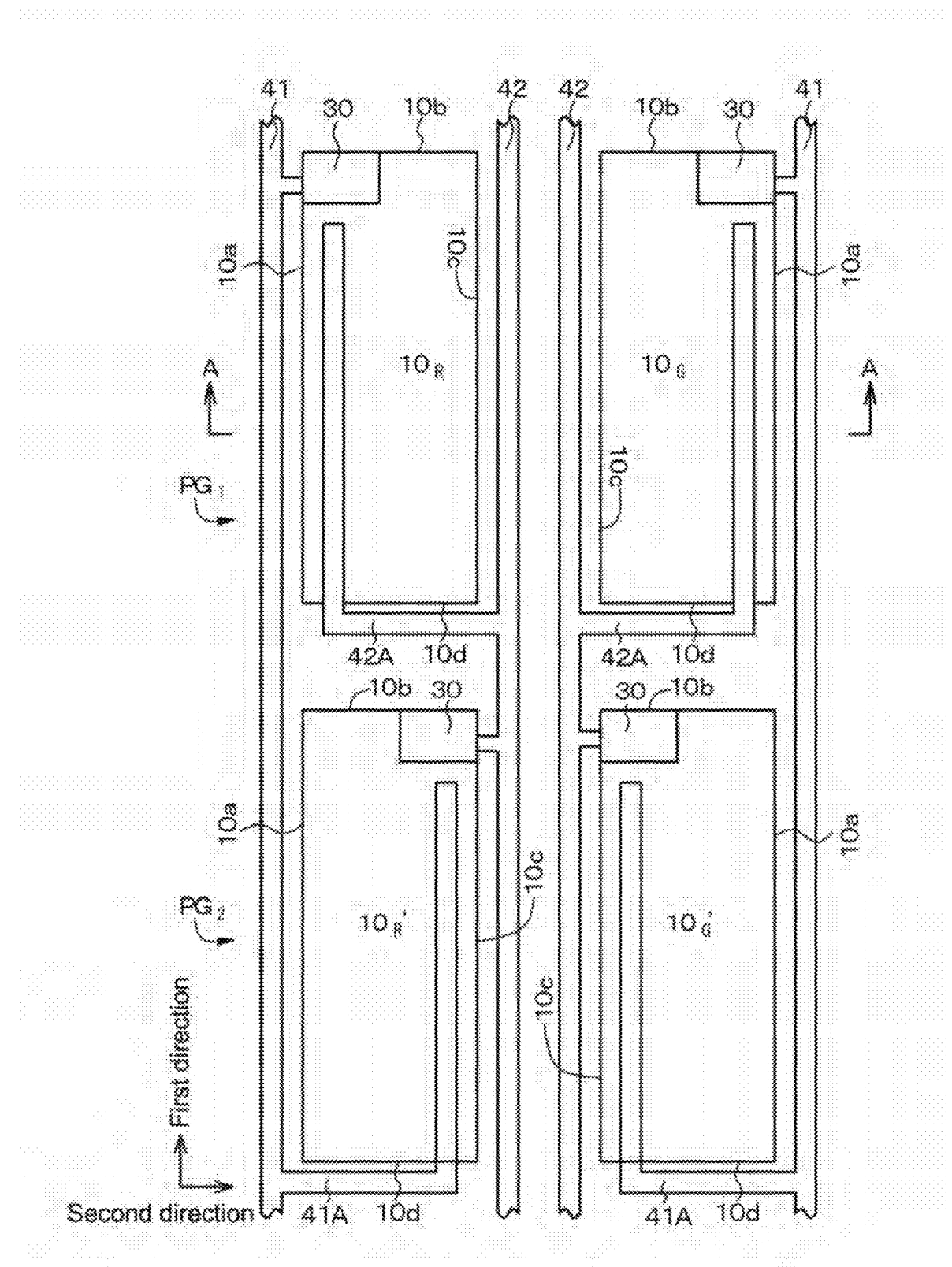
FIG. 2 is a diagram conceptually showing an arrangement state of 2×2 (=4) pixels, the driving circuit, the data line, and the data line extension in the liquid-crystal display apparatus of Example 1.
Figure 3:
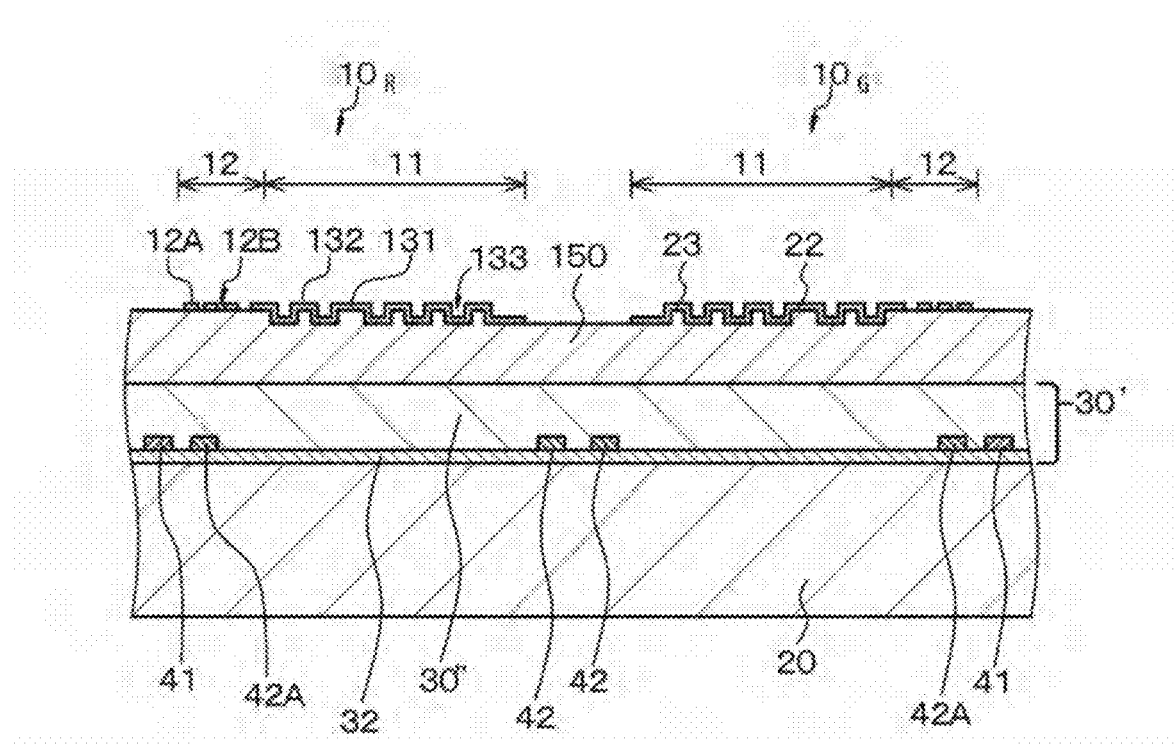
FIG. 3 is a schematic partial sectional view of a first substrate and the like that is taken along the arrow A-A of FIG. 2 in the liquid-crystal display apparatus of Example 1.
Figure 4:
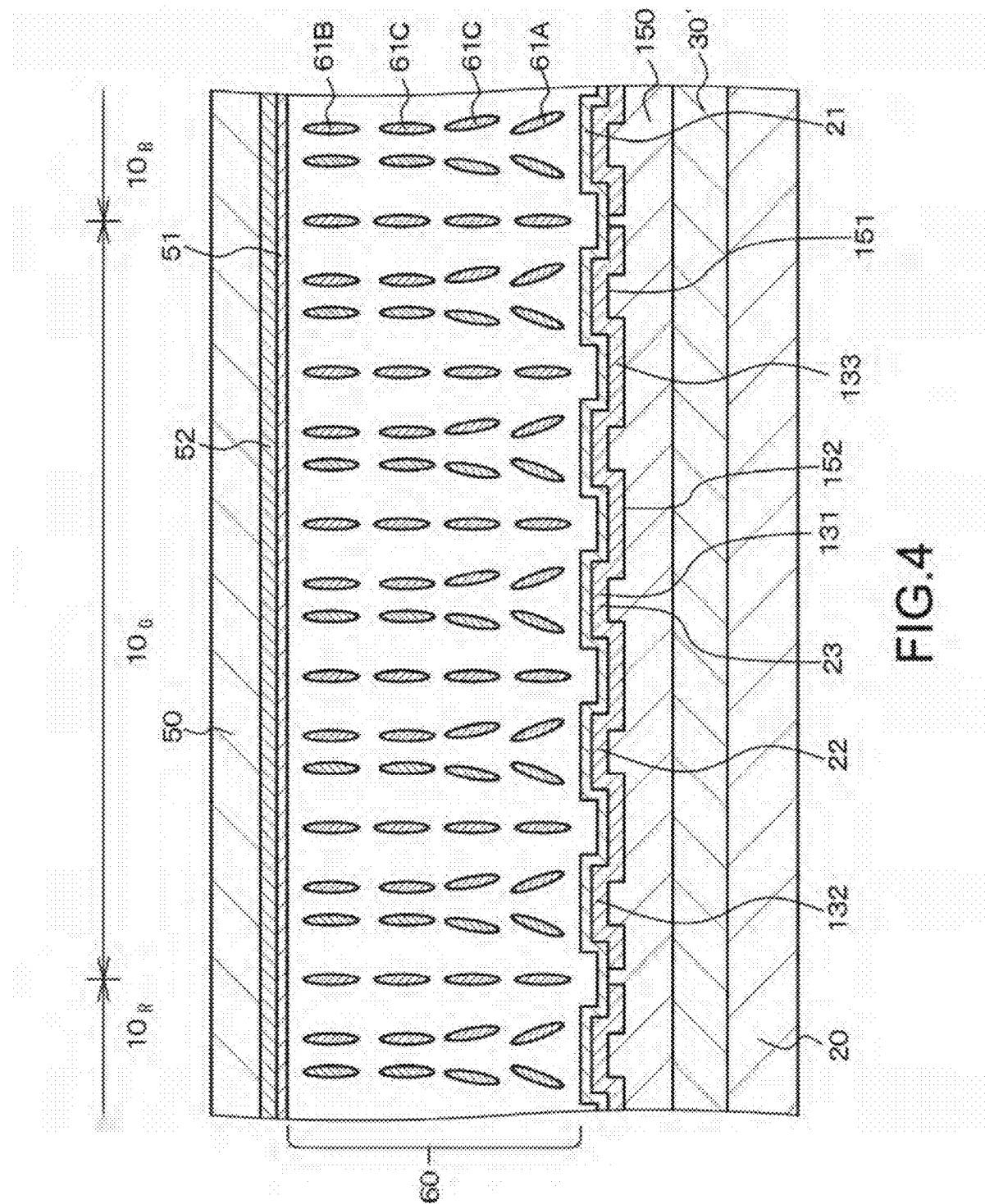
FIG. 4 is a schematic partial sectional view of the liquid-crystal display apparatus of Example 1.
Figure 5:
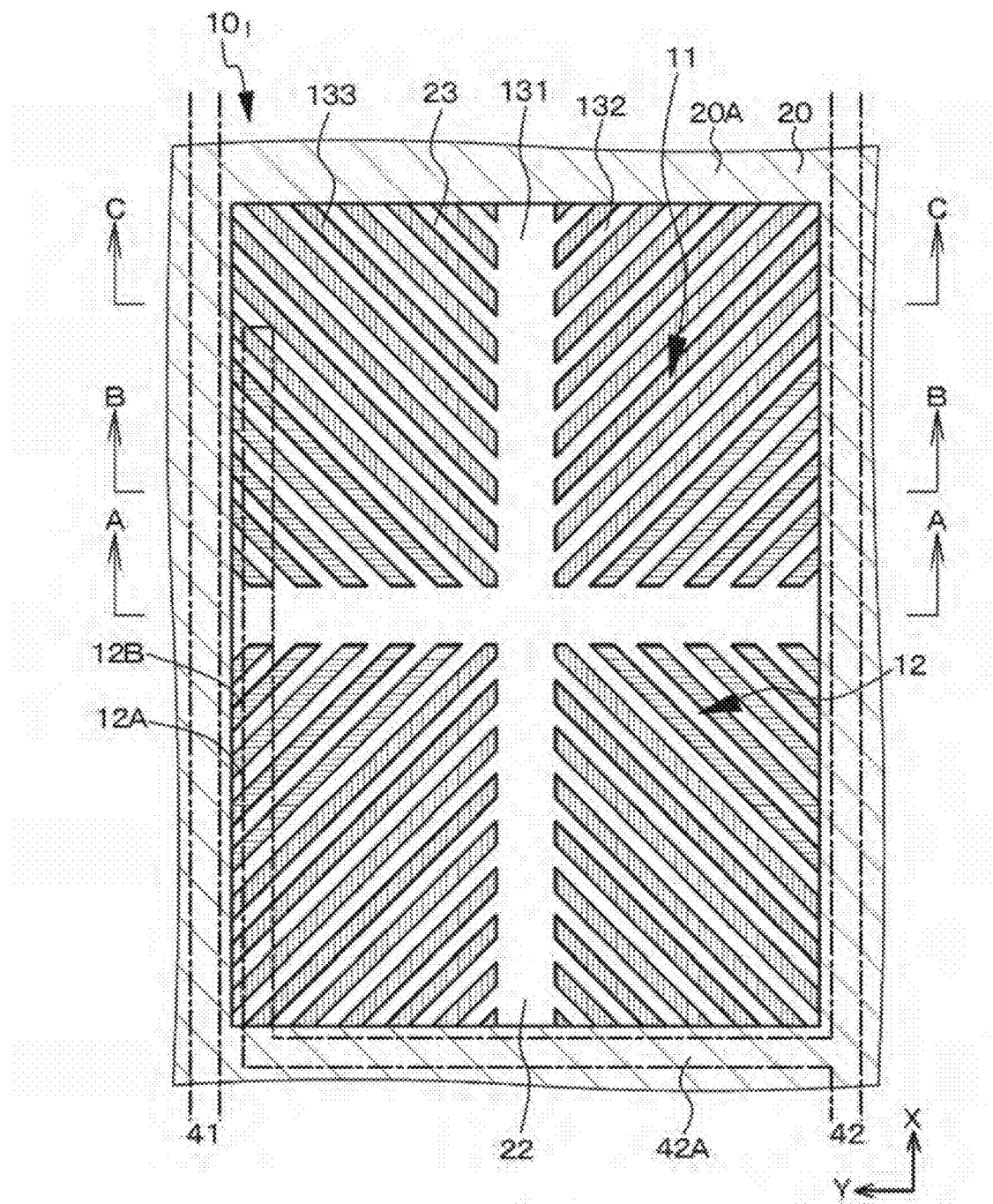
FIG. 5 is a schematic view as one pixel in the first substrate is viewed from above, in the liquid-crystal display apparatus of Example 1.
Figure 6:
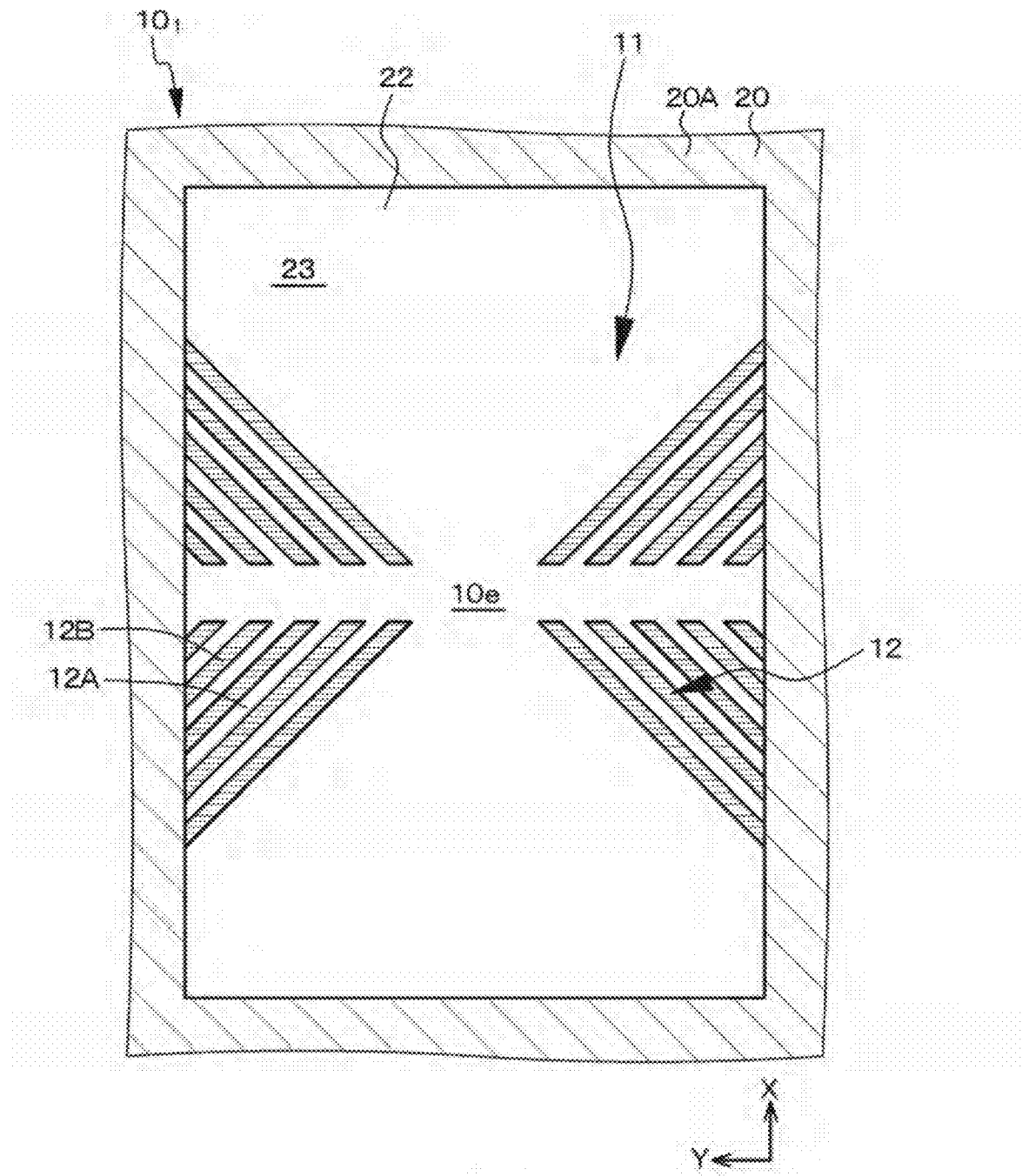
FIG. 6 is a diagram schematically showing a pattern of a first electrode that constitutes the one pixel in the liquid-crystal display apparatus of Example 1.
Figure 7:
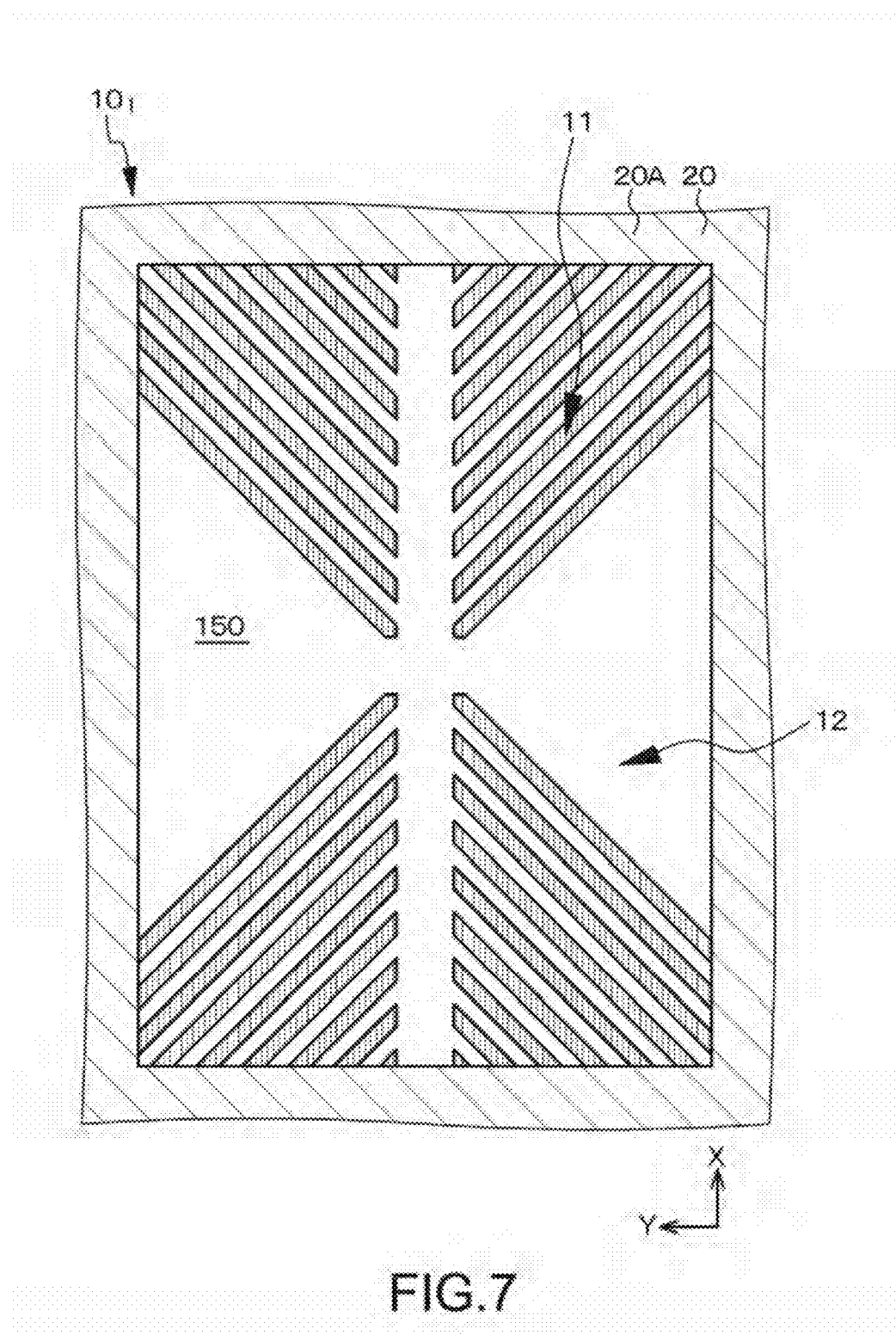
FIG. 7 is a diagram schematically showing an irregularities formation state of a base layer that constitutes the one pixel in the liquid-crystal display apparatus of Example 1.
Figure 8A:
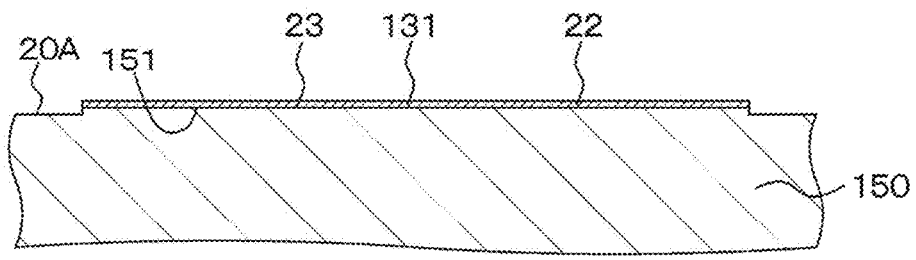
FIGS. 8A, 8B, and 8C are schematic end views of a portion of the first electrode that is taken along the arrow A-A, the arrow B-B, and the arrow C-C of FIG. 5, respectively.
Figure 8B:
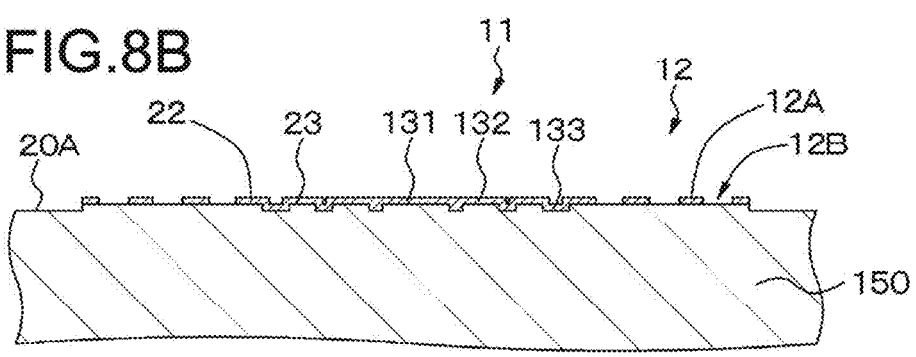
Figure 8C:
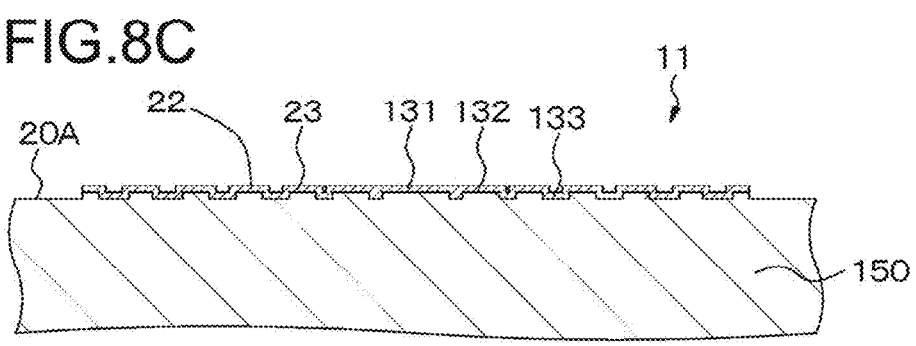

Example 1 relates to the liquid-crystal display apparatus according to the first aspect of the present disclosure, specifically, the liquid-crystal display apparatus according to the first(A) aspect of the present disclosure. In the liquid-crystal display apparatus of Example 1, an arrangement state of 4×4 (=16) pixels, driving circuits, data lines, and data line extensions is conceptually shown in FIG. 1. An arrangement state of 2×2 (=4) pixels, driving circuits, data lines, and data line extensions is schematically shown in FIG. 2 in an enlarged state. A schematic partial sectional view of a first substrate and the like that is taken along the arrow A-A of FIG. 2 is shown in FIG. 3. Further, a schematic partial sectional view of the liquid-crystal display apparatus of Example 1 is shown in FIG. 4. A schematic view of one pixel $10_1$ in the first substrate as viewed from above is shown in FIG. 5. A pattern of the first electrode 22 (transparent conductive material layer) that constitutes the one pixel $10_1$ is schematically shown in FIG. 6. An irregularities formation state of a base layer that constitutes the one pixel $10_1$ is schematically shown in FIG. 7. In addition, FIGS. 8A, 8B, and 8C show schematic end views of portions of the first electrode that are taken along the arrow A-A, the arrow B-B, and the arrow C-C of FIG. 5. Further, a schematic partial end view of the first substrate on which the driving circuit and the like and the first electrode are formed is shown in each of FIGS. 9A and 9B. In FIG. 5, the data lines are indicated by the long dashed short dashed lines.

The liquid-crystal display apparatus of Example 1 or any one of liquid-crystal display apparatuses of Examples 2 to 13 to be described later includes:

a first substrate 20; and a second substrate 50, in which a plurality of pixels 10 are arranged between the first substrate 20 and the second substrate 50 in a two-dimensional matrix form in a first direction and a second direction extending in a direction orthogonal to the first direction, and each pixel 10 has a rectangular shape including a first side 10a extending in the first direction, a third side 10c opposed to the first side 10a, a second side 10b extending in the second direction, and a fourth side 10d opposed to the second side 10b, and includes a first electrode (pixel electrode) 22 formed in an opposed surface of the first substrate 20 that is opposed to the second substrate 50, a first alignment film 21 that covers the first electrode 22 and the opposed surface of the first substrate 20, a second electrode (opposed electrode) 52 formed in an opposed surface of the second substrate 50 that is opposed to the first substrate 20, a second alignment film 51 that covers the second electrode 52 and the opposed surface of the second substrate 50, and a liquid-crystal layer 60 that is provided between the first alignment film 21 and the second alignment film 51 and contains liquid-crystal molecules 61, 61A, 61B, and 61C.

In the liquid-crystal display apparatus of Example 1 or any one of the liquid-crystal display apparatuses of Examples 2 to 13 to be described later, in each pixel 10, a pretilt is given to the liquid-crystal molecules 61, a slit region 12 is formed in the first electrode 22 and a concave and convex portion 11 is formed in a region of the first electrode 22 in which the slit region 12 is not formed, and each pixel further includes, on the first substrate 20, a control circuit (specifically, thin-film transistor, TFT 30) that controls application of a voltage on the first electrode 22.

Here, a pretilt is given to the liquid-crystal molecules 61 on the side of at least the first electrode 22, and the liquid-crystal molecules 61 have a negative dielectric anisotropy. The first electrode 22 is formed of a base layer 150 including the concave and convex portion and transparent conductive material layers 23. Specifically, the transparent conductive material layers 23 are formed on the concave and convex portion of the base layer 150. The reference numeral 20A is a portion of the first substrate 20 that is positioned between pixels. Within a pixel, all the transparent conductive material layers 23 are connected to any of the transparent conductive material layers 23. The reference numeral 151 indicates a convex-portion top surface. The reference numeral 152 indicates a concave-portion bottom surface.

In the liquid-crystal display apparatus of Example 1, the plurality of pixels arrayed in the first direction are constituted of a first pixel group $PG_1$ constituted of a plurality of odd-numbered pixels $10_R$ (that emit red light), $10_G$ (that emit green light), and $10_B$ (that emit blue light), and a second pixel group $PG_2$ constituted of a plurality of even-numbered pixels $10_R'$ (that emit red light), $10_G'$ (that emit green light), and $10_B'$ (that emit blue light), in the vicinity of the first sides 10a in the plurality of pixels arrayed in the first direction, a first data line 41 that extends in the first direction and is for applying a voltage on the first electrode 22 via the control circuit is provided closer to the first substrate than the first electrode 22, in the vicinity of the third sides 10c in the plurality of pixels arrayed in the first direction, a second data line 42 that extends in the first direction and is for applying a voltage on the first electrode 22 via the control circuit is provided closer to the first substrate than the first electrode 22, and the slit region 12 is disposed above the first data line 41 and the second data line 42.

In each pixel that constitutes the first pixel group $PG_1$, a second data line extension 42A extending from the second data line 42 is provided adjacent to the first data line 41, and in each pixel that constitutes the second pixel group $PG_2$, a first data line extension 41A extending from the first data line 41 is provided adjacent to the second data line 42.

Here, it is favorable to satisfy $0.02 L_{S-1}/L_{PX-1} \leq 0.5$, and specifically, $L_{S-1}/L_{PX-1} = 0.38$ was set.

A projection image of the first electrode 22 to the first substrate 20 does not include projection images of the first data line 41 and the second data line 42 to the first substrate 20 (or a projection image of a data line 43 to be described later). That is, the first data line 41 and the second data line 42 (or the data line 43 to be described later) overlaps a projection image of a black matrix. The first data line extension 41A extends from the first data line 41. The first data line extension 41A is constituted of a first portion extending in the second direction and a second portion extending in the first direction from the first portion. The second portion is provided adjacent to the second data line 42. The second data line extension 42A extends from the second data line 42. The second data line extension 42A is constituted of the first portion extending in the second direction and the second portion extending in the first direction from the first portion. The second portion is provided adjacent to the first data line 41. A planar shape of the first data line extension 41A and the second data line extension 42A is an "L"-shape. A projection image of the second portion to the first substrate 20 is included in a projection image of the first electrode 22 to the first substrate 20. Further, in Example 1, the projection image of the first portion to the first substrate 20 is not included in the projection image of the first electrode 22 to the first substrate 20. That is, the first portion overlaps the projection image of the black matrix.

In the liquid-crystal display apparatus of Example 1 or any one of the liquid-crystal display apparatuses of Examples 2 to 13 to be described later, in each pixel, the slit region 12 extends toward the first side 10a from a pixel center 10e, extends toward the third side 10c from the pixel center 10e, extends toward the second side 10b from the pixel center 10e, and extends toward the fourth side 10d from the pixel center 10e.

Specifically, in the liquid-crystal display apparatus of Example 1 or any one of the liquid-crystal display apparatuses of Examples 2 to 13 to be described later, in each pixel 10, the slit region 12 extends toward the first side 10a from the pixel center 10e (in some cases, extends up to the first side 10a), extends toward the third side 10c from the pixel center 10e (in some cases, extends up to the third side 10c), extends halfway between the pixel center 10e and the second side 10b toward the second side 10b, and extends halfway between the pixel center 10e and the fourth side 10d toward the fourth side 10d.

In the liquid-crystal display apparatus of Example 1, a planar shape of the slit region 12 is approximately a shape of two isosceles triangles arranged in parallel with each other. Specifically, the slit region 12 has such a shape that vertices of the two isosceles triangles occupy approximately the pixel center 10e and bottom sides of the two isosceles triangles overlaps the first side 10a and the third side 10c, respectively. The same applies to Example 3 and Example 4 to be described later. Further, the slit region 12 is formed in a convex portion region of the base layer 150. The same applies to the following examples.

In addition, in the liquid-crystal display apparatus of Example 1, assuming that an axial line passing through the pixel center 10e of each pixel 10 and extending parallel to the first direction is an X-axis and an axial line passing through the pixel center 10e of each pixel 10 and extending parallel to the second direction is a Y-axis, in each pixel 10, the concave and convex portion 11 is constituted of a stem convex portion (main convex portion) 131 extending on the X-axis and the Y-axis and a plurality of branch convex portions (sub-convex portion) 132 extending toward a peripheral portion of the pixel from lateral sides of the stem convex portion 131.

Note that, in the schematic view of the one pixel in the first substrate 20 as viewed from above, in order to clearly discriminate the convex portions 131 and 132 from concave portions 133, the concave portions are hatched with thin, vertical lines. Further, in the slit region 12, in order to discriminate a space portion 12B positioned between, for example, line portions 12A and 12A, the space portion 12B is hatched with thin, horizontal lines. The same applies hereinafter. In the space portion 12B, the base layer 150 to be described later is exposed.

In the liquid-crystal display apparatus of Example 1, assuming that the axial line passing through the pixel center 10e of each pixel 10 and extending parallel to the first direction is the X-axis and the axial line passing through the pixel center 10e of each pixel 10 and extending parallel to the second direction is the Y-axis, a plurality of branch convex portions 132 occupying a first quadrant extend parallel to a direction in which a value of a Y-coordinate increases when a value of a X-coordinate increases, a plurality of branch convex portions 132 occupying a second quadrant extend parallel to a direction in which the value of the Y-coordinate increases when the value of the X-coordinate decreases, a plurality of branch convex portions 132 occupying a third quadrant extend parallel to a direction in which the value of the Y-coordinate decreases when the value of the X-coordinate decreases, and a plurality of branch convex portions 132 occupying a fourth quadrant extend parallel to a direction in which the value of the Y-coordinate decreases when the value of the X-coordinate increases. By employing such a multi-domain electrode structure, a region in which the branch convex portions extend in different directions is formed within one pixel, and hence it is possible to achieve an improvement in the viewing-angle characteristic.

Note that, although not limited thereto, the plurality of branch convex portions 132 occupying the first quadrant extend with an axial line thereof forming 45 degrees together with the X-axis, the plurality of branch convex portions 132 occupying the second quadrant extend with an axial line thereof forming 135 degrees together with the X-axis, the plurality of branch convex portions 132 occupying the third quadrant extend with an axial line thereof forming 225 degrees together with the X-axis, and the plurality of branch convex portions 132 occupying the fourth quadrant extend with an axial line thereof forming 315 degrees together with the X-axis.

In the example shown in the figure, a tip end portion of one of the branch convex portions 132 is not connected to a tip end portion of an adjacent branch convex portion 132. However, the tip end portion of the branch convex portion 132 may be connected to the tip end portion of the adjacent branch convex portion 132 in the peripheral portion of the pixel. Further, it is also possible to employ a configuration in which a width of the branch convex portion 132 decreases toward the tip end portion.

The first data line 41, the second data line 42, the first data line extension 41A, and the second data line extension 42A are formed in the TFT layer 30' and constituted of an extension of one source/drain electrode 34A of the TFT 30. Note that the other source/drain electrode 34B of the TFT 30 is connected to the first electrode 22 via a connection hole 35. A gate electrode 31 of the TFT 30 is connected to the gate line. In the liquid-crystal display apparatus of Example 1, voltages are set such that a voltage (e.g., image signal voltage) $V_{D-1}$ applied on the first data line 41, a voltage (e.g., image signal voltage) $V_{D-2}$ applied on the second data line 42, and a voltage $V_2$ applied on the second electrode 52 have the following relationships, for example:

$$V_{D-1} - V_2 \geq 0 \text{ (volt)}$$

$$V_{D-2} - V_2 \leq 0 \text{ (volt)}.$$

That is, the voltage applied on the first data line 41 and the voltage applied on the second data line 42 are in inverted states in a sense when the voltage $V_2$ applied on the second electrode 52 is used as a reference. In the case where a pixel that constitutes the first pixel group $PG_1$ and a pixel that constitutes the second pixel group $PG_2$ are adjacent to each other and, in addition, those two pixels display images having the same luminance, for example, the following relationship can be exemplified:

$V_{D-1}$=18 (volt)

$V_{D-2}$=2 (volt)

$V_2$=10 (volt).

For example, it is only necessary to drive a plurality of pixels, which are arrayed in the second direction, via the gate line at the same time and then, drive a plurality of pixels, which are adjacent thereto in the second direction and arrayed in the first direction, via the gate line at the same time.

Figure 46A:
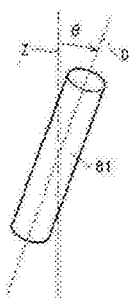
FIG. 46A is a schematic view for describing a pretilt of a liquid-crystal molecule and FIGS. 46B and 46C are conceptual diagrams showing behaviors of liquid-crystal molecules in the liquid-crystal display apparatus of Example 9.

The liquid-crystal molecules 61 can be classified into the liquid-crystal molecules 61A retained (fixed) by the first alignment film 21 in the vicinity of an interface with the first alignment film 21, the liquid-crystal molecules 61B retained by the second alignment film 51 in the vicinity of an interface with the second alignment film 51, and the liquid-crystal molecules 61C other than them. The liquid-crystal molecules 61C are positioned in a middle region in a thickness direction of the liquid-crystal layer 60. The liquid-crystal molecules 61C are arrayed such that, in a state in which a driving voltage is not applied, a long-axis direction (director) of the liquid-crystal molecules 61C is approximately perpendicular to the first substrate 20 and the second substrate 50. Here, when a driving voltage is applied, the director of the liquid-crystal molecules 61C is inclined to be parallel with the first substrate 20 and the second substrate 50 and they are aligned. Such a behavior is caused due to a characteristic that a dielectric constant of the liquid-crystal molecules 61C in the long-axis direction is lower than that in the short-axis direction. The liquid-crystal molecules 61A and 61B also have similar characteristics. Therefore, they basically exhibit behaviors similar to that of the liquid-crystal molecules 61C in a manner that depends on changes in state, that is, the application or non-application of the driving voltage. It should be noted that, the state in which the driving voltage is not applied, a pretilt $\theta_1$ is given to the liquid-crystal molecules 61A by the first alignment film 21 or a pretilt $\theta_1$ is given by a polymerizable monomer, which is mixed in the liquid-crystal in advance, and the director thereof is inclined from directions of normals of the first substrate 20 and the second substrate 50. Similarly, a pretilt $\theta_2$ is given to the liquid-crystal molecules 61B by the second alignment film 51 or a pretilt $\theta_2$ is given by the polymerizable monomer, which is mixed in the liquid-crystal in advance, and the director thereof is inclined from the directions of normals of the first substrate 20 and the second substrate 50. Note that, here, the phrase "retained (fixed)" represents the state in which the alignment of the liquid-crystal molecules 61 is restricted while the alignment films 21 and 51 do not adhere to the liquid-crystal molecules 61A and 61B. Further, assuming that a direction (direction of normal) perpendicular to the surfaces of the first substrate 20 and the second substrate 50 is denoted by Z as shown in FIG. 46A, the term "pretilt $\theta$ ($\theta_1$, $\theta_2$)" refers to an angle of inclination of a director D of the liquid-crystal molecule 61 (61A, 61B) with respect to a Z-direction in a state in which the driving voltage is not applied. The same applies to various examples to be described below.

In the liquid-crystal layer 60, the pretilts $\theta_1$ and $\theta_2$ both have a value larger than 0 degrees. In the liquid-crystal layer 60, the pretilts $\theta_1$ and $\theta_2$ may have the same angles ($\theta_1=\theta_2$) or may be different angles ($\theta_1 \neq \theta_2$). It is more favorable that the pretilts $\theta_1$ and $\theta_2$ have different angles. With this, a response speed to the application of a driving voltage is enhanced in comparison with the case where the pretilts $\theta_1$ and $\theta_2$ both have 0 degrees while a contrast approximately equivalent to that in the case where the pretilts $\theta_1$ and $\theta_2$ both have 0 degrees can be obtained. Thus, it is possible to improve the response characteristic in black display, and it is possible to enhance the contrast. In the case where the pretilts $\theta_1$ and $\theta_2$ have different angles, it is more desirable that the larger pretilt $\theta$ of the pretilts $\theta_1$ and $\theta_2$ be 1 degree or more and 4 degrees or less. By setting the larger pretilt $\theta$ to be within such a range, an especially good effect can be obtained. The same applies to the various examples to be described below.

The TFT layer 30' (described later in detail) is formed on the first substrate 20. The base layer 150 is formed on the TFT layer 30'. The first electrode 22 is formed on the base layer 150. The base layer 150 formed of an inorganic insulating material such as $SiO_2$, SiN, and SiON or formed of an organic insulating material such as a photosensitive polyimide resin and an acrylic resin, and also functions as a smoothing film. The same applies to the various examples to be described below.

The concave and convex portion can be obtained by, for example, (a) formation of a resist material layer on the smoothing film (or the color filter layer) that is the base layer (the smoothing film and the color filter layer will be collectively referred to as a "smoothing film or the like"), (b) formation of the concave and convex portion in the resist material layer by exposure/development, (c) formation of the concave and convex portion in the smoothing film or the like (base layer) by etching back the resist material layer and the smoothing film or the like (base layer), and (d) formation and patterning of the transparent conductive material layer on the smoothing film or the like (base layer).

Alternatively, the concave and convex portion can be obtained by, for example, (a) formation of a resist material layer on the base layer formed on the smoothing film or the like, (b) formation of the concave and convex portion in the resist material layer by exposure/development, (c) formation of the concave and convex portion in the base layer by etching back the resist material layer and the base layer, and (d) formation and patterning of the transparent conductive material layer on the base layer.

Alternatively, the concave and convex portion can be obtained by, for example, (a) formation of an insulating material layer on the smoothing film or the like, (b) formation of a resist material layer and patterning of the resist material layer on the insulating material layer, (c) formation of the base layer including the concave and convex portion by patterning of the insulating material layer using the resist material layer as an etching mask (the concave-portion bottom surface is constituted of the smoothing film or the like, the convex portion is constituted of the insulating material layer, and the base layer is constituted of the smoothing film or the like and the insulating material layer), and (d) formation and patterning of the transparent conductive material layer on the base layer.

Alternatively, the concave and convex portion can also be obtained, for example, by optimizing the thickness of the smoothing film and forming convex portions in the smoothing film due to an influence of the thickness of liquid-crystal display apparatus components (e.g., various signal lines, auxiliary capacitance electrodes, gate electrodes, source/drain electrodes, and various wires) that are formed on the first substrate or above the first substrate. Alternatively, the concave and convex portion can also be formed by forming concave portions and convex portions in the gate insulating layer.

The above description relating to the concave and convex portion is applicable to the various examples to be described below. Note that side surfaces (side walls) of the convex portion, the stem convex portion, or the branch convex portion may be perpendicular surfaces or may be forward tapered or reverse tapered.

A first polarization plate (not shown) is bonded to an outer surface of the first substrate 20 and a second polarization plate (not shown) is bonded to an outer surface of the second substrate 50. The first polarization plate and the second polarization plate are disposed such that absorption axes thereof are orthogonal to each other. The absorption axis of the first polarization plate is parallel to the X-axis or the Y-axis and the absorption axis of the second polarization plate is parallel with the Y-axis or the X-axis. The same applies to the following examples.

Further, a color filter layer (not shown) and a black matrix (not shown) are formed on the second substrate 50. The second electrode 52 that is a so-called solid electrode is formed thereon. The second alignment film 51 is formed on the second electrode 52. A projection image of a portion of the first substrate 20 that is positioned between the pixels 10₁ and a projection image of a pixel peripheral portion overlap the projection image of the black matrix. The same can apply to various examples to be described later.

Figure 47:
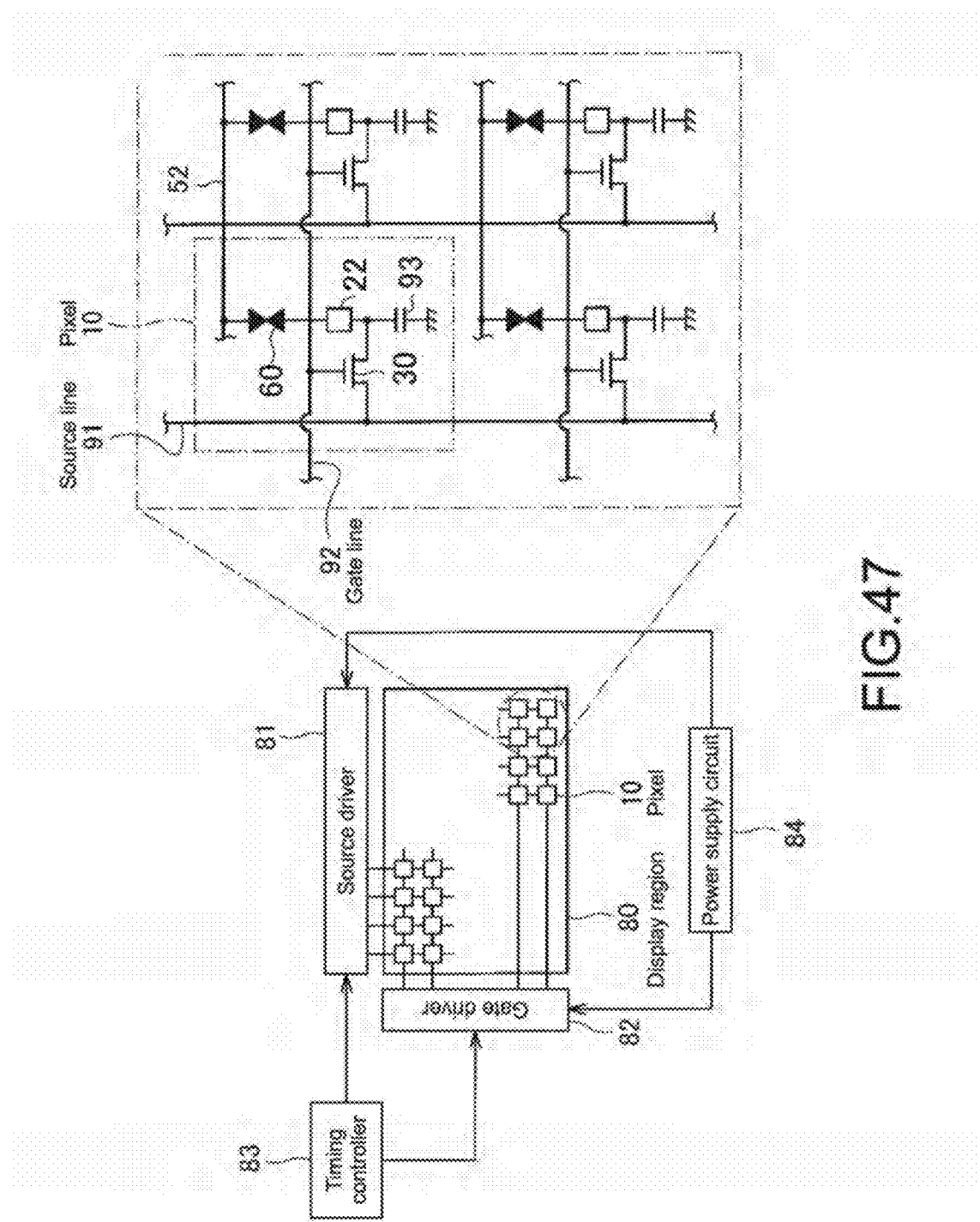
FIG. 47 is a circuit configuration diagram of the liquid-crystal display apparatus shown in FIG. 1.

FIG. 47 shows a circuit configuration in the liquid-crystal display apparatus shown in FIG. 1 or any one of the liquid-crystal display apparatuses in the various examples to be described later.

As shown in FIG. 47, the liquid-crystal display apparatus includes a liquid-crystal display device including a plurality of pixels 10 provided within a display region 80. In this liquid-crystal display apparatus, a source driver 81 and a gate driver 82, a timing controller 83 that controls the source driver 81 and the gate driver 82, and a power supply circuit 84 that supplies the source driver 81 and the gate driver 82 with electric power are provided around the display region 80.

The display region 80 is a region in which an image is displayed. The display region 80 is a region configured such that an image can be displayed in such a manner that the plurality of pixels 10 are arrayed in a matrix form. Note that, in FIG. 47, the display region 80 including the plurality of pixels 10 is shown and, in addition, a region corresponding to four pixels 10 is separately shown in an enlarged state.

In the display region 80, a plurality of source lines (data lines 41 and 42) are arrayed in a column direction (first direction) and a plurality of gate lines 92 are arrayed in a row direction (second direction). Each pixel 10 is disposed at a position at which the source line 91 and the gate line 92 intersects each other. Each pixel 10 includes a TFT 30 and a capacitor 93 as well as the first electrode 22 and the liquid-crystal layer 60. In each TFT 30, a source electrode is connected to the source line 91, a gate electrode is connected to the gate line 92, and a drain electrode is connected to the capacitor 93 and the first electrode 22. Each source line 91 is connected to the source driver 81 and supplied with an image signal from the source driver 81. Each gate line 92 is connected to the gate driver 82 and sequentially supplied with scanning signals from the gate driver 82.

The source driver 81 and the gate driver 82 selects a particular pixel 10 of the plurality of pixels 10.

The timing controller 83 outputs, for example, an image signal (e.g., image signals of RGB corresponding to red, green, and blue) and a source-driver control signal for controlling an operation of the source driver 81, to the source driver 81. Further, the timing controller 83 outputs a gate-driver control signal for controlling an operation of the gate driver 82, for example, to the gate driver 82. Examples of the source-driver control signal can include a horizontal synchronization signal, a start pulse signal, and a clock signal for the source driver. Examples of the gate-driver control signal can include a vertical synchronization signal and a clock signal for the gate driver.

In the manufacture of the liquid-crystal display apparatus of Example 1, first of all, the TFT is formed in accordance with a method to be described below. In addition, the transparent conductive material layers 23 made of ITO are formed on the opposed surface of the first substrate 20 on which the base layer 150. The first substrate 20 is made of a glass substrate having a thickness of 0.7 mm.

Figure 9A:
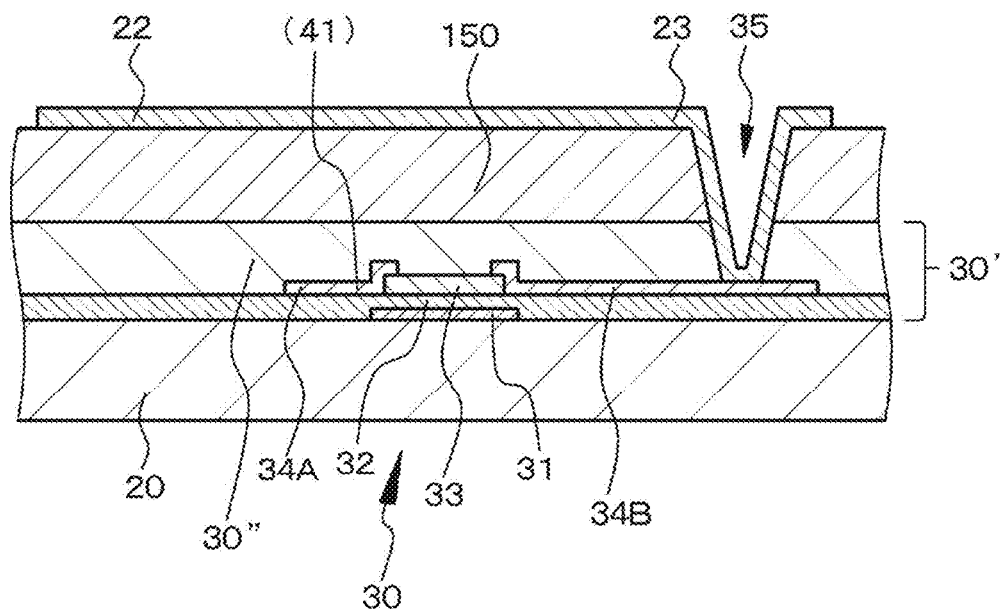
FIGS. 9A and 9B are schematic partial end views of the first substrate in which a TFT and the like and the first electrode are formed.
Figure 9B:
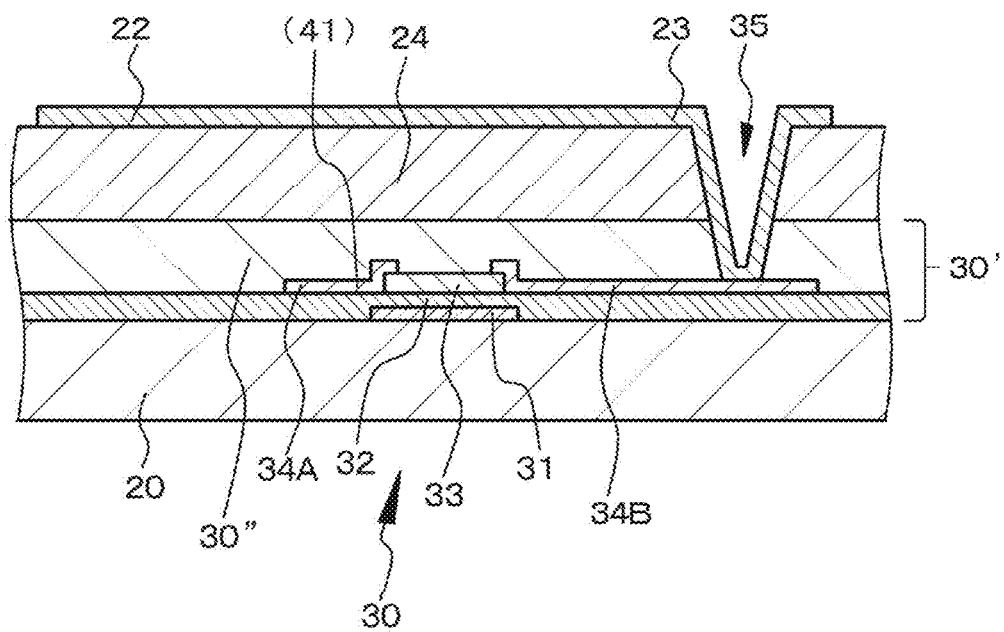

That is, as shown in FIG. 9A, in order to form the TFT 30, the gate electrode 31 and the gate line (not shown) are formed on the first substrate 20 and a gate insulating layer 32 is formed on the gate electrode 31, the gate line, and the first substrate 20. The gate insulating layer 32 is made of, for example, $SiO_2$, SiN, SiON, or a metal oxide. Then, a semiconductor layer 33 that becomes the channel formation region is formed on the gate insulating layer 32. After that, the channel formation region is formed by patterning the semiconductor layer 33. The source/drain electrodes 34A and 34B are formed on the semiconductor layer 33 and the gate insulating layer 32. Along with this, the data lines 41 and 42 are formed there. The data lines 41 and 42 are constituted of an extension of the source/drain electrode 34A. The semiconductor layer 33 is made of, for example, polysilicon or amorphous silicon. The source/drain electrodes 34A and 34B and the data lines 41 and 42 are made of, for example, a metal film of titanium, chromium, aluminum, molybdenum, tantalum, tungsten, copper, or the like, an alloy film thereof, or a laminate film. After that, an interlayer insulating layer 30″ is formed over the entire region. In this manner, the TFT layer 30′ can be obtained. Such formation of the TFT layer 30′ can be performed in accordance with a well-known method. Note that the TFT 30 is not limited to such a so-called bottom gate/top contact type, may be a bottom gate/bottom contact type, may be a top gate/top contact type, or may be a top gate/bottom contact type. Alternatively, the source/drain electrodes 34A and 34B may be formed on the semiconductor layer 33 and the gate insulating layer 32. Along with this, the source/drain electrodes 34A and 34B may be formed on the semiconductor layer 33 instead of formation of the data lines 41 and 42. Further, the data lines 41 and 42 may be formed on the gate insulating layer 32. In this case, the data lines 41 and 42 are constituted of a laminate structure of the semiconductor layer 33 and a metal film or the like. Projection images of the source/drain electrodes 34A and 34B to the first substrate 20 and a projection image of the gate electrode 31 to the first substrate 20 have an overlapping region.

After the base layer 150 is formed over the entire region, the connection hole 35 is formed in the base layer 150 above the other source/drain electrode 34B. In a bottom portion of the connection hole 35, the other source/drain electrode 34B is exposed. After the resist material layer is formed on the base layer 150, the concave and convex portion having a predetermined depth is formed in the resist material layer by performing exposure/development. By etching back the resist material layer and the base layer 150, the concave and convex portion and the slit region can be formed in the base layer 150.

Alternatively, after the smoothing film (corresponding to base layer) is formed over the entire region, the connection hole 35 is formed in the smoothing film above the other source/drain electrode 34B. In the bottom portion of the connection hole 35, the other source/drain electrode 34B is exposed. The insulating material layer is formed on the smoothing film including an inside of the connection hole 35. In addition, the resist material layer is formed on the insulating material layer. The resist material layer for forming the concave and convex portion extends inside the connection hole 35. After that, the resist material layer is subjected to patterning by performing exposure/development of the resist material layer. By etching the insulating material layer using the resist material layer as an etching mask and removing the resist material layer, the concave and convex portion and the slit region can be formed. The concave-portion bottom surface is constituted of the smoothing film, the convex portion is constituted of the insulating material layer, and the base layer 150 is constituted of the smoothing film and the insulating material layer. The concave and convex portion 11 of the base layer 150 extends inside the connection hole 35 and is formed also on the other source/drain electrode 34B exposed in the bottom portion of the connection hole 35.

After that, the transparent conductive material layer 23 made of ITO having a predetermined thickness is formed over the entire region. Thus, the slit region 12 and the concave and convex portion 11 can be obtained. The transparent conductive material layer 23 extends up to the other source/drain electrode 34B exposed in the bottom portion of the connection hole 35. By patterning the transparent conductive material layer 23 in accordance with a well-known method, the first electrode 22 can be provided in a matrix form. Specifications of the concave and convex portion 11 and the like are as shown in Table 1 below.

On the other hand, in the second substrate 50, the color filter layer (not shown) is formed on the second substrate 50 made of a glass substrate having a thickness of 0.7 mm and the second electrode 52 that is a so-called solid electrode is formed on the color filter layer.

TABLE 1

| | |
|---|---|
| Average height of stem convex portions: | 0.3 μm |
| Average height of branch convex portions: | 0.3 μm |
| Formation pitch of branch convex portions: | 5.0 μm |
| Width of stem convex portion: | 12.0 μm |
| Width of branch convex portion: | 2.5 μm |
| Width of concave portion: | 2.5 μm |
| Thickness of transparent conductive material layer: | 0.1 μm |
| Angle of inclination of side surface of branch convex portion: | 88 degrees |
| Width of line portion: | 2.5 μm |
| Width of space portion: | 2.5 μm |
| Average film thickness of first alignment film: | 0.1 μm |
| Average film thickness of second alignment film: | 0.1 μm |
| $T_2/T_1$: | 1 |
| Distance between data line and first electrode: | 1 μm |

After that, the first alignment film 21 is formed on the first electrode 22 and the second alignment film 51 is formed on the second electrode 52. Specifically, after the alignment film material is applied or printed on each of the first electrode 22 and the second electrode 52, heating treatment is performed. JALS2131-R6 manufactured by JSR Corporation that is a vertical alignment film material was used as the alignment film material. The temperature for heating treatment is favorably 80° C. or more, more favorably, 150° C. or more and 200° C. or less. Further, the heating temperature of the heating treatment may be gradually changed. With this, a solvent contained in the applied or printed alignment film material evaporates and the alignment films 21 and 51 containing high-molecular compounds are formed. After that, treatment such as rubbing may be performed if necessary. More specifically, the vertical alignment film material is applied on the first electrode 22 and the second electrode 52 as the first alignment film 21 and the second alignment film 51. After a drying process was performed using a hotplate at 80° C. for 80 seconds, baking was performed using a clean oven at 200° C., for 60 minutes in a nitrogen atmosphere, and the first alignment film 21 and the second alignment film 51 was obtained.

Next, the first substrate 20 and the second substrate 50 are disposed such that the alignment film 21 and the alignment film 51 are opposed to each other. The liquid-crystal layer 60 containing the liquid-crystal molecules 61 is sealed between the alignment film 21 and the alignment film 51. Specifically, columnar protrusions for ensuring a cell gap are formed on surfaces of either one of the first substrate 20 and the second substrate 50, on which the alignment films 21 and 51 are formed. Meanwhile, a seal portion is formed by applying an ultraviolet curable resin containing silica particles each having a particle size of 3.5 μm in an outer edge of the second substrate 50 by, for example, a screen printing method. A liquid-crystal material obtained by mixing 0.3 mass % of polymerizable monomer (specifically, that is acrylic monomer, A-BP-2E manufactured by Shin-Nakamura Chemical Co., Ltd.) that is an alignment control material into a negative-type liquid-crystal is instilled into a portion surrounded by the seal portion. Such a manufacturing method for the liquid-crystal display apparatus is called PSA method. After that, the first substrate 20 and the second substrate 50 are bonded to each other and the seal portion is cured under a condition of 120° C. and 1 hour. With this, the liquid-crystal layer 60 is sealed.

Then, a voltage is applied between the first electrode 22 and the second electrode 52. That is, by applying a first predetermined voltage $V_{PD-1}$ on the first electrode 22 and applying a second predetermined voltage $P_{PD-2}$ on the second electrode 52 from the data lines 41 and 42 via the control circuit (TFT 30), a pretilt is provisionally given to the liquid-crystal molecules 61. Specifically, as shown in FIG. 10A that is a timing chart showing shows a state of voltage application on the first electrode and the like, the first predetermined voltage $V_{PD-2}$ is applied on the first data line 41 and the second data line 42 at the same time. On the other hand, the second predetermined voltage $V_{PD-2}$ (e.g., 0 volt) is applied on the second electrode. After that, the TFT 30 is put in a conductive state by applying a voltage $V_G$ on the gate electrode 31 of the TFT 30 via the gate line. As a result, the first predetermined voltage $V_{PD-2}$ is applied on the first electrode 22.

Note that, as shown in FIG. 10B that is a timing chart showing a state of voltage application on the first electrode and the like, in a state in which the second predetermined voltage $V_{PD-2}$ (e.g., 0 volt) is applied on the second electrode, the TFT 30 may be put in a conductive state by applying the voltage $V_G$ on the gate electrode 31 of the TFT 30 via the gate line. After that, the first predetermined voltage $V_{PD-1}$ may be applied on the first electrode 22 from the data lines 41 and 42 via the control circuit (TFT 30). In this case, the first predetermined voltage $V_{PD-1}$ may be gradually applied, for example, at a rate of 0.1 volt/second.

With this, an electric field in a direction that forms a predetermined angle with respect to the surfaces of the first substrate 20 and the second substrate 50 is generated. Then, the liquid-crystal molecules 61 are aligned, inclined in a predetermined direction from a direction perpendicular to the first substrate 20 and the second substrate 50. That is, a pretilt can be provisionally given to the liquid-crystal molecules 61.

After that, in a state in which the application of the first predetermined voltage $V_{PD-1}$ on the first electrode 22 is suspended and the potential of the first electrode 22 is retained at the first predetermined voltage $V_{PD-1}$, the pretilt state of the liquid-crystal molecules 61 is fixed. Note that the second predetermined voltage $P_{PD-2}$ is still applied on the second electrode 52. Specifically, the application of a voltage on the gate electrode 31 is suspended and the application of the first predetermined voltage $V_{PD-1}$ on the first data line 41 and the second data line 42 is also suspended. In this state, the first electrode 22 is put in an electrically floating state in a sense. The potential of the first electrode 22 is retained at the first predetermined voltage $V_{PD-1}$. The second predetermined voltage $V_{PD-2}$ is applied on the first data line 41 and the second data line 42, for example. Alternatively, each of the first data line 41 and the second data line 42 is set to have a potential for increasing an alignment regulation force. That is, in a state in which the application of the first predetermined voltage $V_{PD-1}$ on the first electrode 22 from the first data line 41 and the second data line 42 via the control circuit is suspended and the potential of the first electrode 22 is retained at the first predetermined voltage $V_{PD-1}$, the potential of the first data line 41 and the second data line 42 and the second predetermined voltage $P_{PD-2}$ are retained at

|(potential of first data line and second data line)− second predetermined voltage|≥5 volts.

The pretilt state of the liquid-crystal molecules 61 is not adversely influenced by electric fields generated by the first data line 41 and the second data line 42, by, for example, setting the first electrode 22 and the second electrode 52 to have the same potential in this manner.

In order to cause a polymerizable monomer to react in this state, although it depends on a polymerizable monomer used, heating treatment is performed thereon or an ultraviolet ray (e.g., uniform ultraviolet ray of 10J (measurement at wavelength of 360 nm)) is emitted thereto. With this, the pretilt state of the liquid-crystal molecules 61 can be fixed. The alignment state of the liquid-crystal molecules 61 was favorable and, in addition, the black-luminance quality was also excellent.

In the above steps, an azimuthal angle (declination) of the liquid-crystal molecules 61 is defined by the intensity and direction of the electric field and the polymerizable monomer mixed in the liquid-crystal. A polar angle (zenith angle) is defined by the intensity of the electric field and the polymerizable monomer mixed in the liquid-crystal. Thus, by appropriately adjusting the value of the first predetermined voltage $V_{PD-1}$, it is possible to control the values of the pretilts $\theta_1$ and $\theta_2$ of the liquid-crystal molecules 61A and 61B. Due to the concave and convex portion 11 formed in the first electrode 22, an oblique electric field is applied between the first substrate 20 and the second substrate 50. Further, due to the reaction of the polymerizable monomer mixed in the liquid-crystal, a high molecular layer is formed in the vicinity of the opposed surface of the substrate. A direction in which the liquid-crystal molecules 61 should respond is defined by the thus formed high molecular layer.

The pretilt state of the liquid-crystal molecules 61 in the vicinity of the first substrate 20 and the second substrate 50 is fixed by a reaction product of the polymerizable monomer. In the above-mentioned manner, a liquid-crystal cell can be completed.

For an experiment, the pretilt state of the liquid-crystal molecules 61 was fixed while the second predetermined voltage $P_{PD-2}$ was applied on the second electrode 52 and the first predetermined voltage $V_{PD-1}$ was applied on the first electrode 22. As a result, the alignment state of the liquid-crystal molecules 61 was slightly unfavorable and, in addition, the black-luminance quality was also slightly unfavorable.

On the other hand, in the FPA method in which an alignment film having a function of remembering the pretilt is applied or formed on at least one electrode, and then the negative-type liquid-crystal is injected and sealed, a seal portion is formed, and then a liquid-crystal material made of the negative-type liquid-crystal is instilled into a portion surrounded by the seal portion. The first substrate 20 and the second substrate 50 are bonded to each other, and the seal portion is cured using an ultraviolet ray having a wavelength of 410 nm.

Then, by applying the first predetermined voltage $V_{PD-1}$ on the first electrode 22 and applying the second predetermined voltage $P_{PD-2}$ on the second electrode 52 from the data lines 41 and 42 via the control circuit (TFT 30) in a manner similar to that described above, a pretilt is provisionally given to the liquid-crystal molecules 61. That is, the electric field in the direction that forms a predetermined angle with respect to the surfaces of the first substrate 20 and the second substrate 50 is generated. Then, the liquid-crystal molecules 61 are aligned, inclined in a predetermined direction from the directions perpendicular to the first substrate 20 and the second substrate 50. The azimuthal angle (declination) of the liquid-crystal molecules 61 at this time is defined by the intensity and direction of the electric field and the molecule structure of the alignment film material. The polar angle (zenith angle) is defined by the intensity of the electric field and the molecule structure of the alignment film material. Thus, by adjusting the value of the first predetermined voltage $V_{PD-1}$, it is possible to control the values of the pretilts $\theta_1$ and $\theta_2$ of the liquid-crystal molecules 61A and 61B.

After that, in a manner similar to that described above, the second predetermined voltage $P_{PD-2}$ is continuously applied on the second electrode 52. Specifically, the application of a voltage on the gate electrode 31 is suspended. In addition, the application of the first predetermined voltage $V_{PD-1}$ on the first data line 41 and the second data line 42 is suspended. In this state, the first electrode 22 is put in an electrically floating state in a sense. The potential of the first electrode 22 is retained at the first predetermined voltage $V_{PD-1}$. The second predetermined voltage $V_{PD-2}$ is applied on the first data line 41 and the second data line 42, for example. Alternatively, in a manner similar to that described above, each of the first data line 41 and the second data line 42 is set to have a potential for increasing the alignment regulation force. The pretilt state of the liquid-crystal molecules 61 is not adversely influenced by electric fields generated by the first data line 41 and the second data line 42 by, for example, setting the first electrode 22 and the second electrode 52 to have the same potential in this manner. An energy ray (specifically, ultraviolet ray UV), for example, a uniform ultraviolet ray of 10 J (measured at a wavelength of 360 nm) is emitted to the alignment films 21 and 51 from the outside of the first substrate 20, for example.

That is, the ultraviolet ray is emitted while applying an electric or magnetic field such that the liquid-crystal molecules 61 are arrayed obliquely to the surfaces of the pair of substrates 20 and 50. This causes a crosslinkable functional group or a polymerizable functional group of a polymerizable monomer (alignment control material) of the alignment films 21 and 51 to react and be crosslinked. In this manner, the pretilt state of the liquid-crystal molecules 61 is fixed. The alignment state of the liquid-crystal molecules 61 was favorable, and, in addition, the black-luminance quality was also excellent.

The direction in which the liquid-crystal molecules 61 should respond is remembered by the high-molecular compound obtained by polymerizing the polymerizable monomer. A pretilt is given to the liquid-crystal molecules 61 in the vicinity of the alignment films 21 and 51. As a result, in a non-driving state, the pretilts $\theta_1$ and $\theta_2$ are given (fixed) to the liquid-crystal molecules 61A and 61B positioned in the vicinity of an interface between the alignment films 21 and 51 in the liquid-crystal layer 60. An ultraviolet ray containing many light components having a wavelength of, approximately, 295 nm to 365 nm is favorable as an ultraviolet ray UV. It is because there is a fear that the liquid-crystal molecules 61 may experience photodissociation and be deteriorated in the case where an ultraviolet ray containing many light components of a shorter wavelength region is used. Note that, although the ultraviolet ray UV is emitted from the outside of the first substrate 20 here, it may be emitted from the outside of the second substrate 50 or may be emitted from the outside of both of the first substrate 20 and the second substrate 50. In this case, it is favorable to emit the ultraviolet ray UV from the substrate having a higher light transmittance. Further, in the case where the ultraviolet ray UV is emitted from the outside of the second substrate 50, there is a fear that an ultraviolet ray UV of some wavelength region may be absorbed by the color filter layer and it may be difficult for the cross-linking reaction to occur. Therefore, it is favorable to emit it from the outside of the first substrate 20 (from substrate including pixel electrode).

For an experiment, the pretilt state of the liquid-crystal molecules 61 was fixed while the second predetermined voltage $P_{PD-2}$ was applied on the second electrode 52 and the first predetermined voltage $V_{PD-1}$ was applied on the first electrode 22. As a result, the alignment state of the liquid-crystal molecules 61 was slightly unfavorable and, in addition, the black-luminance quality was also slightly unfavorable.

As described above, by applying a predetermined electric field on the liquid-crystal layer 60 and then causing a polymerizable monomer (alignment control material) that constitutes at least the first alignment film 21 to react, a pretilt is given to the liquid-crystal molecules 61 (FPA method). Or, by applying the predetermined electric field on the liquid-crystal layer 60 and causing a polymerizable monomer (alignment control material) contained in the liquid-crystal layer 60 to react, a pretilt is given to the liquid-crystal molecules 61 (PSA method).

Assuming that the average film thickness of the first alignment film 21 is denoted by $T_1$ and the average film thickness of the second alignment film 51 is denoted by $T_2$, it is favorable to satisfy $$0.5 \leq T_2/T_1 \leq 1.5$$

desirably, $$0.8 \leq T_2/T_1 \leq 1.2.$$

By defining the value of $T_2/T_1$ in this manner, that is, setting the average film thickness of the first alignment film 21 and the average film thickness of the second alignment film 51 to be equal or approximately equal to each other, the occurrence of image sticking and the like can be reliably prevented.

In the above-mentioned steps, the liquid-crystal display apparatus (liquid-crystal display device) shown in FIG. 4, in which each of the liquid-crystal molecules 61A on the side of the first substrate 20 and the second substrate 50 forms a pretilt, can be completed. Lastly, a pair of polarization plates (not shown) are bonded to the outside of the liquid-crystal display apparatus such that the absorption axes are orthogonal to each other. Note that the liquid-crystal display apparatuses in the various examples to be described below can also be manufactured in accordance with a substantially similar method.

Regarding an operation of the liquid-crystal display apparatus (liquid-crystal display device), in a selected pixel 10, the alignment state of the liquid-crystal molecules 61 contained in the liquid-crystal layer 60 changes in a manner that depends on the potential difference between the first electrode 22 and the second electrode 52 when a driving voltage is applied. Specifically, in the liquid-crystal layer 60, by a driving voltage being applied under the state before the application of the driving voltage shown in FIG. 4, the liquid-crystal molecules 61A and 61B positioned in the vicinity of the alignment films 21 and 51 rotationally fall down in their directions of inclination, and such motion is propagated to other liquid-crystal molecules 61C. As a result, the liquid-crystal molecules 61 react and become approximately horizontal (parallel) to the first substrate 20 and the second substrate 50. With this, optical characteristics of the liquid-crystal layer 60 change, the light entering the liquid-crystal display device becomes modulated emitted light, and the image is displayed by being expressed in gradation on the basis of this emitted light.

In this liquid-crystal display apparatus, the image is displayed by applying a driving voltage between the first electrode (pixel electrode) 22 and the second electrode (opposed electrode) 52 in the following manner. Specifically, in accordance with an input of a source-driver control signals from the timing controller 83, the source driver 81 supplies an individual image signal into predetermined source lines 91 (data lines 41 and 42) on the basis of an image signal also input from the timing controller 83. Along with this, the gate driver 82 sequentially supplies a scanning signal into the gate line 92 at a predetermined timing in accordance with an input of a gate-driver control signal from the timing controller 83. With this, a pixel 10 positioned at an intersecting point at which the source line 91 supplied with the image signal and the gate line 92 supplied with the scanning signal is selected and a driving voltage is applied on the pixel 10.

The color filter layer may be formed on the first substrate 20. Specifically, as described above, after the TFT layer 30' is formed on the first substrate 20, a color filter layer 24 is formed on the TFT layer 30' in accordance with a well-known method. A COA (Color Filter On Array) structure can be thus obtained. After the connection hole 35 is formed on the color filter layer 24 above the other source/drain electrode 34B, it is only necessary to form the concave and convex portion and the slit region in the color filter layer 24 including the connection hole 35, and further form the first electrode 22 (transparent conductive material layers 23) (see FIG. 9B).

Note that, when the height of the convex portions 131 and 132 in the concave and convex portion 11 was set to 0.03 µm, 0.50 µm, 0.1 µm, 0.2 µm, or 0.5 µm, the alignment state of the liquid-crystal molecules 61 was favorable with the height of 0.50 µm, 0.1 µm, or 0.2 µm and, in addition, the black-luminance quality was also excellent. On the other hand, when the height was set to 0.03 µm, the alignment state of the liquid-crystal molecules 61 was unfavorable and, in addition, the black-luminance quality was slightly unfavorable. Further, when the height was set to 0.5 µm, the alignment state of the liquid-crystal molecules 61 was favorable while the black-luminance quality was unfavorable.

In the liquid-crystal display apparatus of Example 1, the second data line extension extending from the second data line is provided adjacent to the first data line in each pixel that constitutes the first pixel group. The first data line extension extending from the first data line is provided adjacent to the second data line in each pixel that constitutes the second pixel group. By disposing the data line extension adjacent to the data line in this manner, a voltage different from a voltage applied on the data line can be applied on the data line extension. Therefore, also in the liquid-crystal display apparatus having a structure in which the slit region is formed above the data line, an influence of an electric field generated by the data line on alignment of the liquid-crystal molecules can be suppressed using an electric field generated by the data line extension. Thus, it is possible to provide a liquid-crystal display apparatus having a configuration and a structure in which the image quality is not deteriorated due to arrangement of data line.

Example 2

Figure 11:
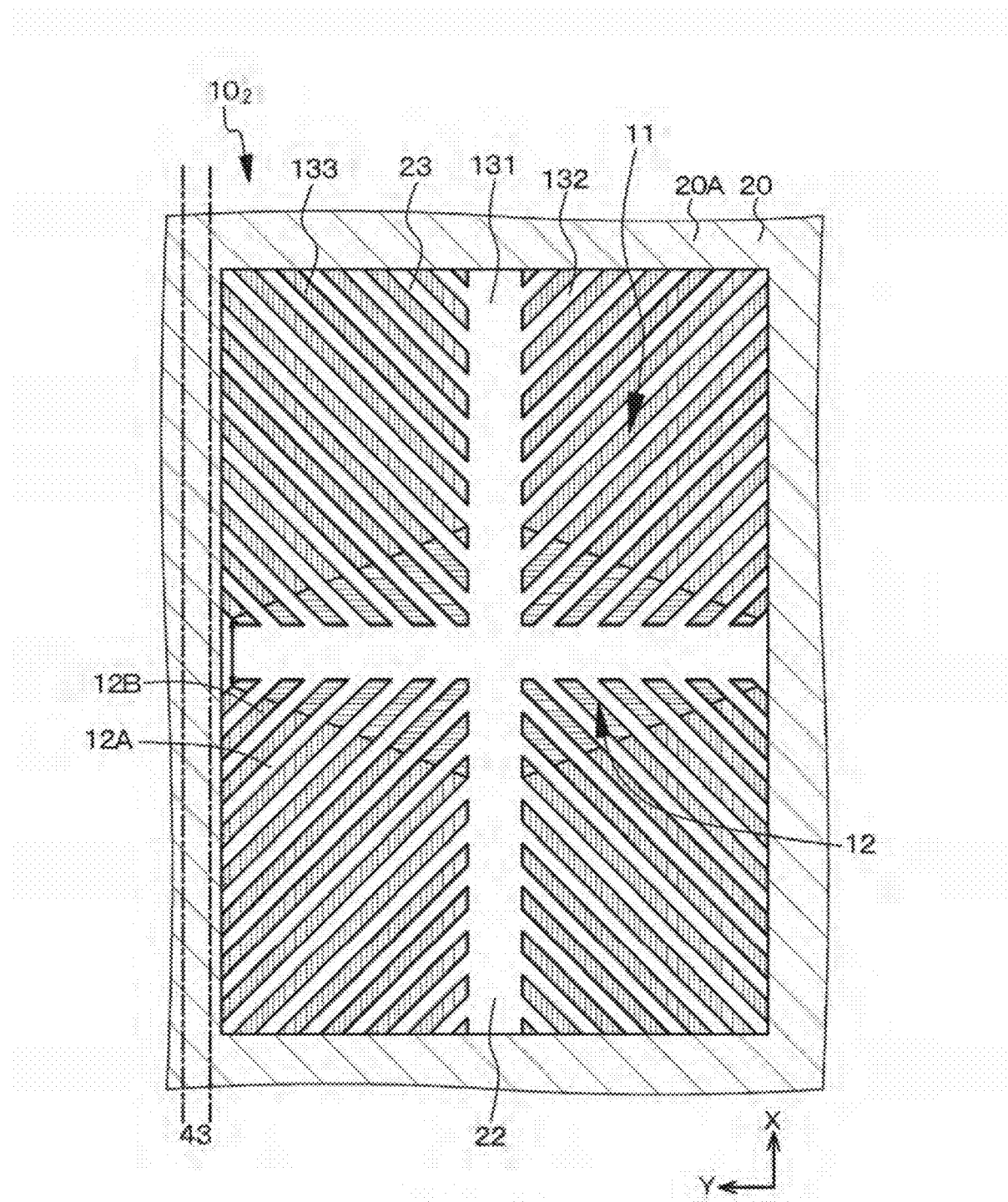
FIG. 11 is a schematic view as one pixel in a first substrate is viewed from above in a liquid-crystal display apparatus of Example 2.
Figure 12:
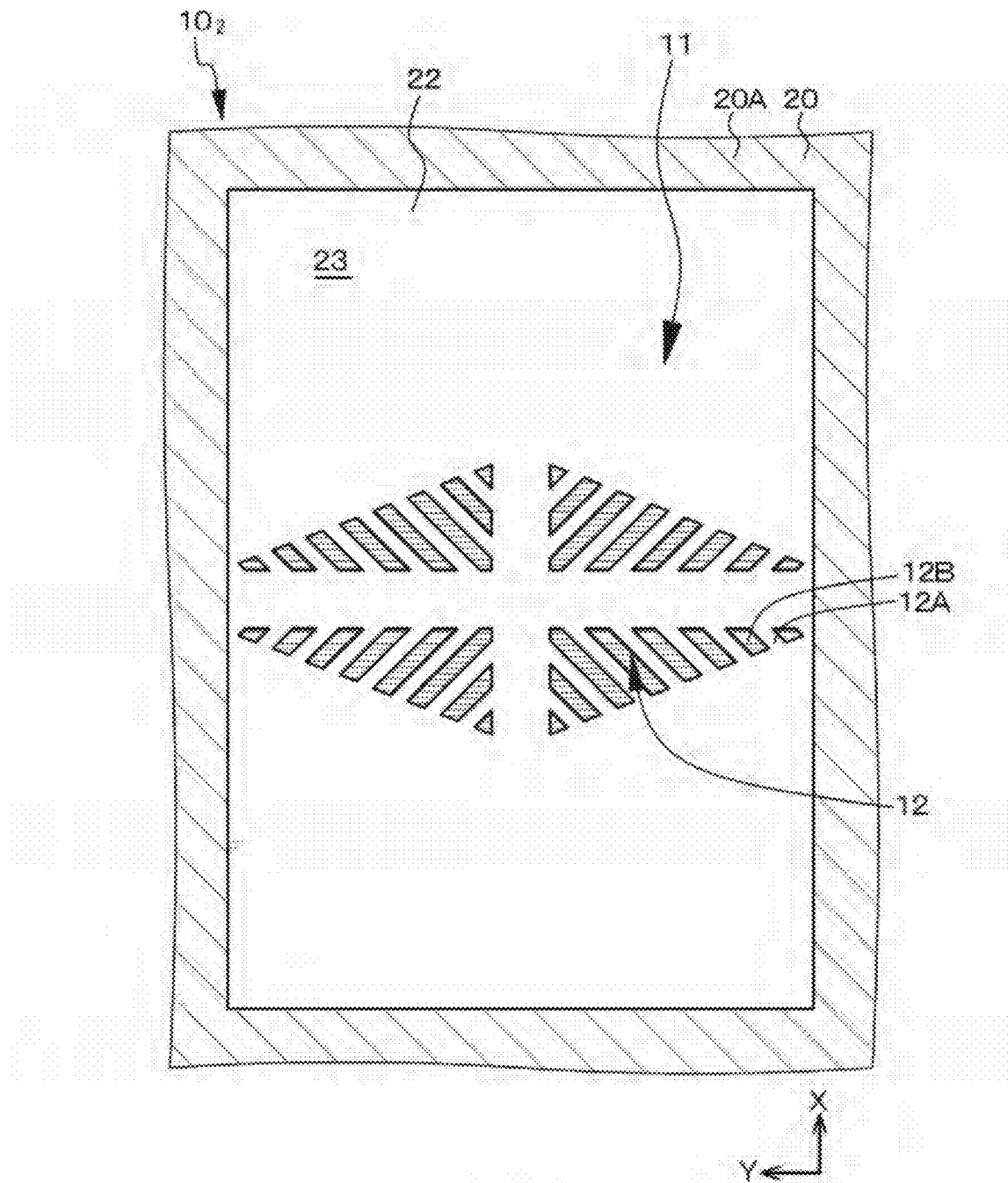
FIG. 12 is a diagram schematically showing a pattern of a first electrode that constitutes the one pixel in the liquid-crystal display apparatus of Example 2.
Figure 13:
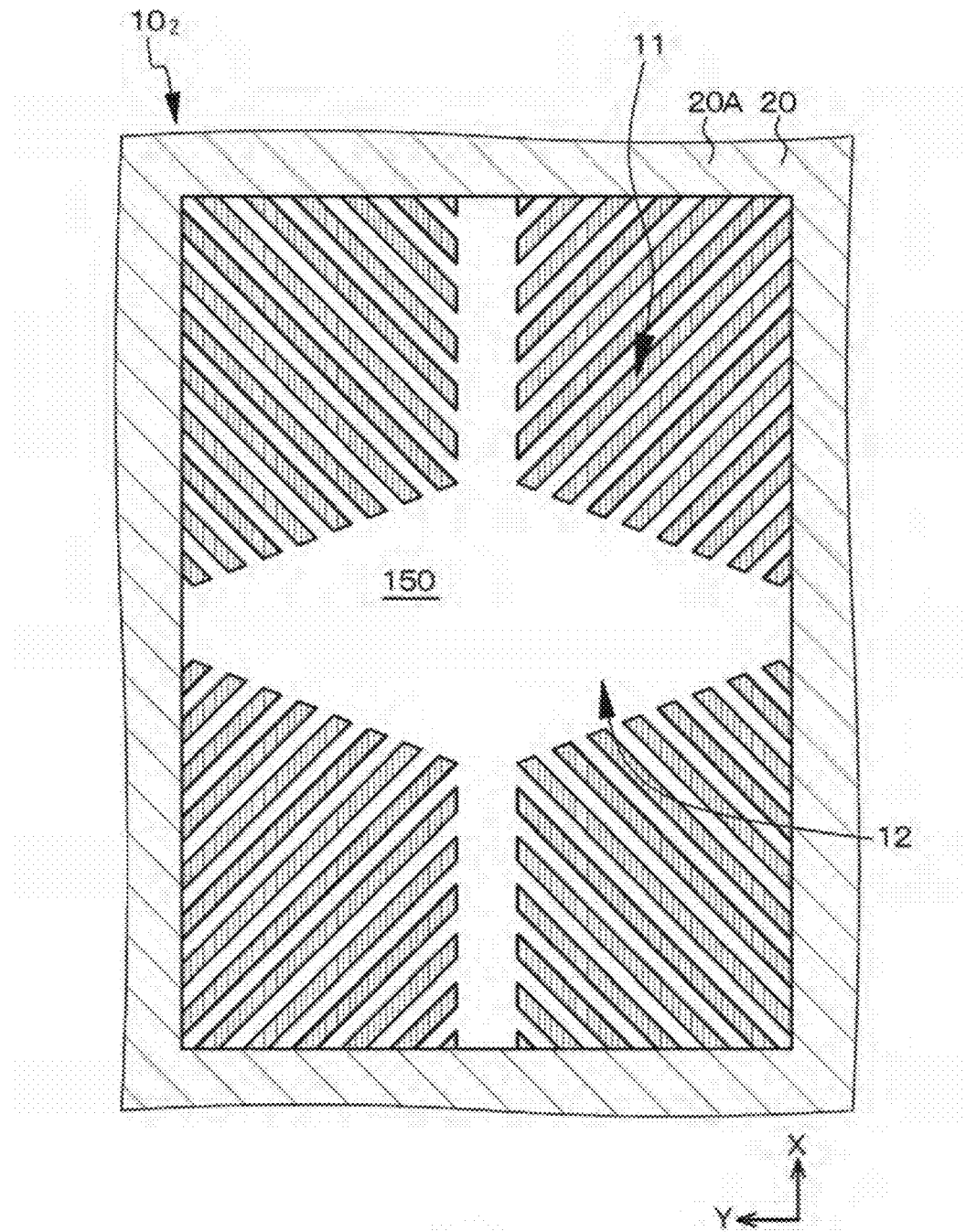
FIG. 13 is a diagram schematically showing an irregularities formation state of a base layer that constitutes the one pixel in the liquid-crystal display apparatus of Example 2.

Example 2 relates to the liquid-crystal display apparatus according to the second aspect of the present disclosure, specifically, the liquid-crystal display apparatus according to the second(A) aspect of the present disclosure. In the liquid-crystal display apparatus of Example 2, a schematic view of the one pixel in the first substrate as viewed from above is shown in FIG. 11. A pattern of the first electrode 22 (transparent conductive material layer) that constitutes the one pixel is schematically shown in FIG. 12. An irregularities formation state of the base layer that constitutes the one pixel is schematically shown in FIG. 13. Note that a schematic partial sectional view of the liquid-crystal display apparatus of Example 2 is similar to that shown in FIG. 4.

In the liquid-crystal display apparatus of Example 2, in the vicinity of the first sides 10a in a plurality of pixels $10_2$ arrayed in the first direction, the data line 43 (indicated by long dashed short dashed line in FIG. 11) that extends in the first direction and is for applying a voltage on the first electrode 22 via the control circuit is provided closer to the first substrate than the first electrode 22. Assuming that an area of the entire slit region 12 is denoted by $S_1$ and the area of the portion of the slit region 12 that is provided in the portion of the first electrode 22 that is positioned above the data line 43 is denoted by $S_2$, $0 < S_2/S_1 \leq 0.1$ is satisfied.

In addition, in the liquid-crystal display apparatus of Example 2, specifically, in each pixel $10_2$, the slit region 12 extends between the pixel center 10e and the first side 10a toward the first side 10a, extends between the pixel center 10e and the third side 10c toward the third side 10c, extends halfway between the pixel center 10e and the second side 10b toward the second side 10b, and extends halfway between the pixel center 10e and the fourth side 10d toward the fourth side 10d. A planar shape of the slit region 12 is an approximately diamond shape unlike Example 1 and a diagonal line extends parallel to the X-axis and the Y-axis. A length of the diagonal line along the X-axis is smaller than a length of the diagonal line along the Y-axis.

Specifically, in Example 2, it is assumed that a width of the line portion 12A that constitutes the slit region 12 is 2.5 µm, a width of the space portion 12B is 2.5 µm, a length (see the arrow of FIG. 11 that extends in the first direction) of the portion of the slit region 12 that is provided in the portion of the first electrode 22 that is positioned above the data line 43 is 24 µm, and a width of the data line 43 is 10 µm. Liquid-crystal display apparatuses in which the number of space portions 12B along the data line 43 is as shown in Table 2 below were experimentally produced and their alignment states were evaluated. Results thereof are shown in Table 2 below. It was found that an excellent alignment state can be obtained by setting the value of $S_2/S_1$ to 0.1 or less and, with the same value of $S_2/S_1$, a larger number of space portions was more preferable.

TABLE 2

| Number of space portions | $S_2/S_1$ | alignment state |
|---|---|---|
| 1 | 0.094 | favorable |
| 3 | 0.096 | extremely favorable |
| 8 | 0.172 | slightly unfavorable |

Excluding the above points, a configuration and a structure of the liquid-crystal display apparatus of Example 2 can be similar to the configuration and the structure of the liquid-crystal display apparatus of Example 1. Therefore, a detailed description thereof will be omitted. Further, as in Example 1, it is also possible to employ a configuration in which the first data line 41 and the second data line 42 are provided. In addition, the liquid-crystal display apparatus of Example 2 can be combined with the liquid-crystal display apparatus of Example 1.

In the liquid-crystal display apparatus of Example 2, a relationship between the area of the entire slit region and the area of the portion of the slit region, which is provided in the portion of the first electrode, which is positioned above the data line is defined. Therefore, also in the liquid-crystal display apparatus having a structure in which the slit region is formed above the data line, it is possible to suppress the influence of the electric field generated by the data line on the alignment of the liquid-crystal molecules. It is possible to provide a liquid-crystal display apparatus having a configuration and a structure in which the image quality is not deteriorated due to the arrangement of the data line.

Example 3

Figure 14:
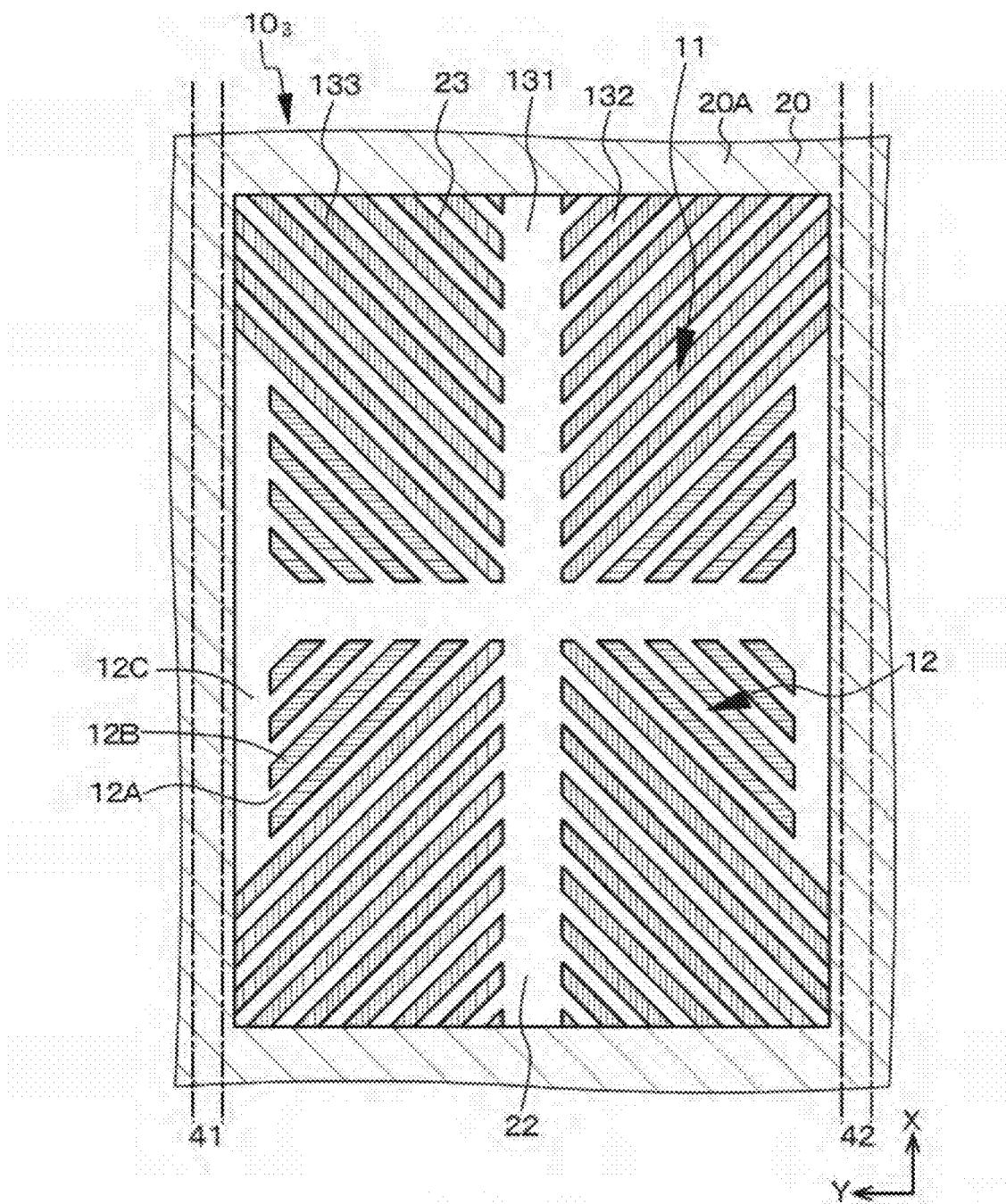
FIG. 14 is a schematic view as one pixel in a first substrate is viewed from above in a liquid-crystal display apparatus of Example 3.
Figure 15:
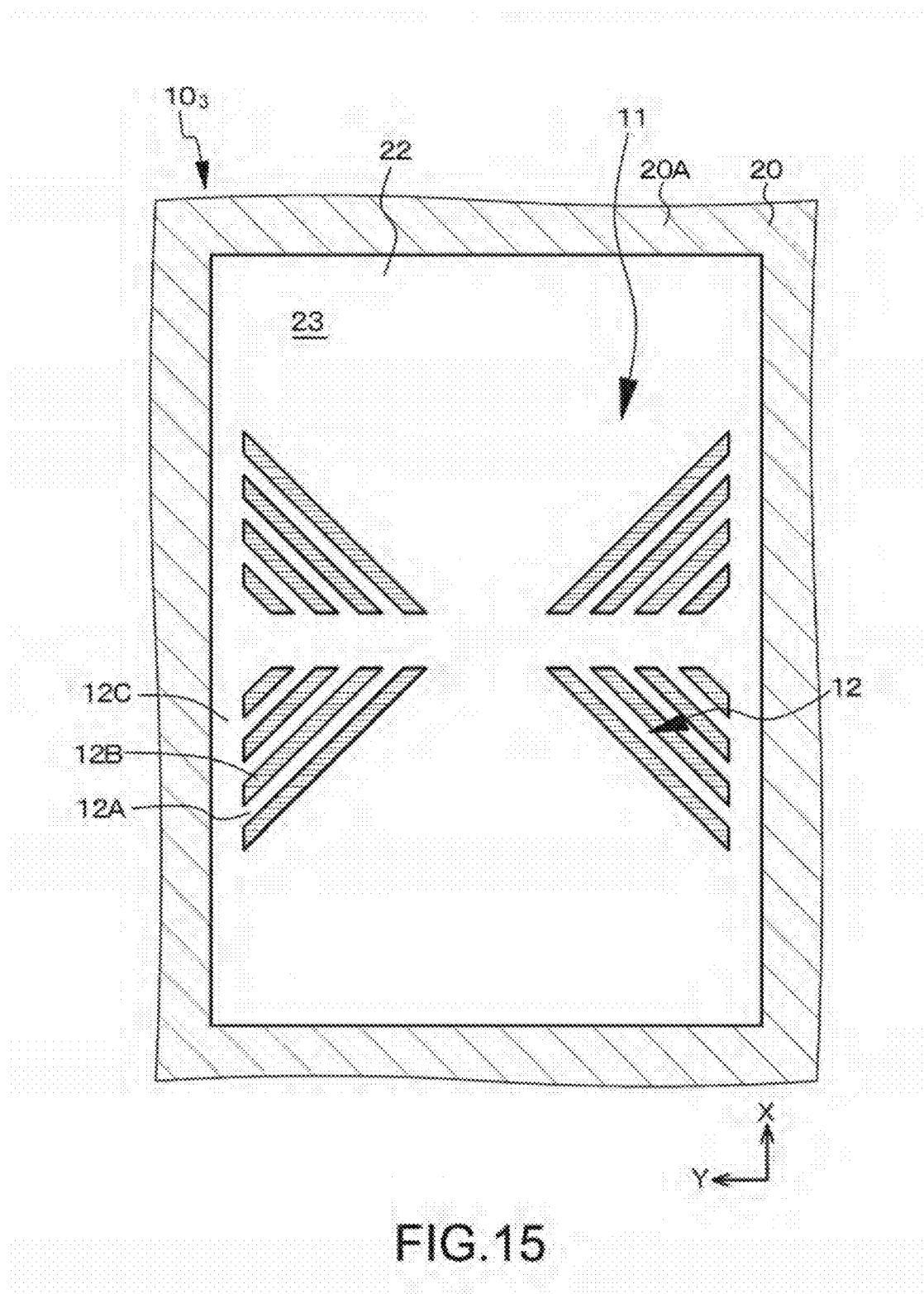
FIG. 15 is a diagram schematically showing a pattern of a first electrode that constitutes the one pixel in the liquid-crystal display apparatus of Example 3.
Figure 16:
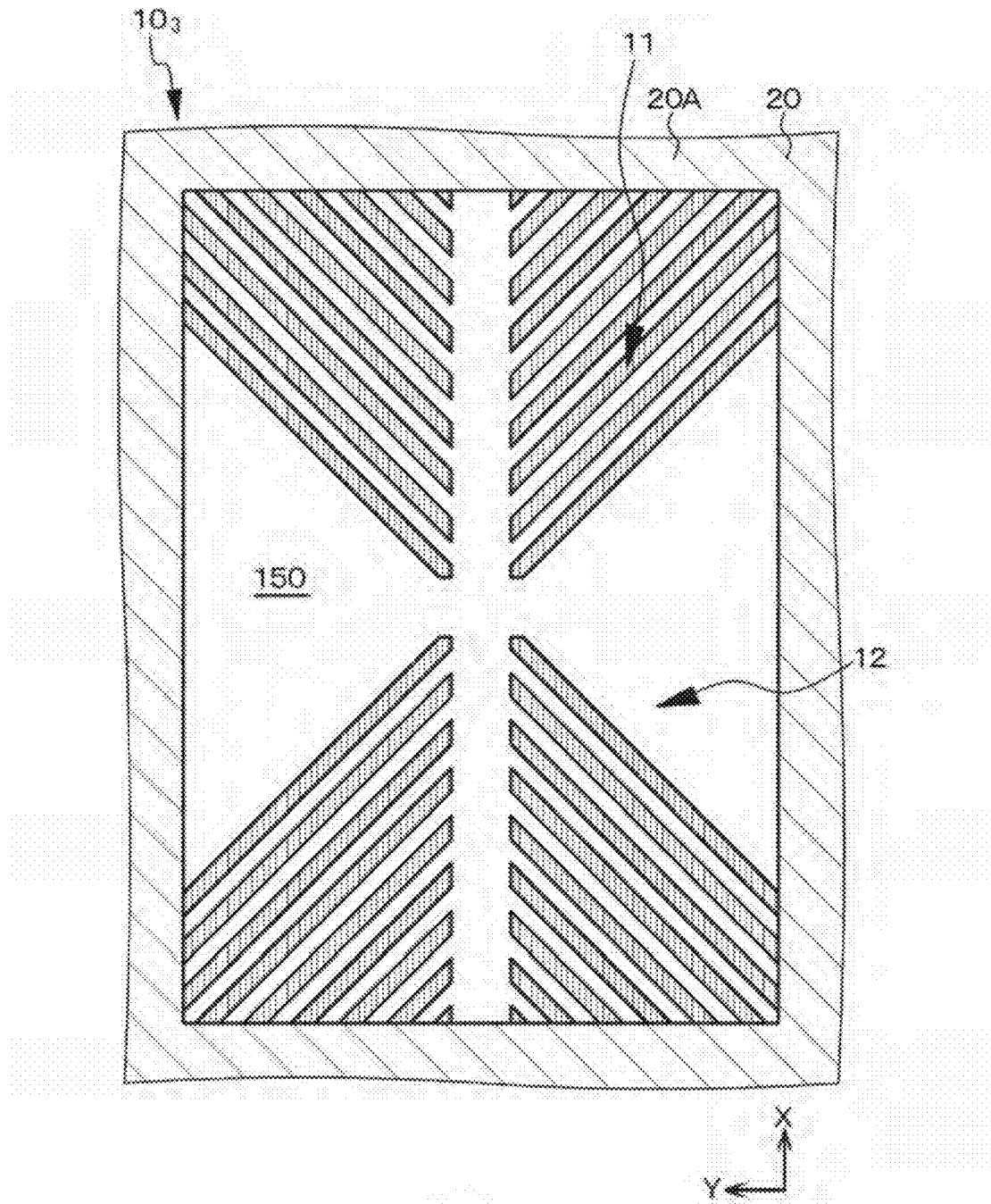
FIG. 16 is a diagram schematically showing an irregularities formation state of a base layer that constitutes the one pixel in the liquid-crystal display apparatus of Example 3.

Example 3 relates to the liquid-crystal display apparatus according to the third aspect of the present disclosure, specifically, the liquid-crystal display apparatus according to the third(A) aspect of the present disclosure. In the liquid-crystal display apparatus of Example 3, a schematic view of the one pixel in the first substrate as viewed from above is shown in FIG. 14. A pattern of the first electrode 22 (transparent conductive material layer) that constitutes the one pixel is schematically shown in FIG. 15. An irregularities formation state of the base layer that constitutes the one pixel is schematically shown in FIG. 16.

In the liquid-crystal display apparatus of Example 3, in the vicinity of the first sides 10a in a plurality of pixels 10₃ arrayed in the first direction, the data lines 41 and 42 that extend in the first direction and are for applying a voltage on the first electrode 22 via the control circuit are provided closer to the first substrate than the first electrode 22. Specifically, in the vicinity of the first sides 10a and the third sides 10c in the plurality of pixels 10₃ arrayed in the first direction, the first data line 41 and the second data line 42 that extend in the first direction and are for applying a voltage on the first electrode 22 via the control circuit (those data lines 41 and 42 are indicated by the long dashed short dashed lines in FIG. 14) are provided closer to the first substrate than the first electrode 22. The slit region 12 is not formed in portions of the first electrode 22 that are positioned above the data lines 41 and 42. Although irregularities may be formed in the portion 12C of the first electrode 22 in which the slit region 12 is not formed or it may be flat, the transparent conductive material layers 23 are formed.

Assuming that lengths of the portions of the first electrode 22 that are positioned above the data lines 41 and 42, in which the slit region 12 is not formed, in the first direction and the second direction are denoted by $L_{El-1}$ and $L_{El-2}$, respectively, $$2 \times 10^{-5} \text{ m} \leq L_{El-1} \leq 3 \times 10^{-4} \text{ m}$$

$$0 \leq L_{El-2} \leq 3 \times 10^{-4} \text{ m}$$

favorably, $$2 \times 10^{-5} \text{ m} \leq L_{El-2} \leq 3 \times 10^{-4} \text{ m}$$

is satisfied. Specifically, $$L_{El-1} = 134 \text{ μm}$$

$$L_{El-2} = 0 \text{ μm}$$

were set.

Figure 17:
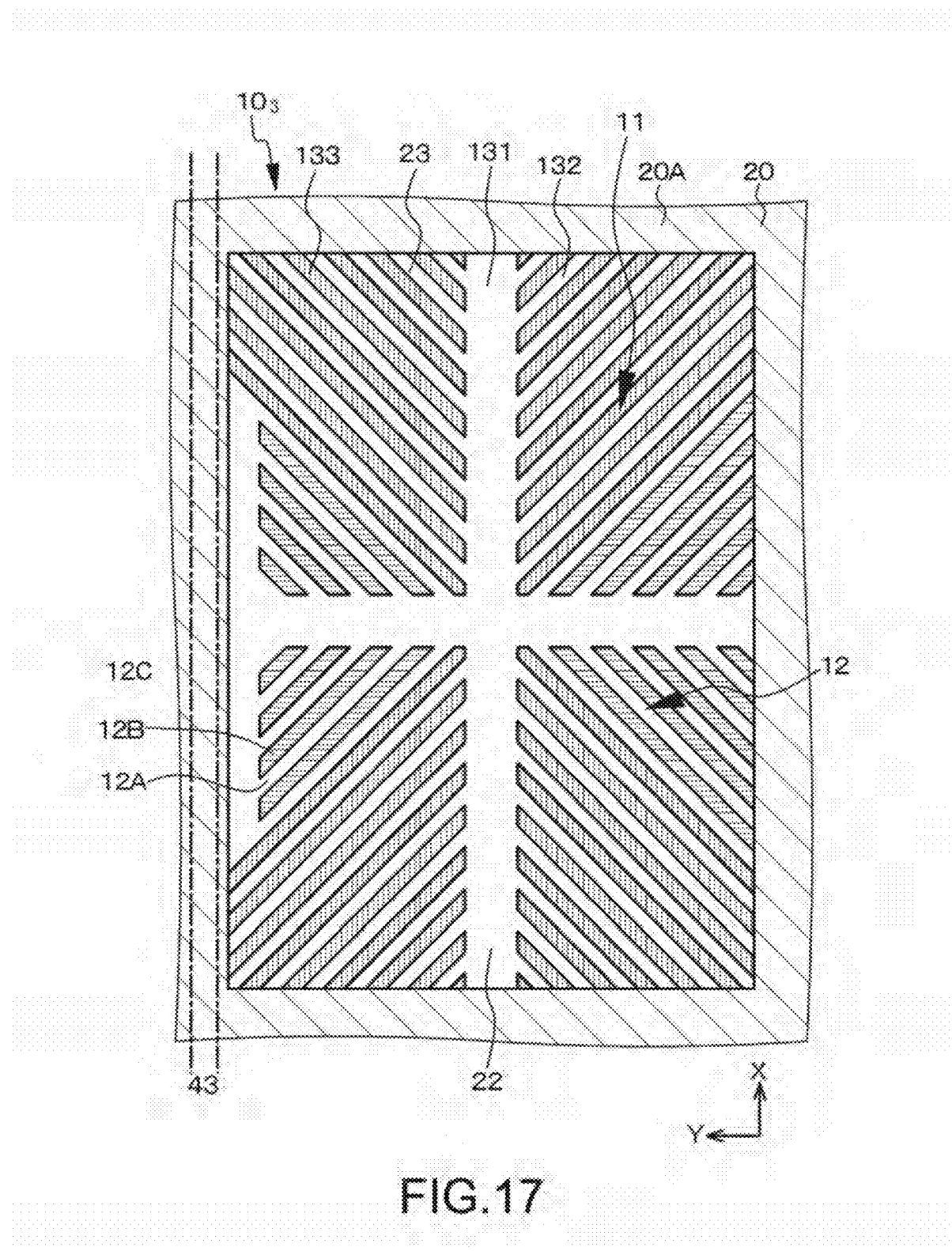
FIG. 17 is a schematic view as the one pixel in the first substrate is viewed from above in a variant example of the liquid-crystal display apparatus of Example 3.

In the example shown in FIG. 14, the two data lines are provided. However, a single data line 43 may be provided as shown in FIG. 17.

Excluding the above points, a configuration and a structure of the liquid-crystal display apparatus of Example 3 can be similar to the configuration and the structure of the liquid-crystal display apparatus of Example 1. Therefore, a detailed description thereof will be omitted. Note that the liquid-crystal display apparatus of Example 3 can be combined with the liquid-crystal display apparatus of Example 1, the liquid-crystal display apparatus of Example 3 can be combined with the liquid-crystal display apparatus of Example 2, and the liquid-crystal display apparatus of Example 3, the liquid-crystal display apparatus of Example 2, and the liquid-crystal display apparatus of Example 1 can be combined together.

In the liquid-crystal display apparatus of Example 3, the slit region is not formed in the portions of the first electrode that are positioned above the data lines. Therefore, it is possible to suppress influences of electric fields generated by the data lines on the alignment of the liquid-crystal molecules. It is possible to provide a liquid-crystal display apparatus having a configuration and a structure in which the image quality is not deteriorated due to the arrangement of the data lines.

Example 4

Figure 18:
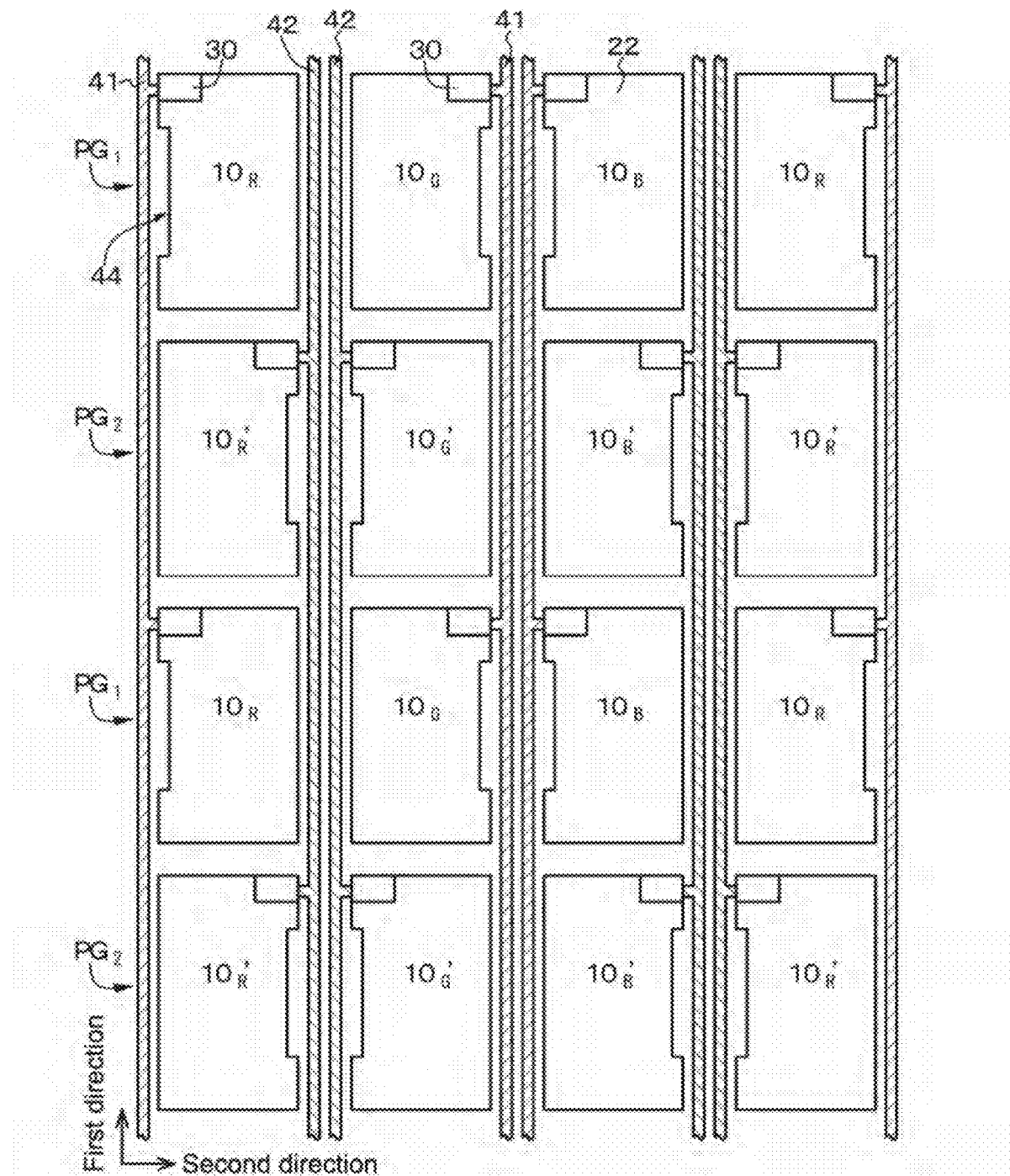
FIG. 18 is a diagram conceptually showing an arrangement state of 4×4 (=16) pixels, driving circuits, data lines, and the like in a liquid-crystal display apparatus of Example 4.
Figure 19:
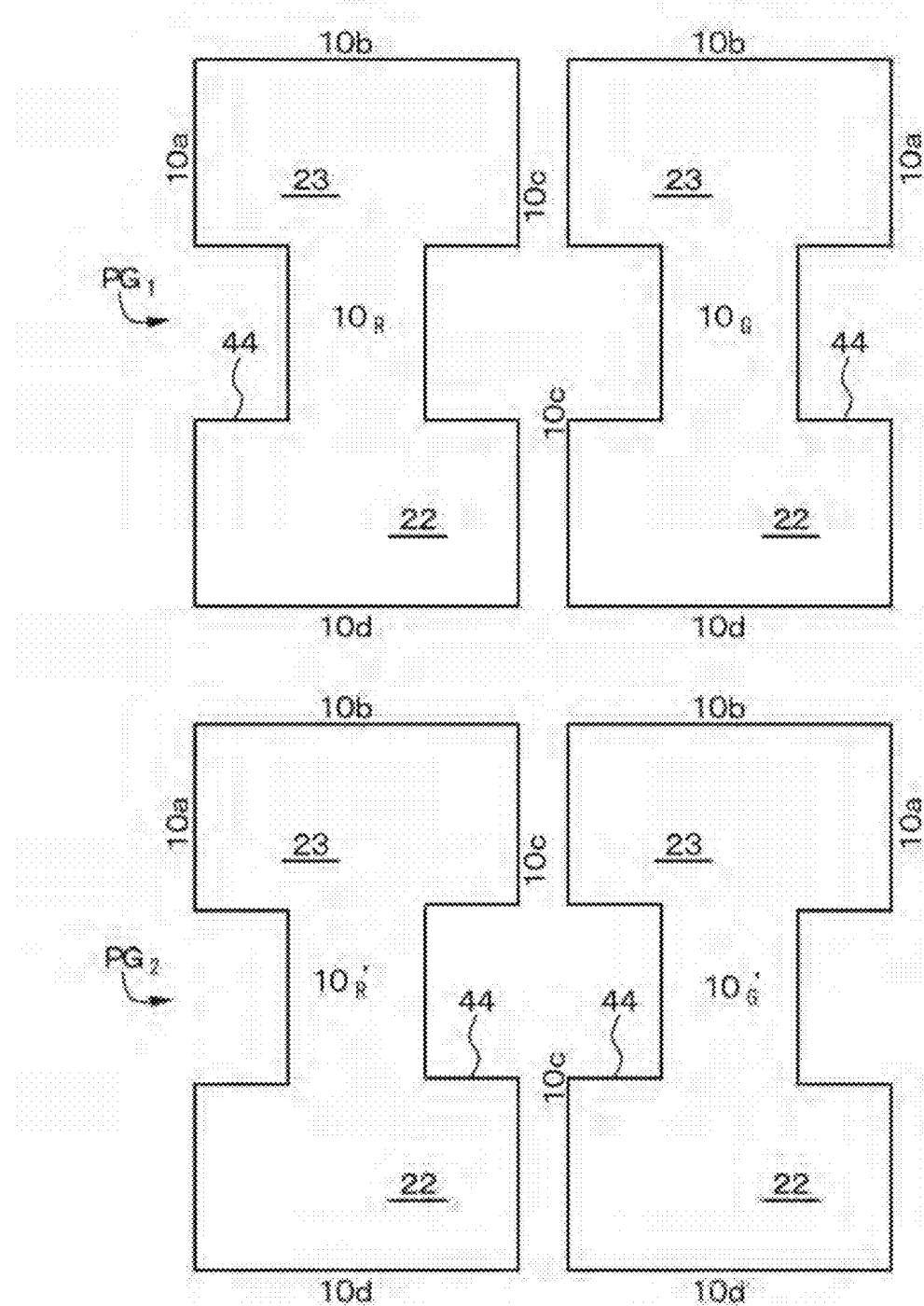
FIG. 19 is a schematic view of a first electrode and a cutout that constitutes 2×2 (=4) pixels as viewed from above in the liquid-crystal display apparatus of Example 4.
Figure 20:
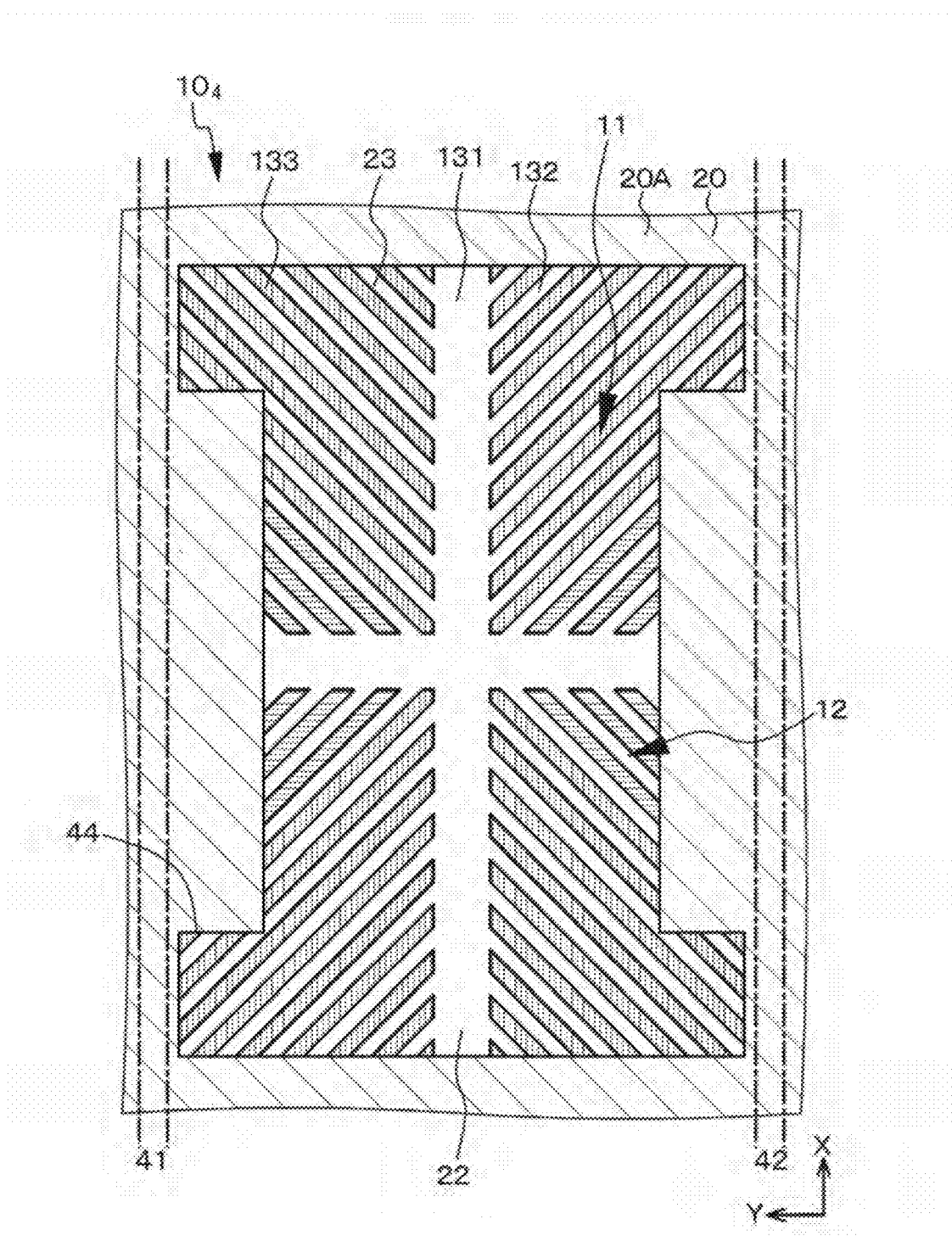
FIG. 20 is a schematic view as one pixel in a first substrate is viewed from above in the liquid-crystal display apparatus of Example 4.
Figure 21:
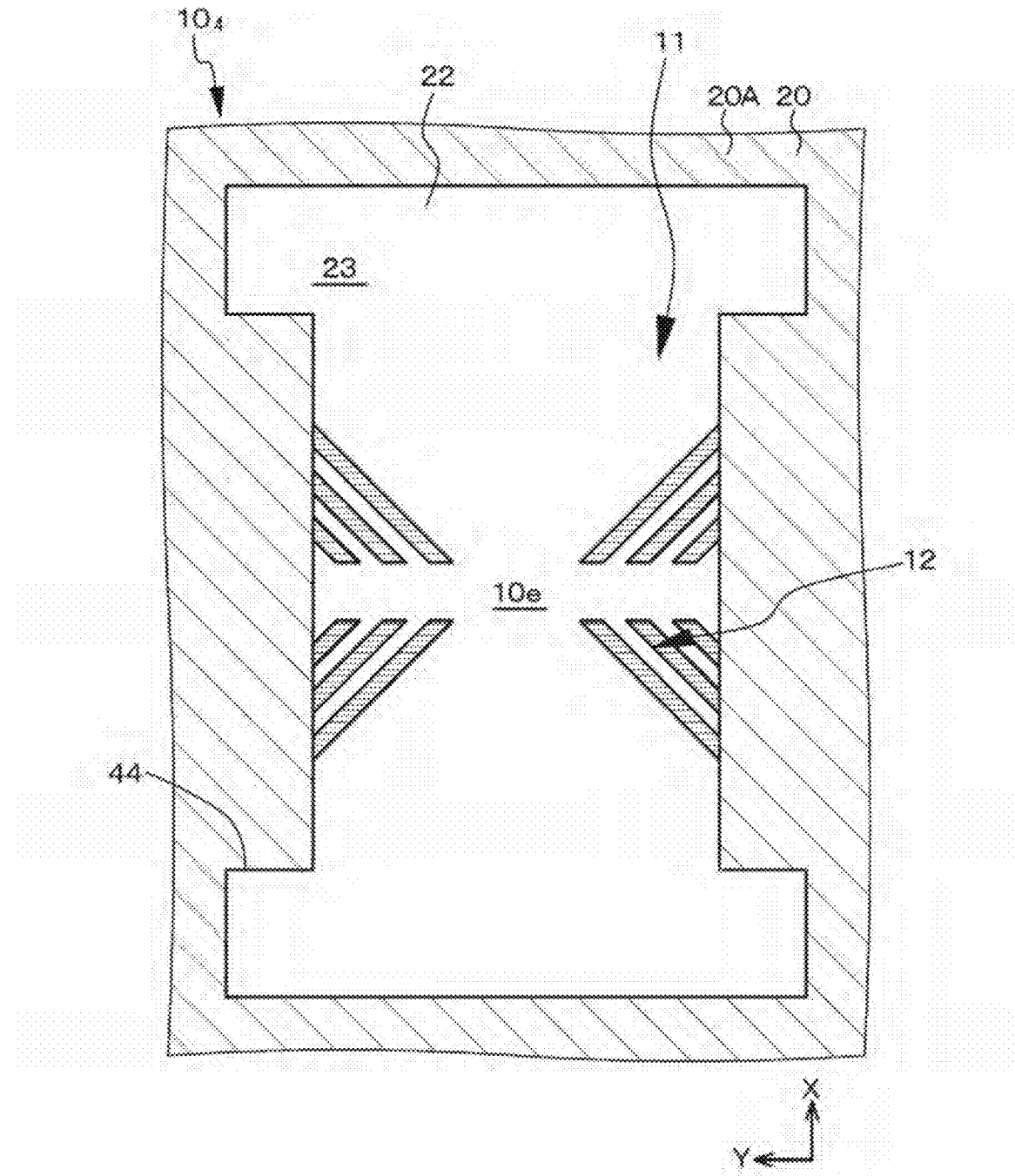
FIG. 21 is a diagram schematically showing a pattern of the first electrode that constitutes the one pixel in the liquid-crystal display apparatus of Example 4.
Figure 22:
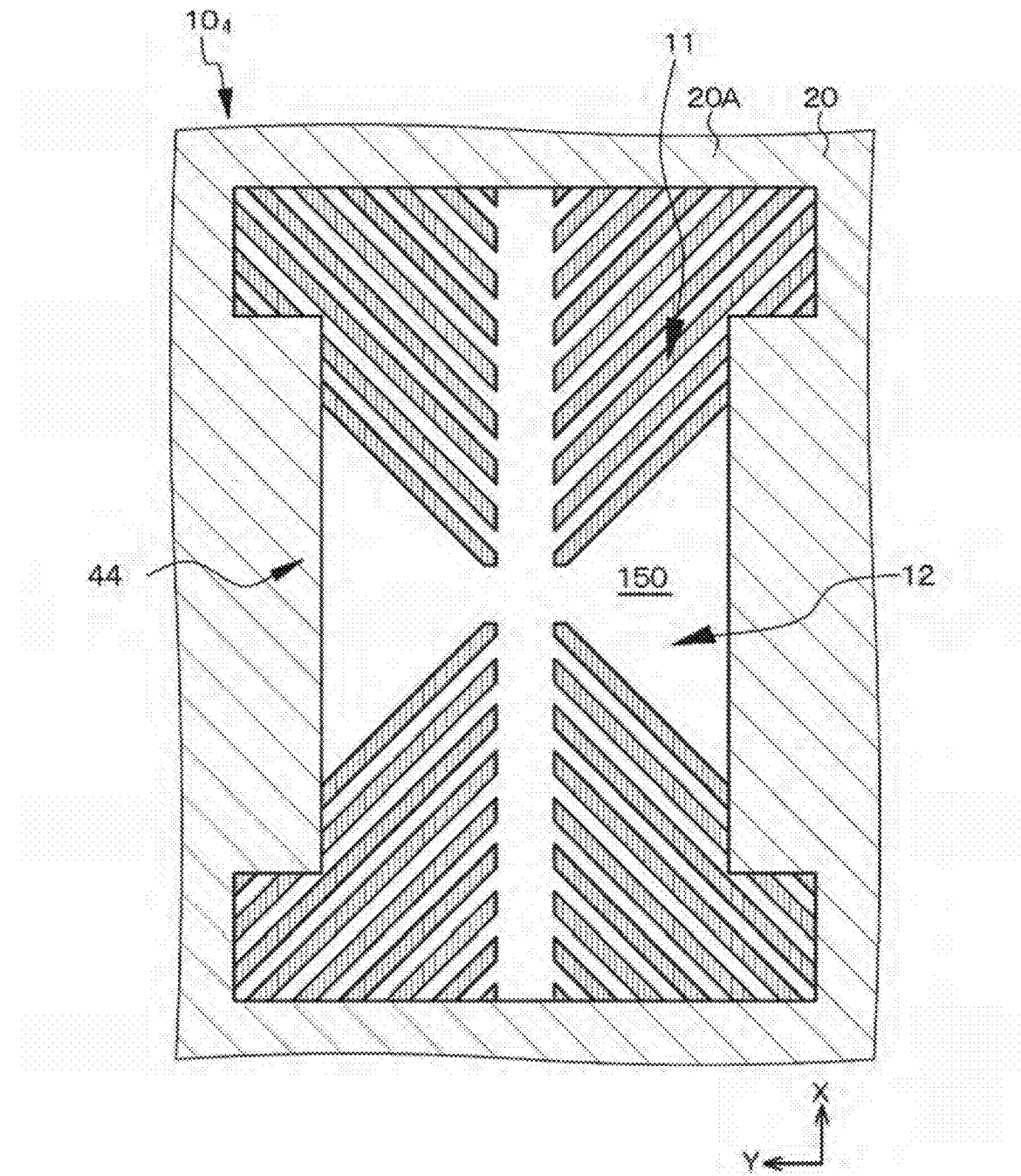
FIG. 22 is a diagram schematically showing an irregularities formation state of a base layer that constitutes the one pixel in the liquid-crystal display apparatus of Example 4.

Example 4 is a variant of Example 3. An arrangement state of pixels, driving circuits, data lines, and the like in a liquid-crystal display apparatus of Example 4 is conceptually shown in FIG. 18. A schematic view of a first electrode and a cutout that constitute one pixel as viewed from above is shown in FIG. 19. Further, a schematic view of one pixel 10₄ in the first substrate as viewed from above is shown in FIG. 20. A pattern of the first electrode 22 (transparent conductive material layer) that constitutes the one pixel 10₄ is schematically shown in FIG. 21. An irregularities formation state of the base layer that constitutes the one pixel 10₄ is schematically shown in FIG. 22. Note that a schematic partial sectional view of the liquid-crystal display apparatus of Example 4 is similar to that shown in FIG. 4.

Also in the liquid-crystal display apparatus of Example 4, the slit region is not formed in the portions of the first electrode 22 that are positioned above the data lines 41 and 42. However, specifically, cutouts 44 are provided in the portions of the first electrode 22 in which the slit region is not formed. The cutouts 44 are provided in sides (specifically, first side 10a and third side 10c) of the first electrode that extend parallel in the first direction. More specifically, the cutout 44 is provided in the portion of the first electrode 22 that is positioned above the data line (data line 41 or data line 42) for applying a voltage on the first electrode 22. For example, in the example shown in FIG. 18, the two data lines 41 and 42 are provided along a first side 10a and a third side 10c of a pixel 10_R. However, the data line for applying a voltage on the first electrode 22 of the pixel 10_R is the data line 41. Therefore, the cutout 44 is provided along the portion of the first electrode 22 that is positioned above the data line 41, that is, the first side 10a. On the other hand, the two data lines 41 and 42 are provided also along a first side 10a and a third side 10c of a pixel 10_R'. However, the data line for applying a voltage on the first electrode 22 of the pixel 10_R' is a data line 42. Therefore, the cutout 44 is provided along the portion of the first electrode 22 that is positioned above the data line 42, that is, the third side 10c.

Also in Example 4, assuming that lengths of the portions of the first electrode 22 (cutouts 44) that are positioned above the data lines 41 and 42, in which the slit region 12 is not formed, in the first direction and the second direction are denoted by $L_{El-1}$ and $L_{El-2}$, respectively, $$2 \times 10^{-5} \text{ m} \leq L_{El-1} \leq 3 \times 10^{-4} \text{ m}$$

$$L_{El-2} \leq 3 \times 10^{-4} \text{ m}$$

favorably, $$2 \times 10^{-5} \text{ m} \leq L_{El-2} \leq 3 \times 10^{-4} \text{ m}$$

is satisfied. Specifically, $$L_{El-1} = 134 \text{ μm}$$

$$L_{El-2} = 0 \text{ μm}$$

were set.

Example 5

Figure 23:
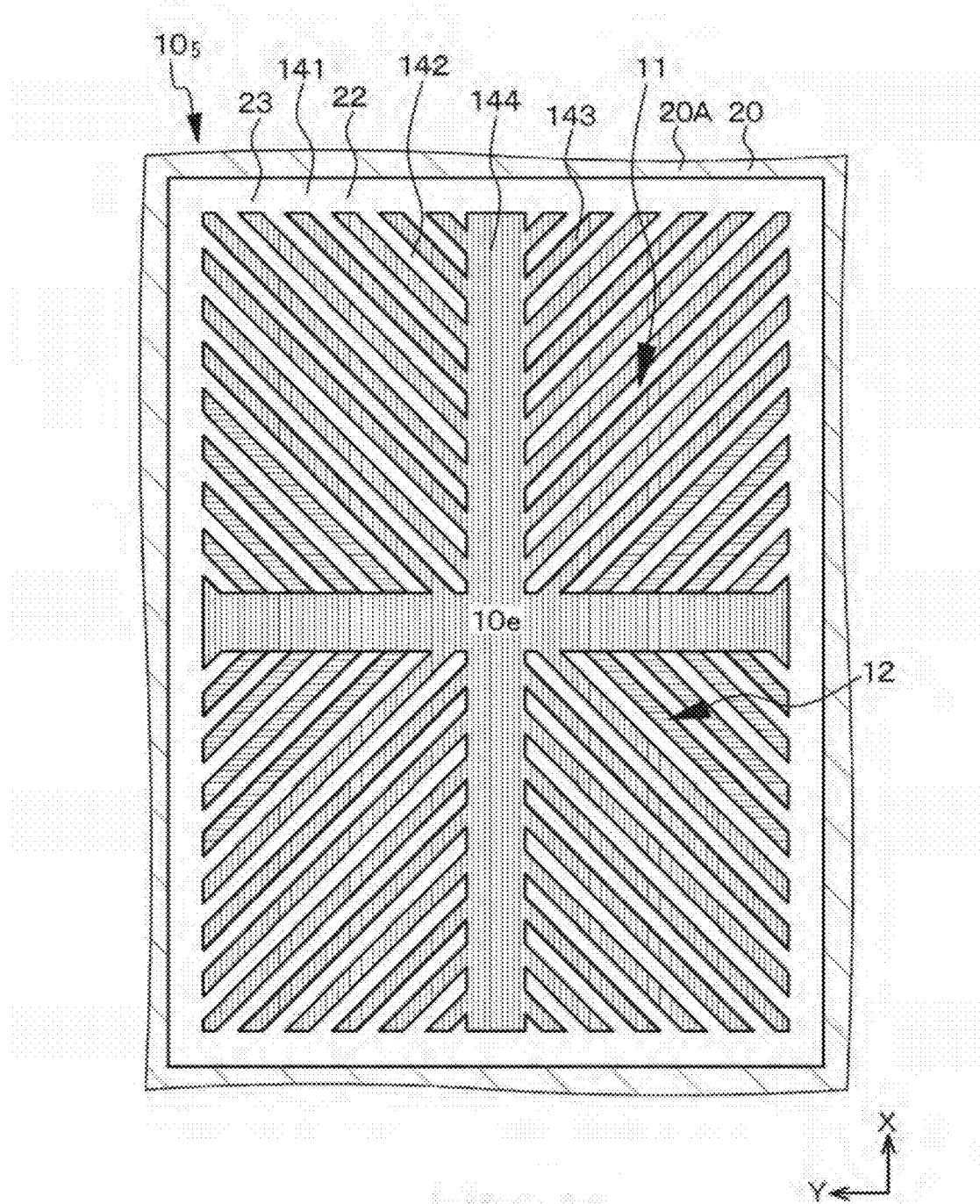
FIG. 23 is a schematic view as one pixel in a first substrate is viewed from above in a liquid-crystal display apparatus of Example 5.
Figure 24:
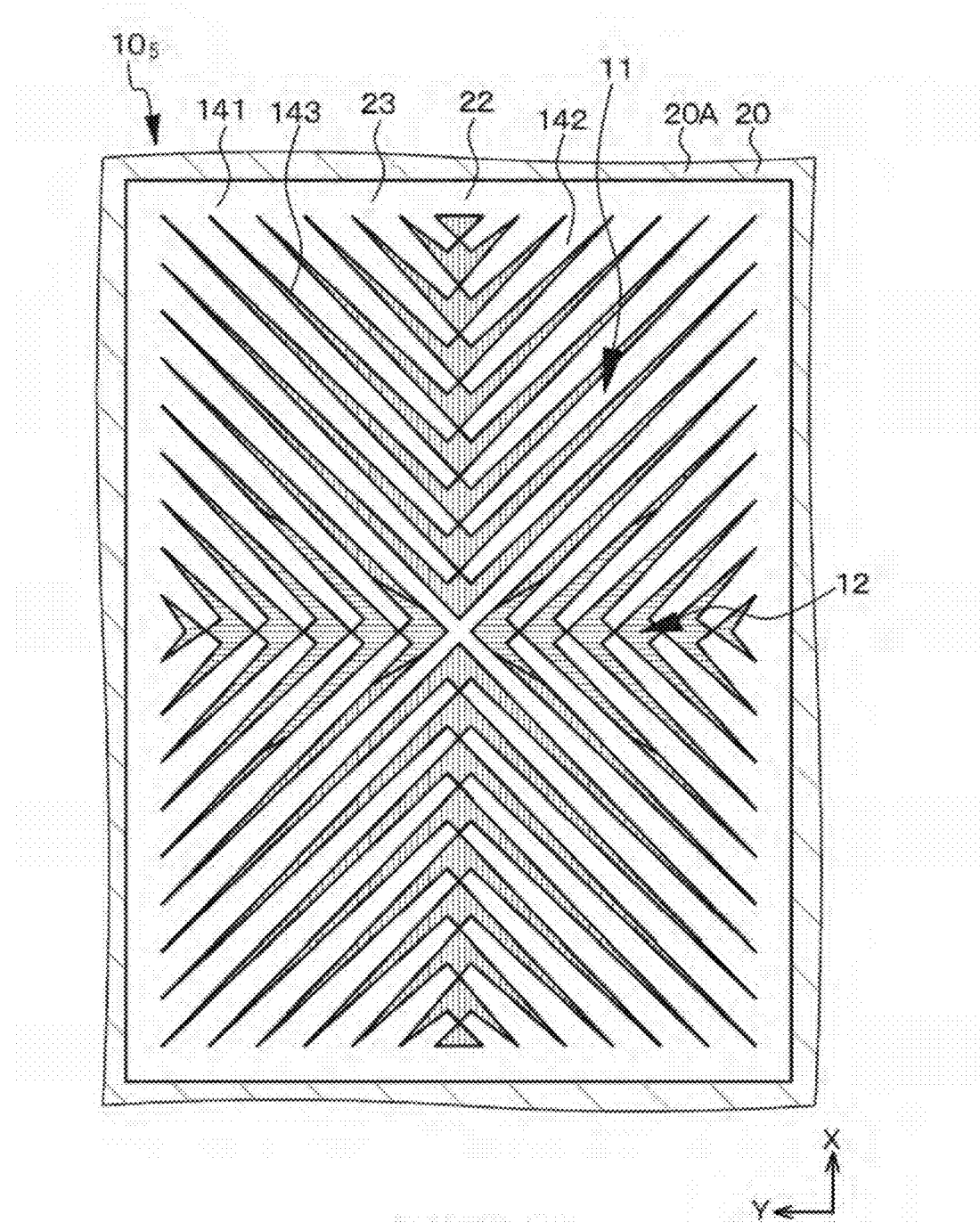
FIG. 24 is a schematic view as the one pixel in the first substrate is viewed from above in a variant example of the liquid-crystal display apparatus of Example 5.

Example 5 is a variant of Examples 1 to 4. Example 5 relates to the liquid-crystal display apparatus according to the first(C) aspect, the second(C) aspect, or the third(C) aspect of the present disclosure, and relates to the liquid-crystal display apparatus according to the first(B) (3) aspect, the second(B) (3) aspect, or the third(B) (3) aspect of the present disclosure. A schematic view of one pixel 10₅ in the first substrate 20 that constitutes a liquid-crystal display apparatus of Example 5 as viewed from above is shown in FIGS. 23 and 24. A schematic partial sectional view of the liquid-crystal display apparatus of Example 5 is similar to that shown in FIG. 4.

In the liquid-crystal display apparatus of Example 5, the concave and convex portion 11 is constituted of a stem convex portion 141 formed in a frame-like shape in the pixel peripheral portion and a plurality of branch convex portions 142 that extend toward the inside of the pixel from the stem convex portion 141.

Here, assuming that an axial line passing through a pixel center 10e of each pixel $10_5$ and extending parallel to the first direction is the X-axis and an axial line passing through the pixel center 10e of each pixel $10_5$ and extending parallel to the second direction is the Y-axis, a plurality of branch convex portions 142 (that are also convex portions 142. The same applies hereinafter) occupying a first quadrant extend parallel to a direction in which a value of the Y-coordinate increases when a value of the X-coordinate increases, a plurality of branch convex portions 142 occupying a second quadrant extend parallel to a direction in which the value of the Y-coordinate increases when the value of the X-coordinate decreases, a plurality of branch convex portions 142 occupying a third quadrant extend parallel to a direction in which the value of the Y-coordinate decreases when the value of the X-coordinate decreases, and a plurality of branch convex portions 142 occupying a fourth quadrant extend parallel to a direction in which the value of the Y-coordinate decreases when the value of the X-coordinate increases.

The branch convex portions 142 are not connected to each other on a central side of the pixel. That is, in the liquid-crystal display apparatus of Example 5, some of the convex portions 142 occupying the first quadrant and some of the convex portions 142 occupying the fourth quadrant are not joined to each other, others of others of the convex portions 142 occupying the first quadrant and some of the convex portions 142 occupying the second quadrant are not joined to each other, the others of the convex portions 142 occupying the second quadrant and some of the convex portions 142 occupying the third quadrant are not joined to each other, and the others of the convex portions 142 occupying the third quadrant and the others of the convex portions 142 occupying the fourth quadrant are not joined to each other.

In the example shown in FIG. 23, a stem concave portion 144 extends on the X-axis and the Y-axis and a width of each of the branch convex portions 142 is constant. On the other hand, in the example shown in FIG. 24, the stem convex portion is not provided and the width of the convex portion 142 decreases toward the pixel center.

In the example shown in FIG. 24, the convex portions 142 are not joined to one other. However, the convex portions 142 may be in a contact state. Here, the phrase "being joined" refers to a state in which the convex portions cross one another by a certain length and the phrase "being in contact" refers to a state in which the convex portions cross one another by a very short length (in spots in a sense). In this manner, by forming the convex portion 142 and the convex portion 142 in an unjoined state, the electric field generated by the first electrode 22 in the center of the pixel is distorted in a desired state in the vicinity of the center of the pixel, and the falling direction of the liquid-crystal molecules is defined. As a result, it is possible to increase the alignment regulation force for the liquid-crystal molecules in the vicinity of the center of the pixel. It is possible to accurately define the tilt state of the liquid-crystal molecules in the vicinity of the center of the pixel. Therefore, during manufacture of the liquid-crystal display apparatus, in order to give a pretilt to the liquid-crystal molecules, the liquid-crystal layer is exposed to a desired electric field for a predetermined time. However, it is possible to achieve a reduction in a time necessary until the alignment of the liquid-crystal molecules exposed to the desired electric field is stabilized. That is, it becomes possible to give a pretilt to the liquid-crystal molecules in short time, and it becomes possible to achieve a reduction in the manufacturing time of the liquid-crystal display apparatus.

With such a configuration, a portion of the convex portion that extends parallel to the X-axis or a portion of the convex portion that extends parallel to the Y-axis is not present. Or, a length thereof is short even if present. Thus, effects similar to those described in Example 7 to be described later can be obtained.

Excluding the above points, the liquid-crystal display apparatus of Example 5 can be similar to the configuration and structure of the liquid-crystal display apparatus of Examples 1 to 4. Therefore, a detailed description thereof will be omitted.

Example 6

Figure 25:
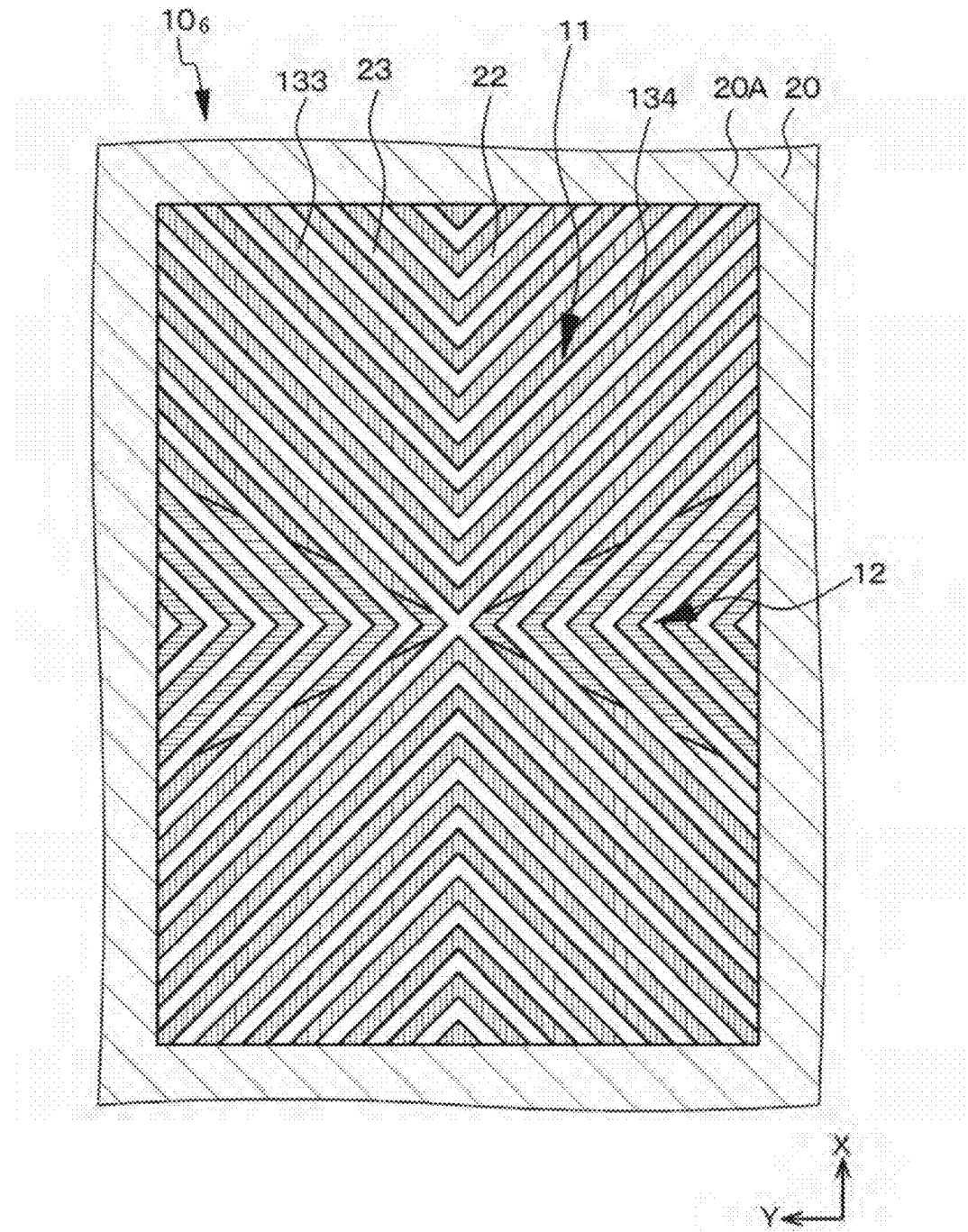
FIG. 25 is a schematic view as one pixel in a first substrate is viewed from above in a liquid-crystal display apparatus of Example 6.

Example 6 is also a variant of Examples 1 to 4. Example 6 relates to the first(B) aspect, the second(B) aspect, or the third(B) aspect of the present disclosure, specifically, the liquid-crystal display apparatus according to the first(B) (1) aspect, the second(B) (1) aspect, or the third(B) (1) aspect of the present disclosure. In a liquid-crystal display apparatus of Example 6, a schematic view of one pixel $10_6$ in the first substrate 20 as viewed from above is shown in FIG. 25. A schematic partial sectional view of the liquid-crystal display apparatus of Example 6 is similar to that shown in FIG. 4.

In the liquid-crystal display apparatus of Example 6, assuming that an axial line passing through the pixel center of each pixel and extending parallel to the first direction is an X-axis and an axial line passing through the pixel center of each pixel and extending parallel to the second direction is a Y-axis, a plurality of convex portions 134 occupying a first quadrant extend parallel to a direction in which a value of the Y-coordinate increases when a value of the X-coordinate increases, a plurality of convex portions 134 occupying a second quadrant extend parallel to a direction in which the value of the Y-coordinate increases when the value of the X-coordinate decreases, a plurality of convex portions 134 occupying a third quadrant extend parallel to a direction in which the value of the Y-coordinate decreases when the value of the X-coordinate decreases, and a plurality of convex portions 134 occupying a fourth quadrant extend parallel to a direction in which the value of the Y-coordinate decreases when the value of the X-coordinate increases.

Some of the convex portions 134 occupying the first quadrant and some of the convex portions 134 occupying the fourth quadrant are formed in a connected state, others of the convex portions 134 occupying the first quadrant and some of the convex portions 134 occupying the second quadrant are formed in a connected state, others of the convex portions 134 occupying the second quadrant and some of the convex portions 134 occupying the third quadrant are formed in a connected state, and others of the convex portions 134 occupying the third quadrant and the others of the convex portions 134 occupying the fourth quadrant are formed in a connected state. A planar shape of each of the convex portions 134 is a "V"-shape.

The liquid-crystal display apparatus of Example 6 is different from the liquid-crystal display apparatuses of Examples 1 to 4 in that the stem convex portion 131 is not provided. Excluding the above points, the liquid-crystal display apparatus of Example 6 can be similar to the configuration and structure of the liquid-crystal display apparatus of Examples 1 to 4. Therefore, a detailed description thereof will be omitted.

Figure 26:
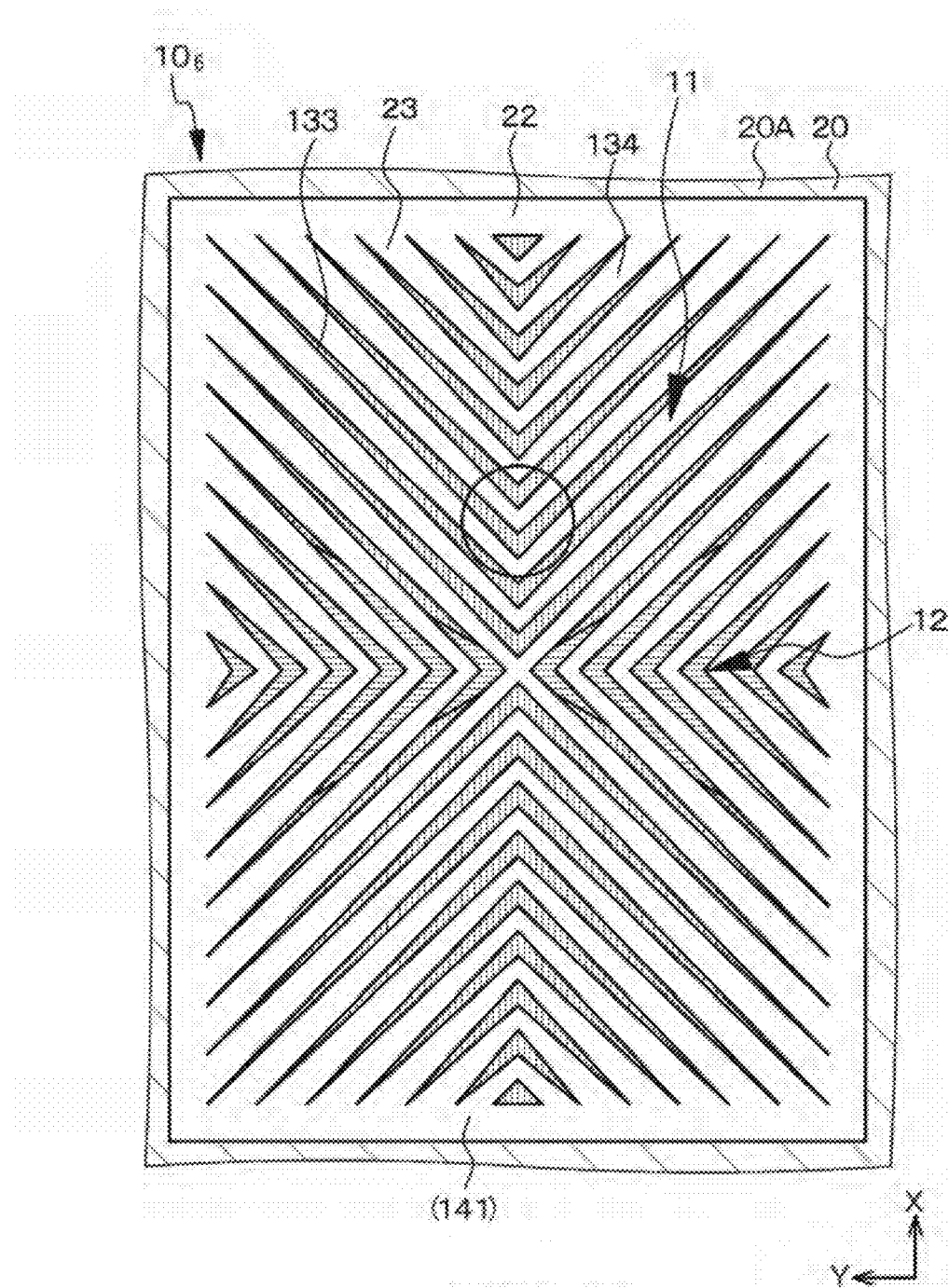
FIG. 26 is a schematic view as the one pixel in the first substrate is viewed from above in a variant example of the liquid-crystal display apparatus of Example 6.

A variant example of the liquid-crystal display apparatus of Example 6 shown in FIG. 25 is shown in FIG. 26. In a liquid-crystal display apparatus shown in FIG. 26, a width of each of the convex portions 134 becomes narrower as it becomes closer to the pixel center. Further, the convex portion 134 is connected to the adjacent convex portions 134 in an outer peripheral portion of the pixel. That is, the variant example of the liquid-crystal display apparatus of Example 6 that is shown in FIG. 26 also corresponds to the variant example of the liquid-crystal display apparatus of Example 5 according to the first(C) aspect, the second(C) aspect, or the third(C) aspect of the present disclosure.

In each of the liquid-crystal display apparatuses shown in FIGS. 25 and 26, a portion of the convex portion that extends parallel to the X-axis or a portion of the convex portion that extends parallel to the Y-axis is not present, excluding the root of the convex portion 134. Here, the absorption axis of the first polarization plate is parallel with the X-axis or the Y-axis and the absorption axis of the second polarization plate is parallel with the Y-axis or the X-axis. Thus, generated dark lines can be further reduced. That is, a more uniform and higher light transmittance can be provided, and a more favorable voltage response characteristic can be obtained. Further, initial alignment is improved, and hence it is possible to achieve a reduction in time for giving a pretilt to the liquid-crystal molecules. In addition, a reduction in alignment defects can be expected, and hence the yield is enhanced and a reduction in production costs for the liquid-crystal display apparatus becomes possible. In addition, an enhancement in the light transmittance can be achieved, and hence it is possible to achieve a reduction in power consumption of the back light and an improvement of the reliability of the TFT.

Figure 27A:
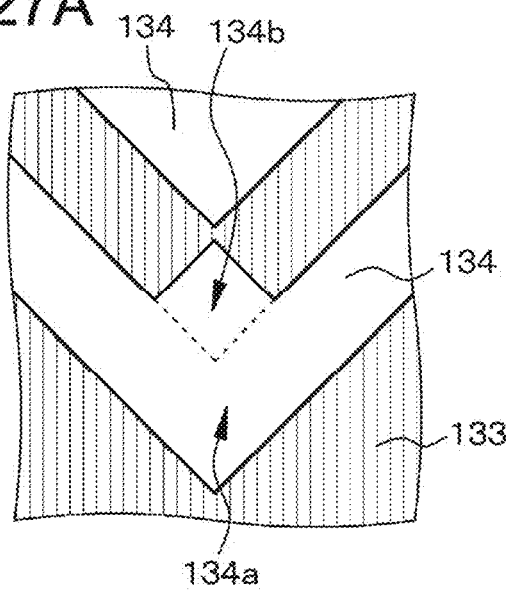
FIGS. 27A and 27B are schematic plan views each showing a portion of the first electrode that constitutes a variant example of the liquid-crystal display apparatus of Example 6.
Figure 27B:
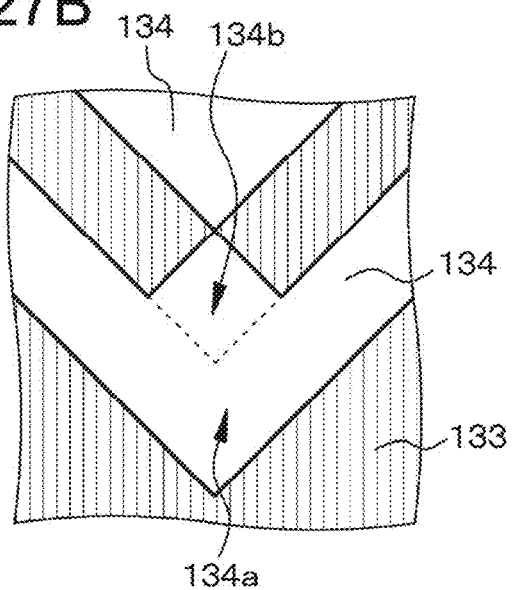
Figure 28A:
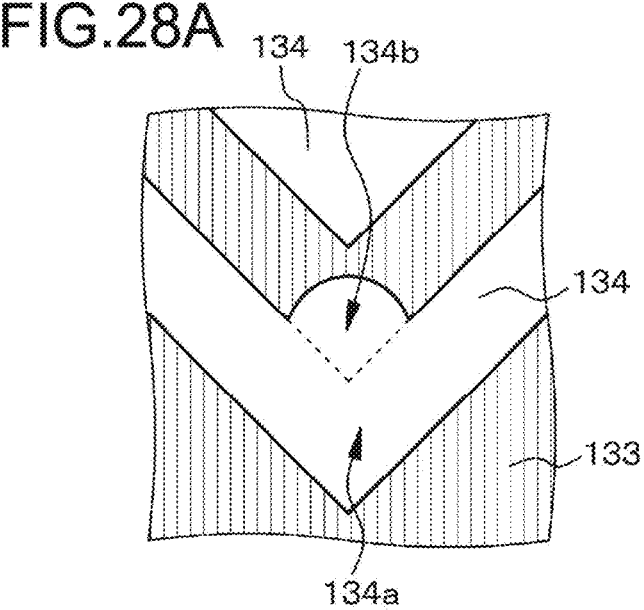
FIGS. 28A and 28B are schematic plan views each showing a portion of the first electrode that constitutes another variant example of the liquid-crystal display apparatus of Example 6.
Figure 28B:
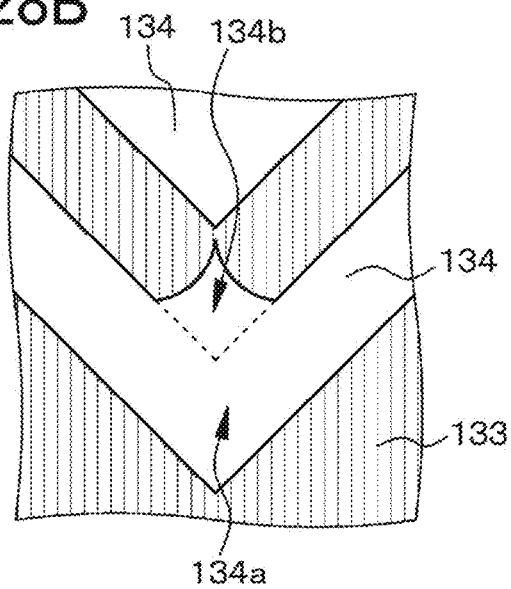

Schematic plan views of portions of first electrodes that constitute variant examples of the liquid-crystal display apparatus of Example 6 are shown in FIGS. 27A, 27B, 28A, and 28B in an enlarged state. Each of FIGS. 27A, 27B, 28A, and 28B is a schematic plan view showing, in an enlarged state, a portion of the first electrode that is surrounded by the circular region in the schematic plan view of the first electrode of FIG. 26. In the liquid-crystal display apparatus of the variant example of Example 6, in a joined part 134a of two convex portions 134, a projection 134b extending in a direction of a peripheral portion of a pixel $10_6$ is provided. It is possible to employ a configuration in which the projection 134b is surrounded by a plurality of line segments (two line segments in the example shown in the figure) as shown in FIGS. 27A and 27B. It is also possible to employ a configuration in which the projection 134b is surrounded by a single curve as shown in FIG. 28A. It is also possible to employ a configuration in which the projection 134b is surrounded by a plurality of curves (two curves in the example shown in the figure) as shown in FIG. 28B. It is also possible to employ a configuration in which the projection 134b is surrounded by a combination of the line segments with the curves. In the example shown in FIG. 27A, a tip end of the projection 134b is not in contact with the joined part of the two branch convex portions adjacent to each other in the direction of the peripheral portion of the pixel. On the other hand, in the example shown in FIG. 27B, the tip end of the projection 134b is in contact with the joined part of the two branch convex portions adjacent to each other in the direction of the peripheral portion of the pixel.

Also with such a configuration, a portion of the convex portion that extends parallel to the X-axis or a portion of the convex portion that extends parallel to the Y-axis is not present or has an extremely small length even if present. In addition, in a portion inside a bottom portion of the "V"-shape of the convex portion, the projection 134b is provided. Therefore, the state alignment of the liquid-crystal molecules positioned in the vicinity of the inside of the bottom portion of the "V"-shape of the convex portion can be put in a more desired state in comparison with the case where the projection 134b is not provided in the portion of the bottom portion of the "V"-shape of the convex portion.

Figure 29:
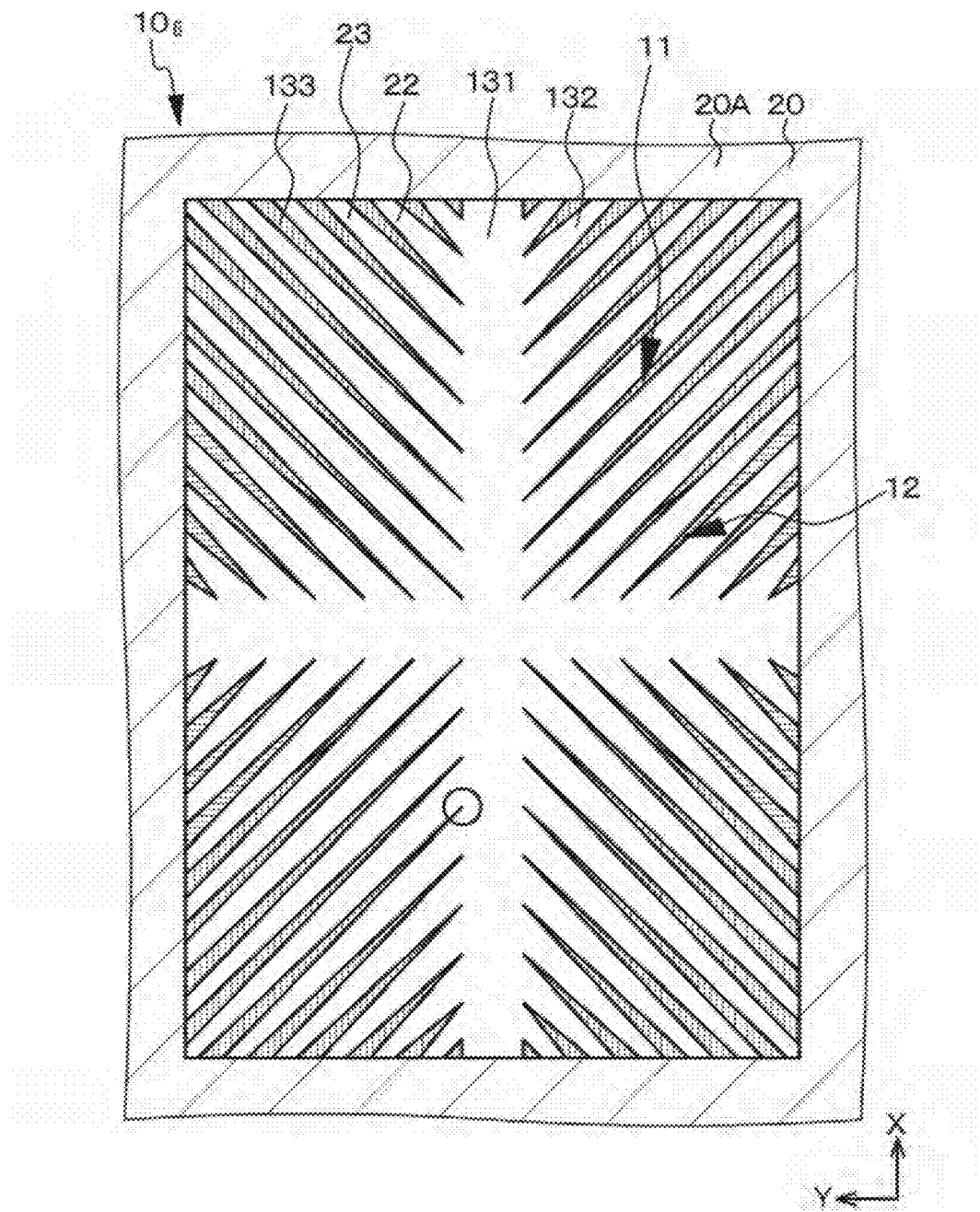
FIG. 29 is a schematic view as the one pixel in the first substrate is viewed from above in another variant example of the liquid-crystal display apparatus of Example 6.
Figure 30:
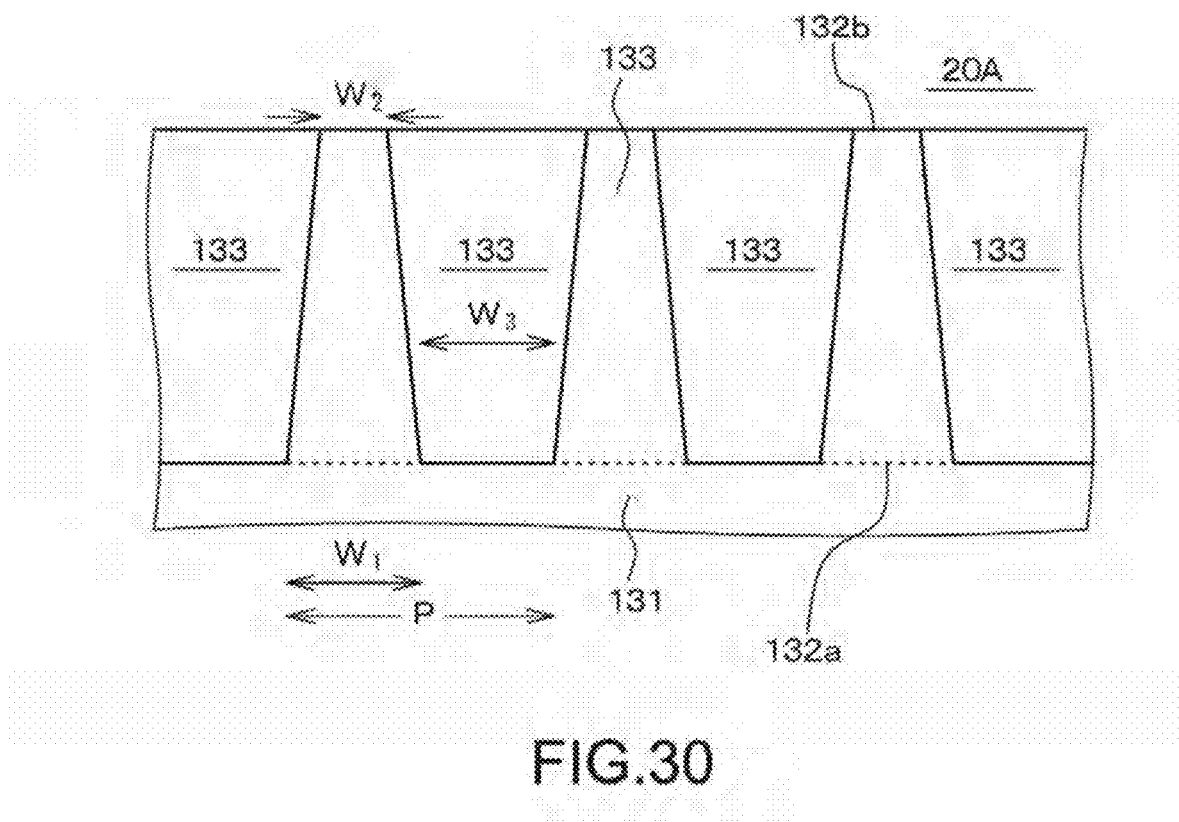
FIG. 30 is a conceptual plan view of the portion of the first electrode that constitutes the other variant example of the liquid-crystal display apparatus of Example 6 in an enlarged state.

FIG. 29 shows another variant example of the liquid-crystal display apparatus of Example 6. In this variant example of the liquid-crystal display apparatus of Example 6, a width of each of the concave portions 133 is smallest in a portion (indicated by the region surrounded by the circle in FIG. 29) at which the concave portion 133 extends out from the stem convex portion 131. In other words, the width of the branch convex portion 132 is largest in a portion 132a of the branch convex portion that is joined to the stem convex portion 131 and decreases toward a tip end portion 132b from the portion 132a joined to the stem convex portion 131 (specifically, it is linearly narrowed). FIG. 30 shows a conceptual plan view of the portion of the first electrode that constitutes the other variant example of the liquid-crystal display apparatus of Example 6.

Figure 31A:
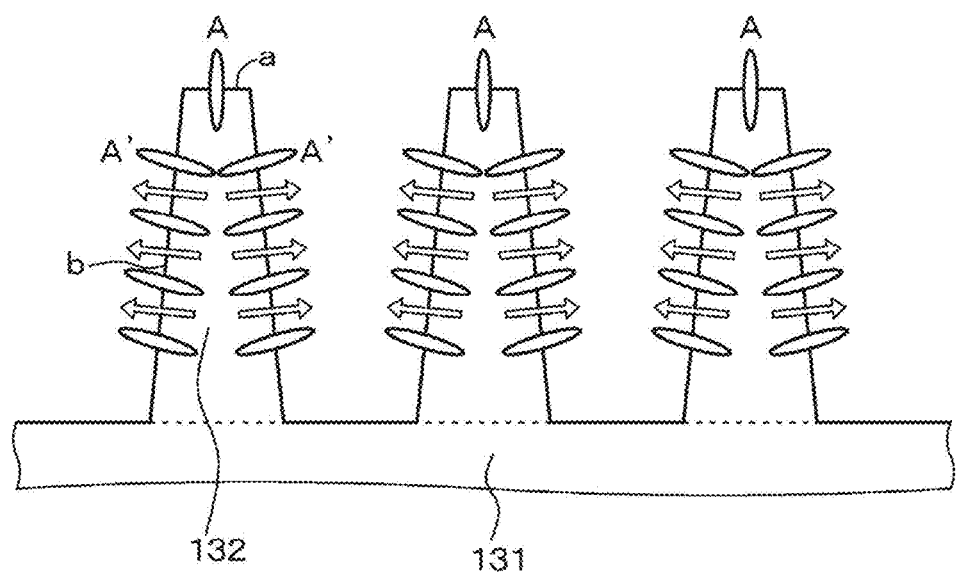
FIGS. 31A and 31B are schematic views for respectively describing another variant example of the liquid-crystal display apparatus of Example 6 and behaviors of liquid-crystal molecules in a branch convex portion of a liquid-crystal display apparatus in which the branch convex portion is not tapered.
Figure 31B:
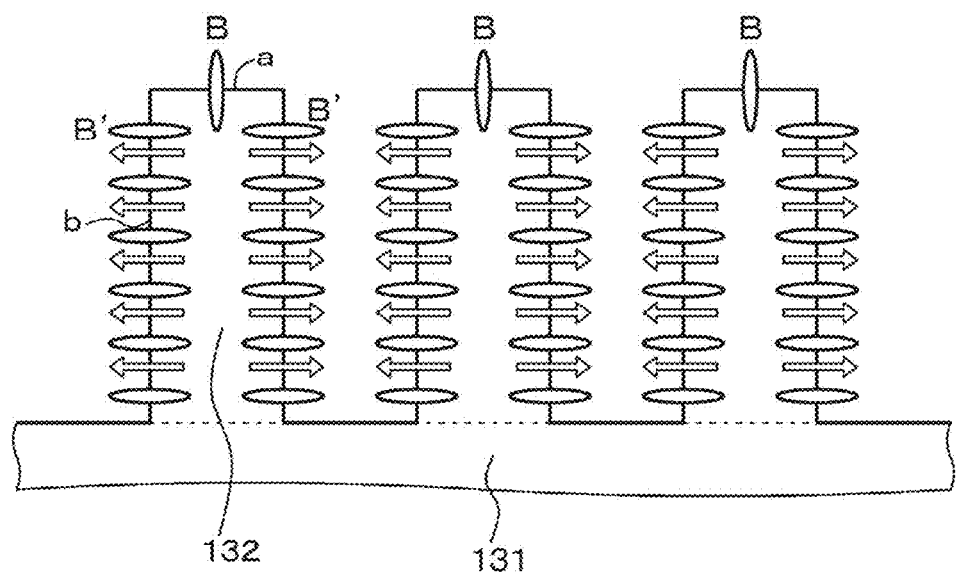

During manufacture of the liquid-crystal display apparatus, a pretilt is given to the liquid-crystal molecules in a state in which a voltage is applied on the electrode. At this time, as shown in FIGS. 31A and 31B, regarding a liquid-crystal molecule A positioned in a tip-end edge portion a or in the vicinity thereof (for the sake of convenience, referred to as "tip end region"), a long-axis direction (director) thereof is inclined toward the stem convex portion. Assuming a region including this liquid-crystal molecule A in the liquid-crystal layer in the thickness direction, the motion of the liquid-crystal molecule A is transmitted to liquid-crystal molecules (for the sake of convenience, referred to as "liquid-crystal molecules A'") of the entire pixel excluding the edge portion of the branch convex portion that receives an influence of a local electric field caused due to the structure, and directors of the liquid-crystal molecules A' are inclined toward the stem convex portion. Here, as compared with a liquid-crystal display apparatus in which the branch convex portion is not tapered as shown in FIG. 31B, the motion of the liquid-crystal molecule A is more easily transmitted to the liquid-crystal molecules A' or the motion of the liquid-crystal molecule A is transmitted to the liquid-crystal molecules A' in a shorter time in the liquid-crystal display apparatus in which the branch convex portion is tapered as shown in FIG. 31A.

When a voltage is applied on the electrode in displaying an image in the liquid-crystal display apparatus, the liquid-crystal molecules change such that the directors are parallel to the first substrate and the second substrate in the entire liquid-crystal layer. In FIGS. 31A and 31B, directions of the electric field in lateral-side edge portions are indicated by the white arrows. Here, assuming a columnar region in the thickness direction in the liquid-crystal layer including a liquid-crystal molecule B positioned in a lateral-side edge portion b or in the vicinity thereof (for the sake of convenience, referred to as "lateral-side region"), liquid-crystal molecules arranged in the thickness direction within this columnar region are rotated. That is, a direction of a director of the liquid-crystal molecule B positioned in the lateral-side region and directions of directors of the liquid-crystal molecules (for the sake of convenience, referred to as "liquid-crystal molecules B'") arranged in the thickness direction within the columnar region including the liquid-crystal molecule B are in different states. It is assumed that an angle formed by the director of the liquid-crystal molecules B and the director of each of the liquid-crystal molecules B' is denoted by β. Here, in the liquid-crystal display apparatus in which the branch convex portion is not tapered as shown in FIG. 31B, a range of the rotational angle between the liquid-crystal molecules is wider (i.e., the angle β is larger). Therefore, a ratio of the liquid-crystal molecules having retardation in an X-axis direction or a Y-axis direction is sometimes lower. On the other hand, in the liquid-crystal display apparatus in which the branch convex portion is tapered as shown in FIG. 31A, the range of the rotational angle between the liquid-crystal molecules is narrower (i.e., the angle β is smaller). Therefore, the ratio of the liquid-crystal molecules having retardation in the X-axis direction or the Y-axis direction is higher. Therefore, generation of dark lines can be more reliably suppressed without making the light transmittance of the branch convex portion non-uniform.

With the conventional fine-slit structure, an electric field can hardly influence liquid-crystal molecules in a space portion in which no electrodes are provided and it is difficult for the liquid-crystal molecules to be aligned (to fall down) in desired directions. Therefore, a dark line is generated correspondingly to such a space portion, which lowers the light transmittance. In the other variant example of the liquid-crystal display apparatus of Example 6, the liquid-crystal molecules receive the influence of the electric field in the entire region of the pixel. Therefore, the phenomenon of generation of dark lines in the fine-slit structure does not occur. Further, in the conventional fine-slit structure, an area ratio of the electrode and the space portion greatly influences the light transmittance. On the other hand, in Example 6, the space portion is not present. Therefore, such a problem does not occur.

As described above, in the other variant example of the liquid-crystal display apparatus of Example 6, a plurality of concave and convex portions are formed in the first electrode and the width of the branch convex portion provided in this first electrode decreases toward the tip end portion. Therefore, generated dark lines can be further reduced. That is, a more uniform and higher light transmittance can be provided, and a more favorable voltage response characteristic can be obtained. Further, an improvement of the initial alignment can be expected. Therefore, as described above, when a uniform ultraviolet ray is emitted in a state in which an alternate-current electric field having rectangular waves is applied on the liquid-crystal cell, to thereby give a pretilt to the liquid-crystal molecules, it is possible to achieve a reduction in time for giving a pretilt to the liquid-crystal molecules. Further, a reduction in alignment defects can be expected, and hence the yield is enhanced and a reduction in production costs for the liquid-crystal display apparatus becomes possible. In addition, an enhancement in the light transmittance can be achieved, and hence it is possible to achieve a reduction in power consumption of the back light and an improvement of the reliability of the TFT.

Example 7

Figure 32:
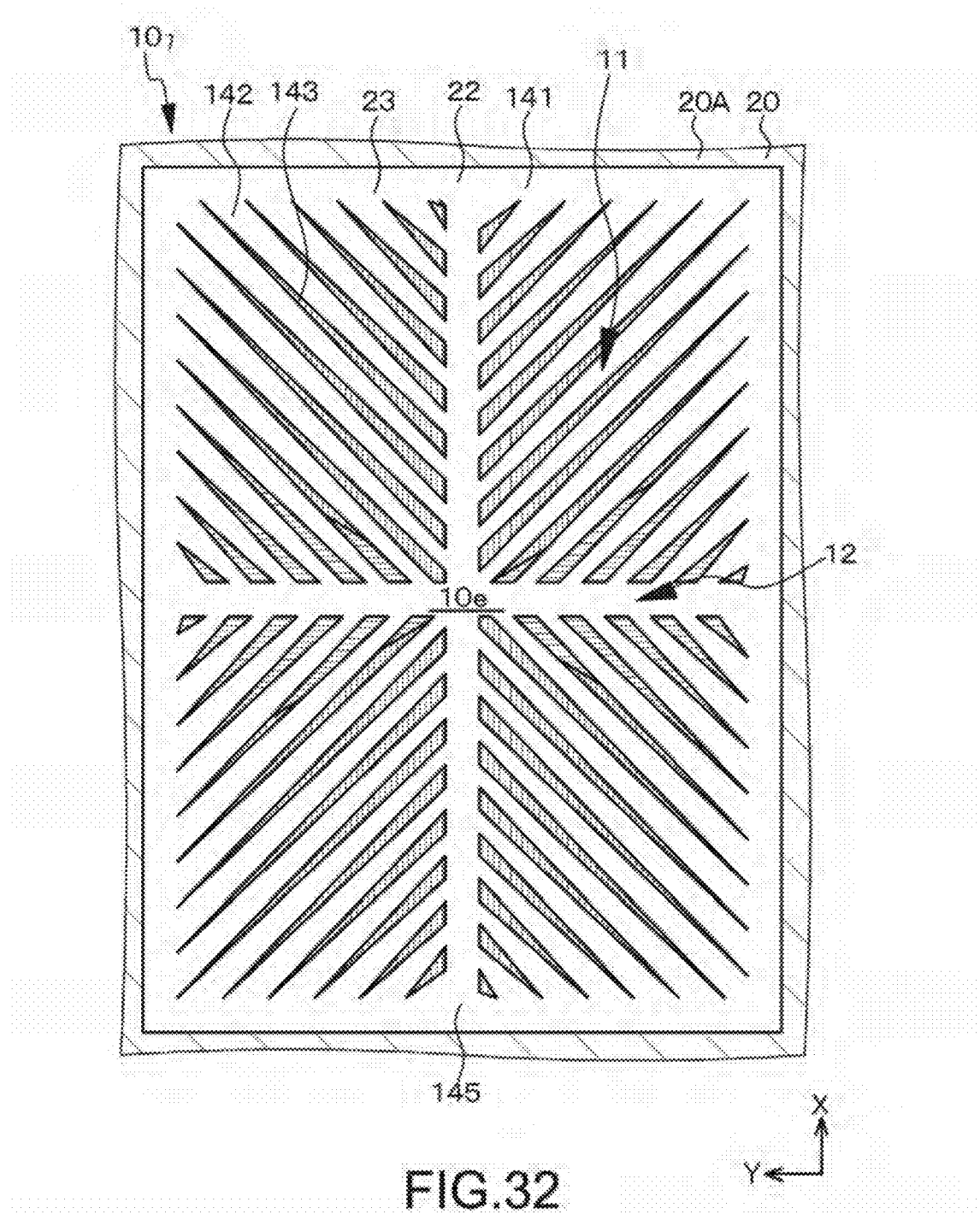
FIG. 32 is a schematic view as one pixel in a first substrate is viewed from above in a liquid-crystal display apparatus of Example 7.

Example 7 is a variant of Example 6. Example 7 relates to the first(B) (2) aspect, the second(B) (2) aspect, or the third(B) (2) aspect of the present disclosure and relates to the liquid-crystal display apparatus according to the first(C) aspect, the second(C) aspect, or the third(C) aspect of the present disclosure. In a liquid-crystal display apparatus of Example 7, a schematic view of one pixel $10_7$ in the first substrate 20 as viewed from above is shown in FIG. 32. A schematic partial end view of the liquid-crystal display apparatus of Example 7 is substantially the same as that of FIG. 4.

In the liquid-crystal display apparatus of Example 7, the concave and convex portion 11 is constituted of a stem convex portion 141 formed in a frame-like shape in the pixel peripheral portion and a plurality of branch convex portions 142 extending toward an inside of the pixel from the stem convex portion 141.

Some of the convex portions 142 occupying the first quadrant and some of the convex portions 142 occupying the fourth quadrant are formed in a connected state, others of the convex portions 142 occupying the first quadrant and some of the convex portions 142 occupying the second quadrant are formed in a connected state, others of the convex portions 142 occupying the second quadrant and some of the convex portions 142 occupying the third quadrant are formed in a connected state, and others of the convex portions 142 occupying the third quadrant and others of the convex portions 142 occupying the fourth quadrant are formed in a connected state.

A second stem convex portion 145 extends on the X-axis and the Y-axis, and tip end portions of the convex portions 142 are connected to the second stem convex portion 145.

In addition, some of the convex portions 142 occupying the first quadrant and some of the convex portions 142 occupying the fourth quadrant are formed in a deviated state, the others of the convex portions 142 occupying the first quadrant and the some of the convex portions 142 occupying the second quadrant are formed in a deviated state, the others of the convex portions 142 occupying the second quadrant and the some of the convex portions 142 occupying the third quadrant are formed in a deviated state, and the others of the convex portions 142 occupying the third quadrant and the others of the convex portions 142 occupying the fourth quadrant are formed in a deviated state.

Note that, assuming that the formation pitch of the convex portions 142 along the X-axis was denoted by $P_X$ and the formation pitch of the convex portions 142 along the Y-axis was denoted by $P_Y$ ($=P_X$), the width of each of the convex portions 142 was set to ($P_Y/2=P_X/2$) and the width of each of the concave portions 133 was set to ($P_Y/2=P_X/2$). That is, in the liquid-crystal display apparatus shown in FIG. 32, the some of the convex portions 142 occupying the first quadrant and the some of the convex portions 142 occupying the fourth quadrant are formed in a state deviated from each other by ($P_X/2$), the others of the convex portions 142 occupying the first quadrant and the some of the convex portions 142 occupying the second quadrant are formed in a state deviated from each other by ($P_Y/2$), the others of the convex portions 142 occupying the second quadrant and the some of the convex portions 142 occupying the third quadrant are formed in a state deviated from each other by ($P_X/2$), and the others of the convex portions 142 occupying the third quadrant and the others of the convex portions 142 occupying the fourth quadrant are formed in a state deviated from each other by ($P_Y/2$). The convex portions 142 are not line-symmetrical with respect to the X-axis and the Y-axis but are rotationally symmetrical (point-symmetrical) with respect to the center of the pixel by 180 degrees.

In this manner, by forming the convex portion 142 and the convex portion 142 to be deviated from each other by a semi-pitch, the electric field generated by the first electrode 22 in the center of the pixel is distorted in the vicinity of the center of the pixel, and the falling direction of the liquid-crystal molecules is defined. As a result, it is possible to increase the alignment regulation force for the liquid-crystal molecules in the vicinity of the center of the pixel. It is possible to accurately define the tilt state of the liquid-crystal molecules in the vicinity of the center of the pixel. Therefore, during manufacture of the liquid-crystal display apparatus, in order to give a pretilt to the liquid-crystal molecules, the liquid-crystal layer is exposed to a desired electric field for a predetermined time. However, it is possible to achieve a reduction in a time necessary until the alignment of the liquid-crystal molecules exposed to the desired electric field is stabilized. That is, it becomes possible to give a pretilt to the liquid-crystal molecules in short time, and it becomes possible to achieve a reduction in the manufacturing time of the liquid-crystal display apparatus.

Excluding the above points, the liquid-crystal display apparatus of Example 7 can be similar to the configuration and structure of the liquid-crystal display apparatus of any one of Examples 1 to 5. Therefore, a detailed description thereof will be omitted.

Example 8

Figure 33:
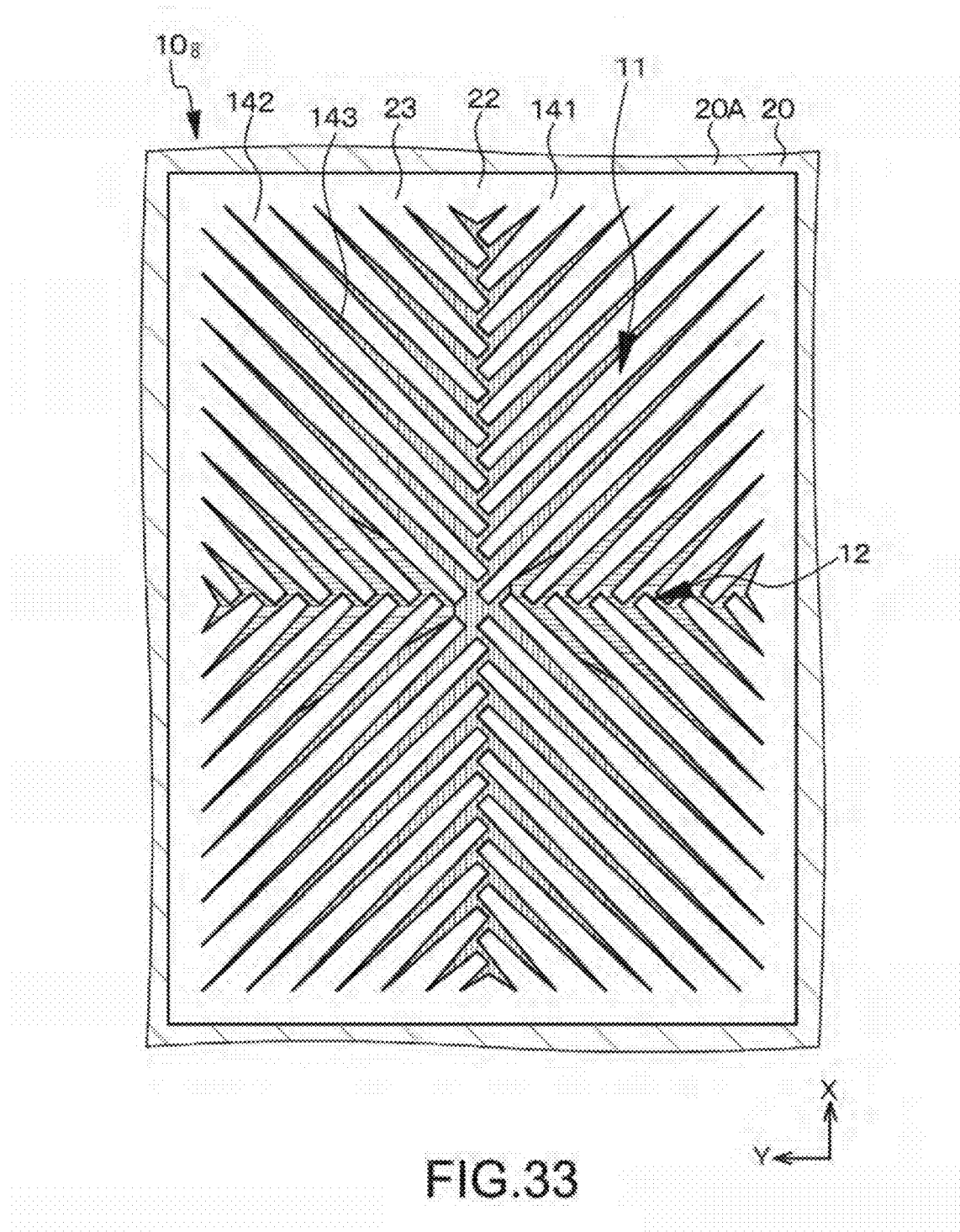
FIG. 33 is a schematic view as one pixel in a first substrate is viewed from above in a variant example of a liquid-crystal display apparatus of Example 8.

Example 8 is also a variant of Example 6. Example 8 relates to the first(B) (4) aspect, the second(B) (4) aspect, or the third(B) (4) aspect of the present disclosure and relates to the liquid-crystal display apparatus according to the first(C) aspect, the second(C) aspect, the third(C) aspect, or the third(C) aspect of the present disclosure. In a liquid-crystal display apparatus of Example 8, a schematic view of one pixel 10₈ in the first substrate 20 as viewed from above is shown in FIG. 33. A schematic partial end view of the liquid-crystal display apparatus of Example 8 is substantially the same as that of FIG. 4.

In the liquid-crystal display apparatus of Example 8, the concave and convex portion 11 is constituted of a stem convex portion 141 formed in a frame-like shape in the pixel peripheral portion and a plurality of branch convex portions 142 extending toward an inside of the pixel from the stem convex portion 141.

Some of the convex portions 142 occupying the first quadrant and some of the convex portions 142 occupying the fourth quadrant are not joined to each other, others of others of the convex portions 142 occupying the first quadrant and some of the convex portions 142 occupying the second quadrant are not joined to each other, others of the convex portions 142 occupying the second quadrant and some of the convex portions 142 occupying the third quadrant are not joined to each other, and others of the convex portions 142 occupying the third quadrant and others of the convex portions 142 occupying the fourth quadrant are not joined to each other.

In addition, the some of the convex portions 142 occupying the first quadrant and the some of the convex portions 142 occupying the fourth quadrant are formed in a deviated state, the others of the convex portions 142 occupying the first quadrant and the some of the convex portions 142 occupying the second quadrant are formed in a deviated state, the others of the convex portions 142 occupying the second quadrant and the some of the convex portions 142 occupying the third quadrant are formed in a deviated state, and the others of the convex portions 142 occupying the third quadrant and the others of the convex portions 142 occupying the fourth quadrant are formed in a deviated state.

Note that, as in Example 7, assuming that the formation pitch of the convex portions 142 along the X-axis was denoted by $P_X$ and the formation pitch of the convex portions 142 along the Y-axis was denoted by $P_Y$ ($=P_X$), the width of each of the convex portions 142 was set to ($P_Y/2=P_X/2$) and the width of each of the concave portions 133 was set to ($P_Y/2=P_X/2$).

Excluding the above points, the liquid-crystal display apparatus of Example 8 can be similar to the configuration and structure of the liquid-crystal display apparatus of any one of Examples 1 to 5. Therefore, a detailed description thereof will be omitted.

Example 9

Figure 34:
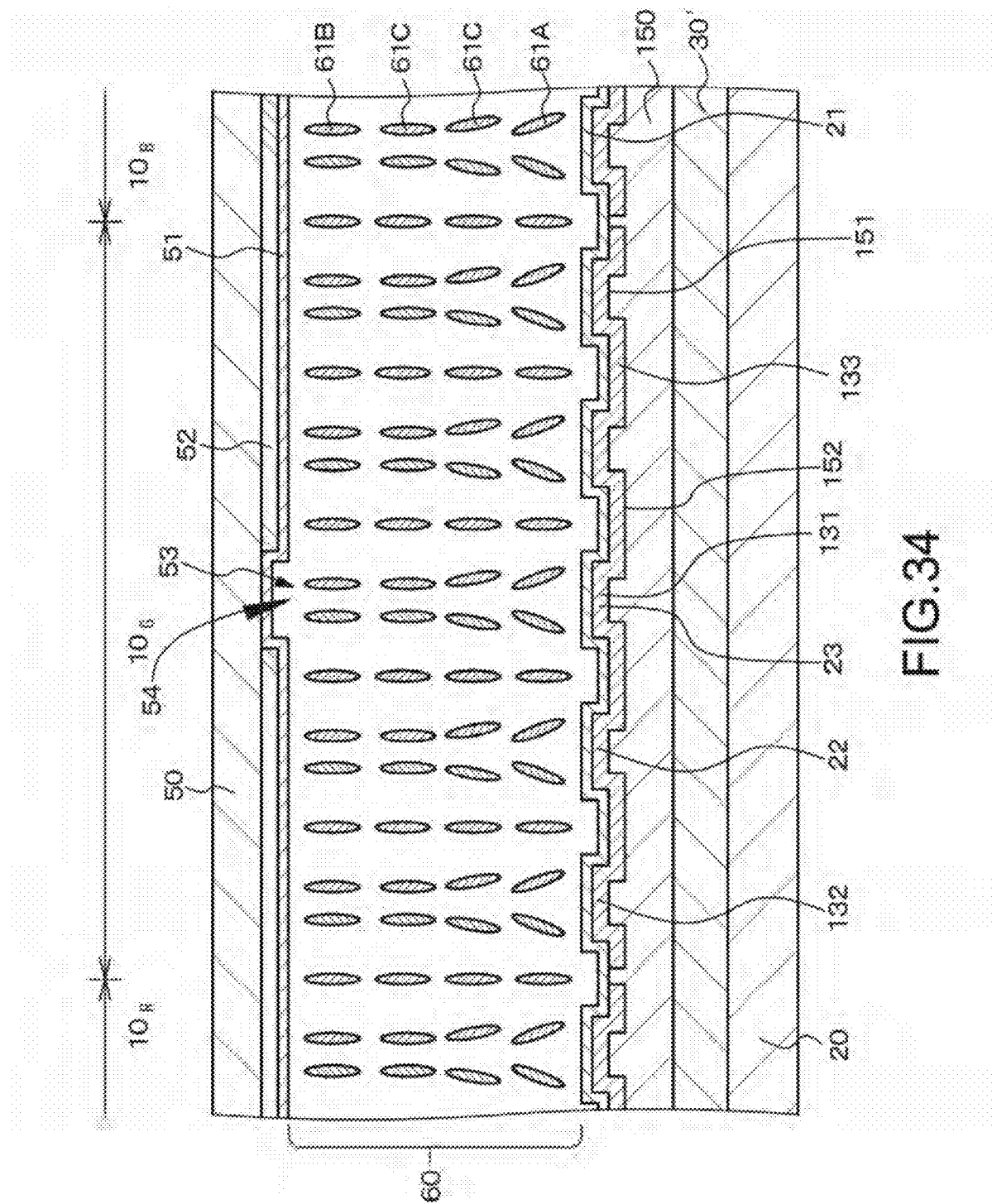
FIG. 34 is a schematic partial end view of a liquid-crystal display apparatus of Example 9.
Figure 35:
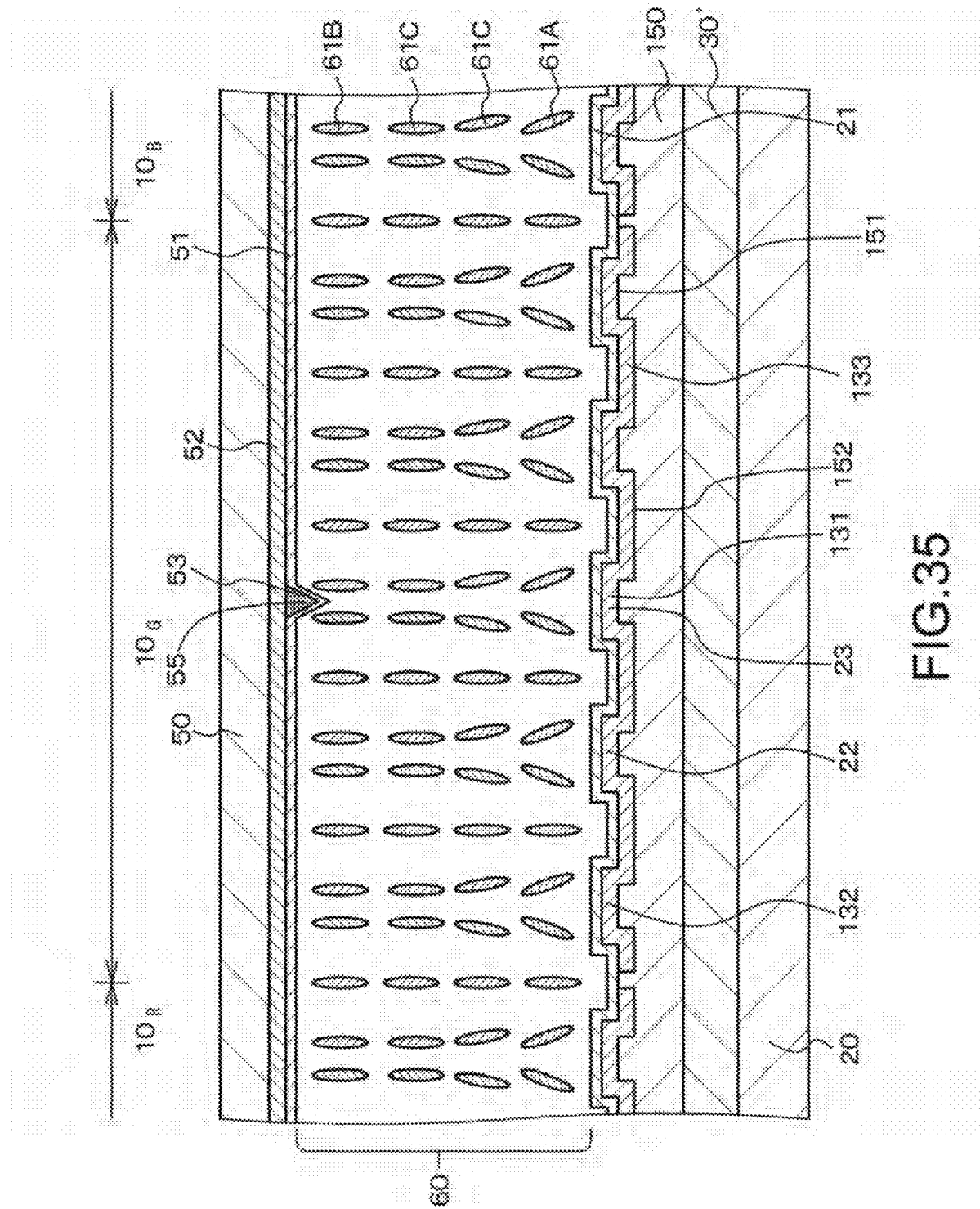
FIG. 35 is a schematic partial end view of a variant example of the liquid-crystal display apparatus of Example 9.
Figure 46B:
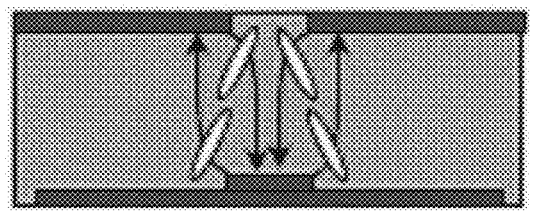

Example 9 is a variant of the liquid-crystal display apparatuses of Examples 1 to 8. A schematic partial end view of a liquid-crystal display apparatus of Example 9 is shown in FIG. 34 or 35. Further, conceptual diagrams showing behaviors of the liquid-crystal molecules in the liquid-crystal display apparatus of Example 9 are shown in FIGS. 46B and 46C.

In the liquid-crystal display apparatus of Example 9, an alignment restriction portion 53 is formed in a portion of the second electrode 52 that corresponds to the X-axis and the Y-axis.

Figure 46C:
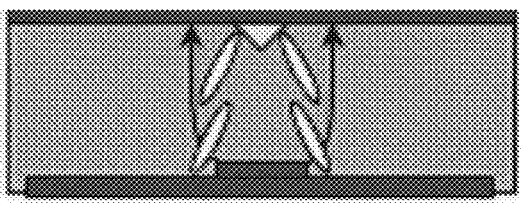

Here, specifically, the alignment restriction portion 53 is formed of a second-electrode slit structure 54 of 4.0 μm that is provided in the second electrode 52 (see FIGS. 34 and 46B) or formed of a second-electrode protrusion portion (rib) 55 provided in the second electrode 52 (see FIGS. 35 and 46C). More specifically, the second-electrode protrusion portion 55 is formed of a negative-type photoresist material (OPTMER AL manufactured by JSR Corporation) and has a width of 1.4 μm and a height of 1.2 μm. A planar shape of the second-electrode slit structure 54 or the second-electrode protrusion portion (rib) 55 is radial (e.g., cross-shaped, for example, extending parallel to X-axis and Y-axis). A cross-sectional shape of the second-electrode protrusion portion 55 is an isosceles triangle. The second electrode 52 is not formed on the second-electrode slit structure 54 or the second-electrode protrusion portion 55.

In the liquid-crystal display apparatus of Example 9, the alignment restriction portion 53 formed of the second-electrode slit structure 54 is formed in the portion of the second electrode 52 that corresponds to the X-axis and the Y-axis. Therefore, the electric field generated by the second electrode 52 is distorted in the vicinity of the alignment restriction portion 53. Alternatively, the alignment restriction portion 53 formed of the second-electrode protrusion portion (rib) 55 is formed. Therefore, the falling direction of the liquid-crystal molecules in the vicinity of the second-electrode protrusion portion 55 is defined. As a result, it is possible to increase the alignment regulation force for the liquid-crystal molecules in the vicinity of the alignment restriction portion 53, and it is possible to accurately define the tilt state of the liquid-crystal molecules in the vicinity of the alignment restriction portion 53. Therefore, the occurrence of the problem in that dark lines may be, when an image is displayed, generated in a portion of the image, which corresponds to the stem convex portion, can be reliably suppressed. That is, it is possible to provide a liquid-crystal display apparatus capable of providing a more uniform and higher light transmittance while keeping a favorable voltage response characteristic. It is possible to achieve a cost reduction and a reduction in power consumption of a light source that constitutes a back light. Further, it is also possible to achieve an improvement of the reliability of the TFT. The alignment restriction portion 53 can also be constituted of a portion of the second electrode 52 that is formed in a protrusion-shape.

Example 10

Example 10 is a variant of the liquid-crystal display apparatus of Examples 1 to 9. In a liquid-crystal display apparatus of Example 10, the first-electrode slit structure or the first-electrode protrusion portion (rib) that passes through the pixel center and is parallel to the pixel peripheral portion is formed in the first electrode. That is, the first-electrode slit structure or the first-electrode protrusion portion is formed in the radial (e.g., cross-shaped) stem concave portion provided in a center portion of the pixel. A planar shape of the first-electrode slit structure or the first-electrode protrusion portion is radial (e.g., cross-shaped, for example, extending parallel to X-axis and Y-axis). The width of the first-electrode slit structure was set to 4.0 μm. Further, the width of the first-electrode protrusion portion formed of a negative-type photoresist material (OPTMER AL manufactured by JSR Corporation) was set to 1.4 μm and the height was set to 1.2 μm. A cross-sectional shape of the first-electrode protrusion portion is an isosceles triangle. The first electrode is not formed on the first-electrode slit structure or the first-electrode protrusion portion.

In the liquid-crystal display apparatus of Example 10, the first-electrode slit structure or the first-electrode protrusion portion that passes through the pixel center and is parallel to the pixel peripheral portion is formed in the first electrode. Therefore, in comparison with the case where the flat convex portion or the concave portion in which the first-electrode slit structure or the first-electrode protrusion portion is not present is formed in the first electrode, the electric field generated by the first electrode is distorted in the vicinity of the first-electrode slit structure or the first-electrode protrusion portion (in the case where the first-electrode slit structure is formed), or the falling direction of the liquid-crystal molecules is defined (in the case where the first-electrode protrusion portion is formed). As a result, it is possible to increase the alignment regulation force for the liquid-crystal molecules in the vicinity of the first-electrode slit structure or the first-electrode protrusion portion and it is possible to accurately define the tilt state of the liquid-crystal molecules in the vicinity of the first-electrode slit structure or the first-electrode protrusion portion. Therefore, the occurrence of a problem in that, when an image is displayed, a dark line may be generated in a portion of the image, which corresponds to the stem convex portion, the second stem convex portion, or the stem concave portion, can be reliably suppressed. That is, it is possible to provide a liquid-crystal display apparatus capable of providing a more uniform and higher light transmittance while keeping a favorable voltage response characteristic. It is possible to achieve a cost reduction and a reduction in power consumption of a light source that constitutes a back light. Further, it is also possible to achieve an improvement of the reliability of the TFT. It is possible to employ an embodiment in which, as the first-electrode protrusion portion, a radial (e.g., cross-shaped, for example, extending parallel to X-axis and Y-axis) convex portion passing through the pixel center is formed while being surrounded by a concave portion. Such a radial convex portion can be provided by forming a radial convex portion below the first electrode. Alternatively, the radial convex portion may be provided by a method similar to the formation method for the concave and convex portion in the first electrode. Alternatively, the radial concave portion passing through the pixel center may be provided instead of the first-electrode slit structure or the first-electrode protrusion portion (rib).

Example 11

Figure 36A:
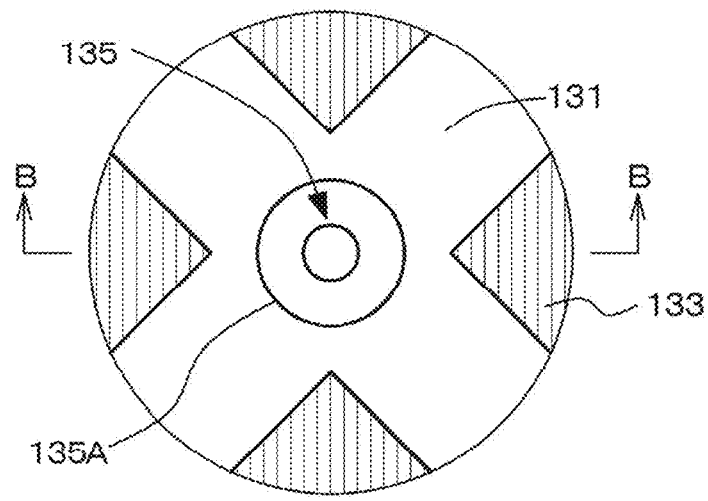
FIG. 36A is a schematic plan view of a portion of a first electrode in a central region of one pixel that constitutes a liquid-crystal display apparatus of Example 11 and FIGS. 36B and 36C are schematic partial sectional views of a portion of the first electrode in the central region of the one pixel that constitutes the liquid-crystal display apparatus of Example 11.
Figure 36B:
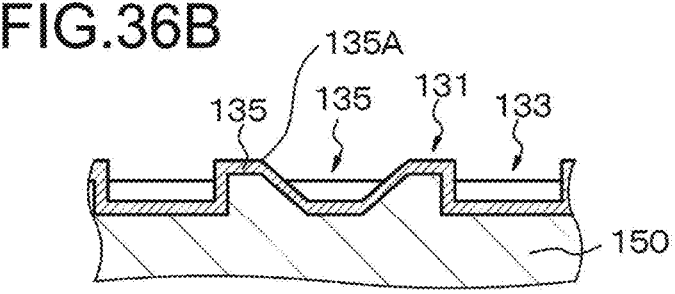

Example 11 is a variant of Examples 1 to 10. Example 11 relates to the liquid-crystal display apparatus according to the first(D) aspect or the second(D) aspect of the present disclosure. A schematic plan view of a portion of the first electrode in a central region of one pixel that constitutes a liquid-crystal display apparatus of Example 11 is shown in each of FIGS. 36A, 37A, and 37B. As shown in FIG. 36B that is a schematic partial sectional view, a depression 135 is provided in the first electrode 22 in the central region of the pixel. Note that a schematic partial sectional view taken along the arrow B-B of FIG. 36A is shown in each of FIGS. 36B and 36C.

Figure 37A:
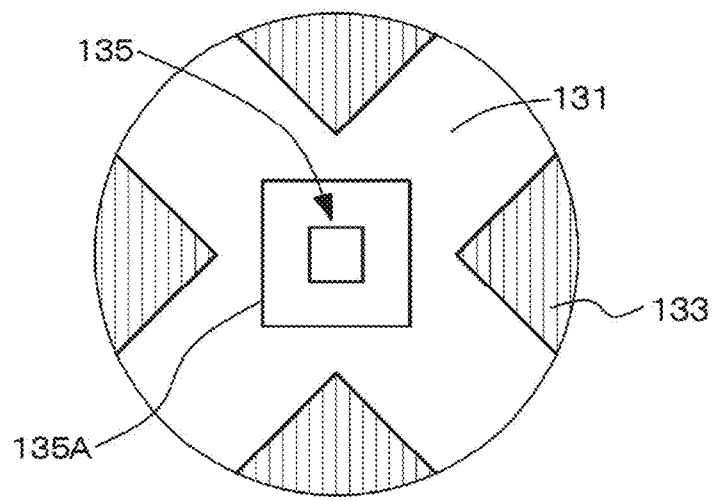
FIGS. 37A and 37B are schematic plan views each showing a portion of the first electrode in the central region of the one pixel that constitutes the liquid-crystal display apparatus of Example 11.
Figure 37B:
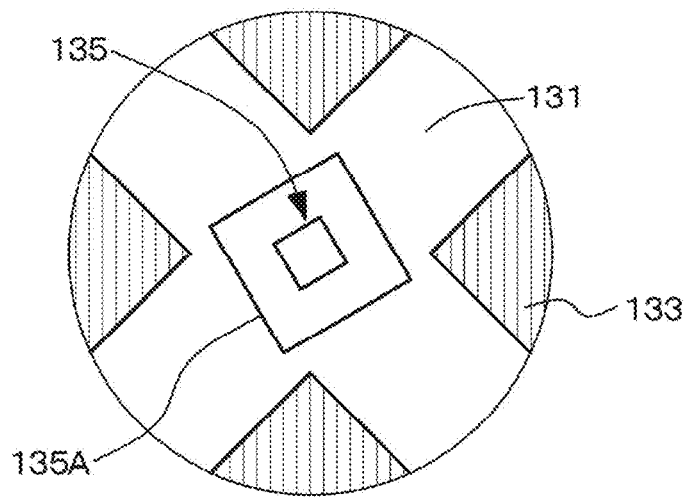

Here, as shown in FIG. 36B, the depression 135 decreases in size toward the first substrate. That is, the depression 135 has a so-called forward taper slope. It is desirable that an angle of inclination of the depression 135 be 5 degrees to 60 degrees, favorably, 20 degrees to 30 degrees. Such an angle of inclination can be obtained by etching the base layer 150 using, for example, etch-back method such that the base layer 150 is inclined. A shape of an outer edge 135A of the depression 135 can be circular (having diameter of, for example, 15 μm or 7 μm) as shown in FIG. 36A or can be rectangular (e.g., square with sides each having a length of 12 μm) as shown in FIGS. 37A and 37B. An angle formed by the outer edge 135A of the rectangular depression 135 and an extending direction of the stem convex portion 131 (angle formed by the outer edge 135A of the rectangular depression 135 and the extending direction of the stem convex portion 131 in which this outer edge 135A and an extension of the stem convex portion 131 intersect each other) may be 90 degrees (see FIG. 37A) or may be an acute angle, for example, 60 degrees (see FIG. 37B).

As described above, in the liquid-crystal display apparatus of Example 11, the depression 135 is provided in the first electrode 22 in the central region of the pixel. Therefore, the liquid-crystal molecules positioned in the vicinity of the depression 135 fall down toward the center of the pixel. Therefore, during manufacture of the liquid-crystal display apparatus, in order to give a pretilt to the liquid-crystal molecules, the liquid-crystal layer is exposed to a desired electric field for a predetermined time. However, it is possible to achieve a reduction in a time necessary until the alignment of the liquid-crystal molecules exposed to the desired electric field is stabilized. That is, it becomes possible to give a pretilt to the liquid-crystal molecules in short time, and it becomes possible to achieve a reduction in the manufacturing time of the liquid-crystal display apparatus.

Figure 36C:
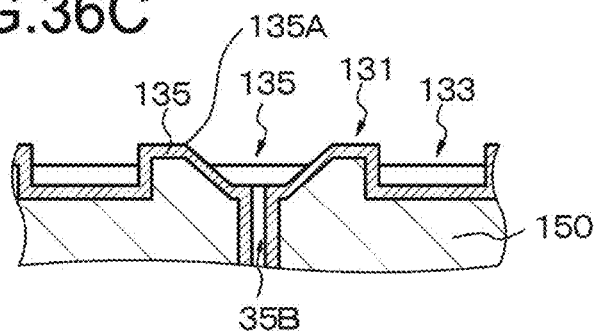

Note that, as shown in FIG. 36C, it is also possible to employ a configuration in which the central portion of the depression 135 forms a part of the contact hole (connection hole 35).

Example 12

Figure 38:
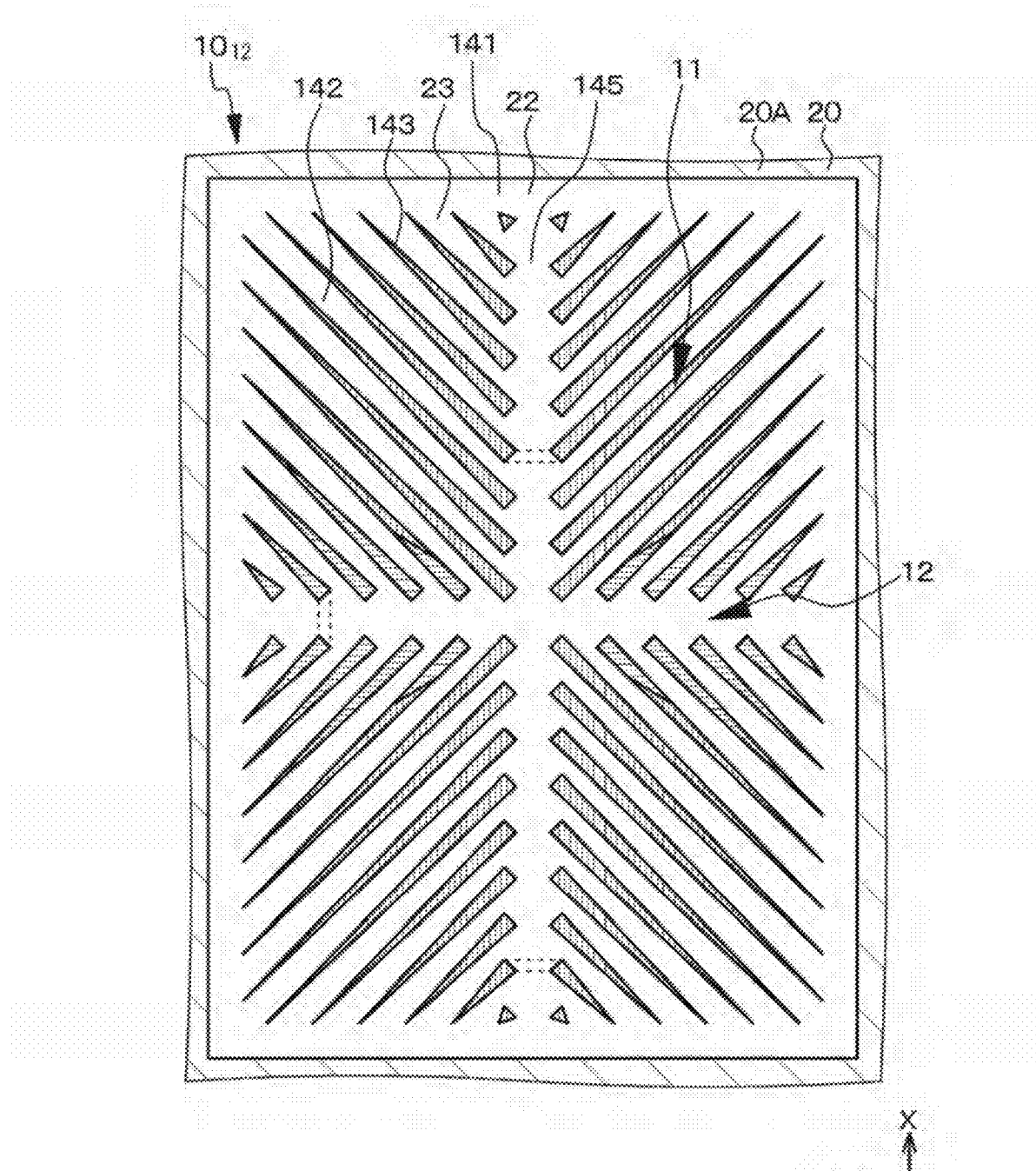
FIG. 38 is a schematic view as one pixel in a first substrate is viewed from above in a liquid-crystal display apparatus of Example 12.

Example 12 relates to a variant of Examples 1 to 11. FIG. 38 shows a schematic view of one pixel $10_{12}$ in the first substrate in a liquid-crystal display apparatus of Example 12 as viewed from above. A schematic plan view of a portion of the first electrode surrounded by the circular region in the schematic plan view of the first electrode of FIG. 38 in an enlarged state is shown in each of FIGS. 39A, 39B, and 40.

In each pixel $10_{12}$ of the liquid-crystal display apparatus of Example 12, an extending direction of the lateral-side portion 145b of the second stem convex portion 145 that is not joined to the branch convex portions 142 is not parallel to the X-axis and is not parallel to the Y-axis. That is, the extending direction of the lateral-side portion 145b of the second stem convex portion 145 that is not joined to the branch convex portions 142 is a direction different from that of the X-axis and is a direction different from that of the X-axis. Note that the second stem convex portions 145 are line-symmetrical with respect to the X-axis and also line-symmetrical with respect to the Y-axis. Further, the second stem convex portions 145 are rotationally symmetrical (point-symmetrical) with respect to the center of the pixel by 180 degrees. Alternatively, in the liquid-crystal display apparatus of Example 1 or the like, it is possible to employ a configuration in which an extending direction of the lateral-side portion of the stem convex portion 131 or 141 that is not joined to the branch convex portion 132 or 142 is not parallel to the X-axis and is not parallel to the Y-axis. That is, the extending direction of the lateral-side portion of the stem convex portion or the second stem convex portion that is not joined to the branch convex portion is a direction different from those of the X-axis and the Y-axis. With such a configuration, generation of dark lines in a region corresponding to the X-axis and the Y-axis can be suppressed. As a result, it is possible to provide a liquid-crystal display apparatus capable of providing a more uniform and higher light transmittance. Further, it is possible to provide a liquid-crystal display apparatus having a configuration and a structure by which a pretilt can be given to the liquid-crystal molecules 61 in short time.

Figure 39A:
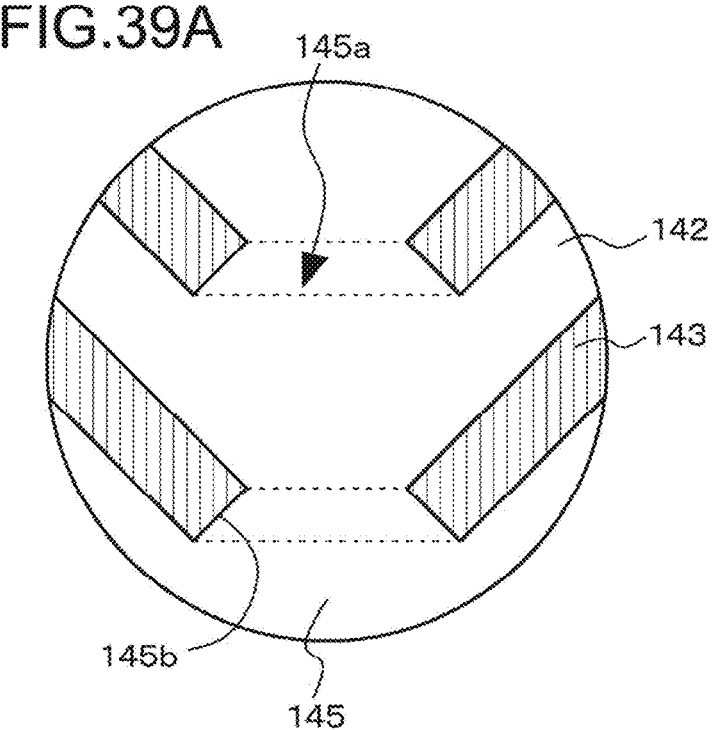
FIGS. 39A and 39B are schematic plan views each showing a portion of the first electrode that is surrounded by the circular region in the schematic plan view of the first electrode shown in FIG. 38, in an enlarged state.
Figure 39B:
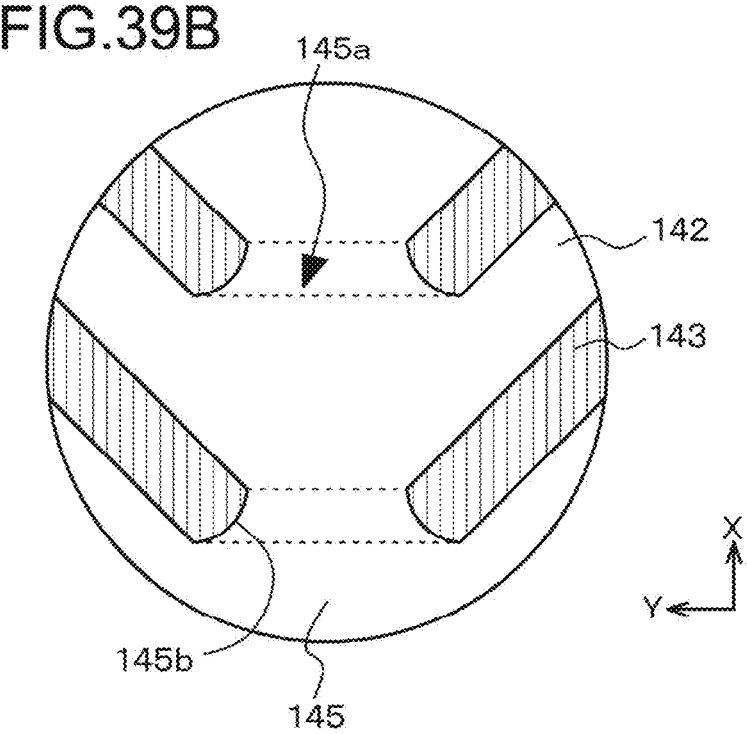
Figure 40:
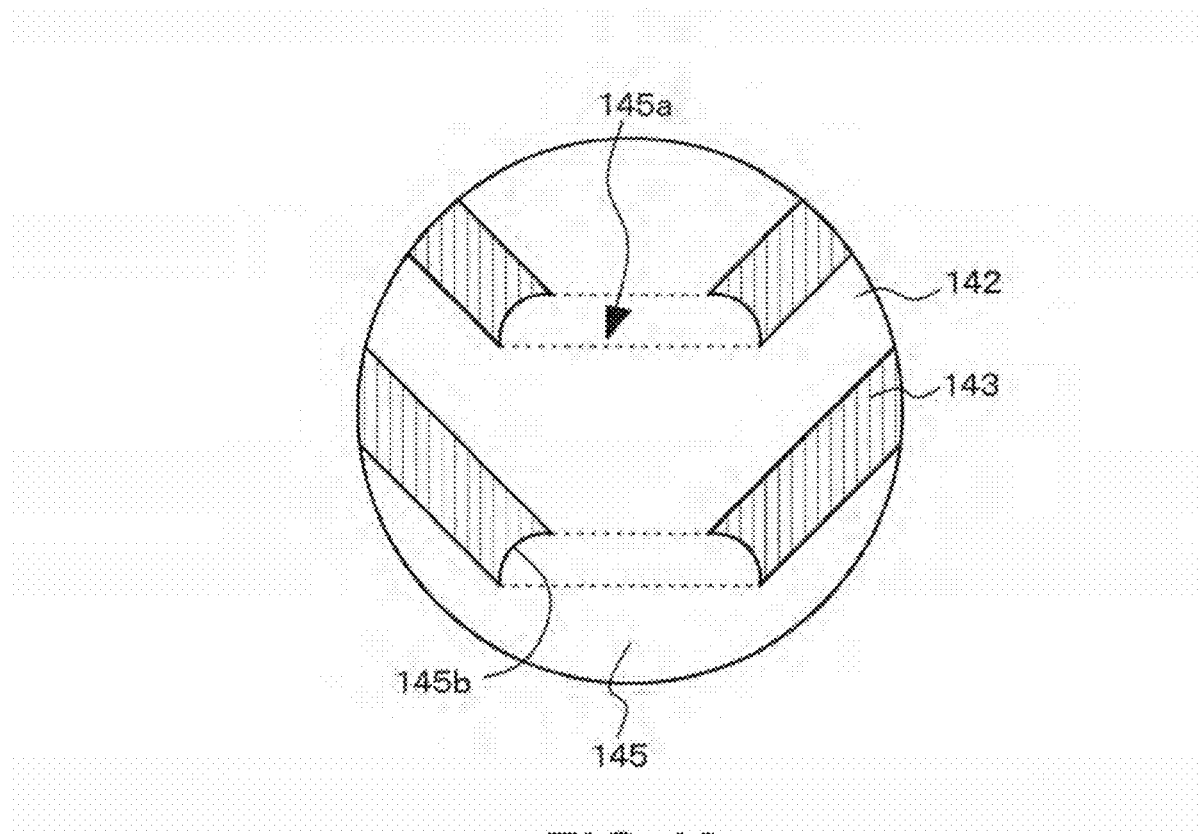
FIG. 40 is a schematic plan view of a portion of the first electrode that is surrounded by the circular region in the schematic plan view of the first electrode of FIG. 38, in an enlarged state.

Specifically, the lateral-side portion 145b of the second stem convex portion 145 that is not joined to the branch convex portions 142 has a linear shape as shown in FIGS. 38 and 39A or a curved shape as shown in FIGS. 39B and 40. As shown in FIGS. 38, 39A, 39B, and 40, a width of a part 145a of the second stem convex portion 145 that is not joined to the branch convex portions 142 decreases toward the tip end portion of the second stem convex portion 145.

As described above, in the liquid-crystal display apparatus of Example 12, a portion of the stem convex portion that extends parallel to the X-axis or a portion of the stem convex portion that extends parallel to the Y-axis is not present. Thus, it is possible to provide a liquid-crystal display apparatus capable of providing a more uniform and higher light transmittance. Further, it is possible to provide a liquid-crystal display apparatus having a configuration and a structure by which a pretilt can be given to the liquid-crystal molecules in short time.

Example 13

Figure 41:
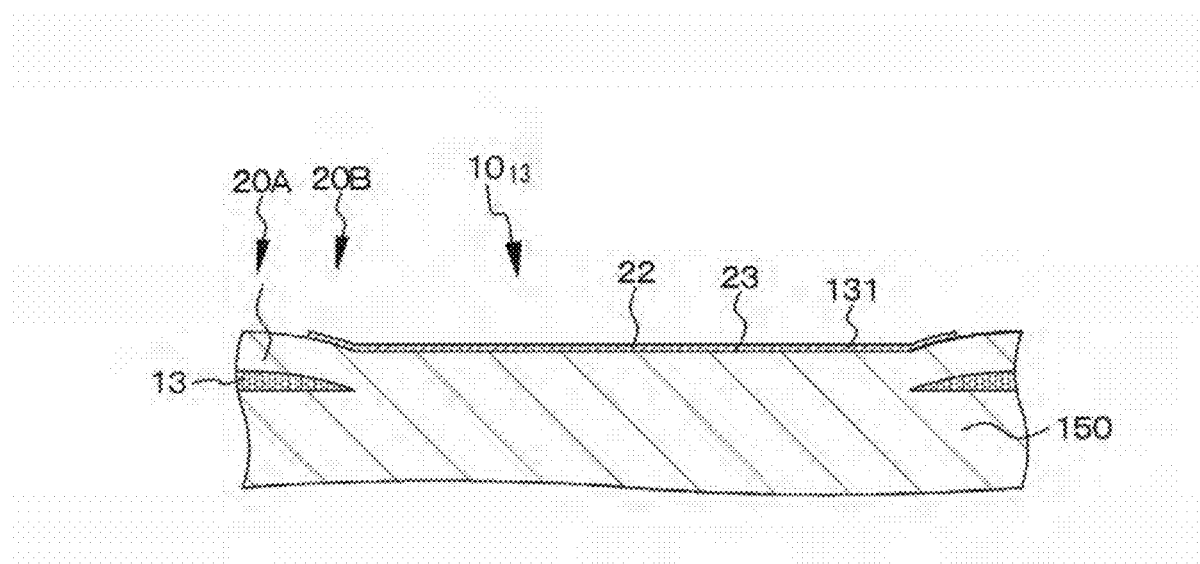
FIG. 41 is a schematic partial sectional view of a first electrode and the like in a liquid-crystal display apparatus of Example 13, which corresponds to a schematic partial sectional view of the first electrode and the like that is taken along the arrow A-A of FIG. 5.

Example 13 is a variant of the liquid-crystal display apparatuses described in Examples 1 to 12. A schematic partial sectional view of the first electrode and the like in a liquid-crystal display apparatus of Example 13 is shown in FIG. 41. The example shown in FIG. 41 is the variant of Example 1 and corresponds to a schematic partial sectional view of the first electrode and the like that is taken along the arrow A-A of FIG. 5.

In the liquid-crystal display apparatus of Example 13, a convex structure 13 is formed from a portion 20A of the first substrate that is positioned between pixels $10_{13}$ to a portion 20B of the first substrate 20 that corresponds to the pixel peripheral portion, and a peripheral portion of the concave and convex portion 11 is formed on the convex structure 13. Here, specifically, the convex structure 13 is formed on the basis of a black matrix. The black matrix is made of a photocurable resin to which carbon is added. In the liquid-crystal display apparatus of Example 13, the peripheral portion of the concave and convex portion 11 is formed on the convex structure 13. Therefore, a much more intense electric field is generated in the peripheral portion of the concave and convex portion in comparison with the case where the peripheral portion of the concave and convex portion 11 is flat. As a result, it is possible to increase the alignment regulation force for the liquid-crystal molecules in the peripheral portion of the concave and convex portion 11 and it is possible to accurately define the tilt state of the liquid-crystal molecules in the peripheral portion of the concave and convex portion 11. Therefore, it is possible to retain a favorable voltage response characteristic.

Note that the convex structure is not limited to an embodiment in which it is formed on the basis of the black matrix and may be constituted of liquid-crystal display apparatus components formed on or above the first substrate 20, for example, various signal lines, auxiliary capacitance electrodes, gate electrodes, source/drain electrodes, and various wires. In this case, by achieving an optimization of the thickness of the base layer 150, the convex structure can be formed in the base layer 150 due to an influence of the thickness of the liquid-crystal display apparatus components.

The present disclosure has been described on the basis of the favorable examples hereinabove. The present disclosure is not limited to those examples and various variants can be made. The planar shape of each of the convex portion, the stem convex portion, the branch convex portion, the concave portion, and the stem concave portion is not limited to the shape described in the examples, for example, the V-shape. Various patterns in which the convex portion and the branch convex portion extend in a plurality of directions, for example, a stripe-shape or a ladder-shape can be employed therefor. When the convex portion and the branch convex portion are viewed as a whole, the planar shape of the end portion of the convex portion or the branch convex portion may be a linear shape or may be a ladder-shape. In addition, the planar shape of the end portion of each convex portion or branch convex portion may be a linear shape or may be constituted of a combination of line segments. Alternatively, a curve such as a circular arc may be drawn therefor.

In each of the examples, the liquid-crystal display apparatus (liquid-crystal display device) on the VA mode has been described. However, the present disclosure is not necessarily limited thereto and is also applicable to other display modes such as an ECB mode (mode of positive liquid-crystal in horizontal alignment; without twist), an IPS (In Plane Switching) mode, an FFS (Fringe Field Switching) mode, and an OCB (Optically Compensated Bend) mode. Also in these cases, similar effects can be obtained. It should be noted that, in the present disclosure, in comparison with one not subjected to pretilt treatment, an especially higher response characteristic improvement effect can be exerted on the VA mode than on the IPS mode or the FFS mode. Further, in each of the examples, the transmissive-type liquid-crystal display apparatus (liquid-crystal display device) has been exclusively described. However, it is not necessarily limited to the transmissive type and may be a reflective type, for example. In the case of the reflective type, the pixel electrode is formed of a light-reflective electrode material such as aluminum.

Variant examples of the slit region 12 in the liquid-crystal display apparatus of Example 2 are shown in FIGS. 42A, 42B, 42C, 42D, and 43. Note that, in those figures, the slit regions 12 are hatched with oblique lines.

Figure 42A:
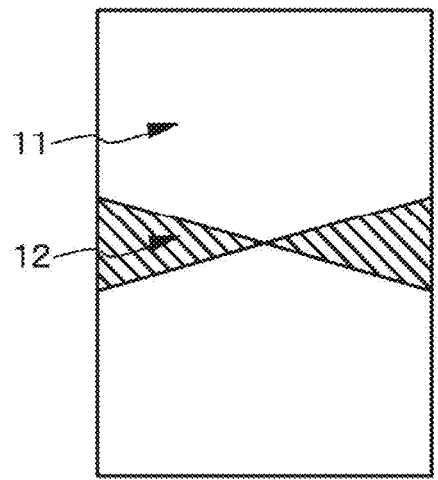
FIGS. 42A, 42B, 42C, and 42D are diagrams schematically showing variant examples of the slit region in the liquid-crystal display apparatus of Example 2.
Figure 42B:
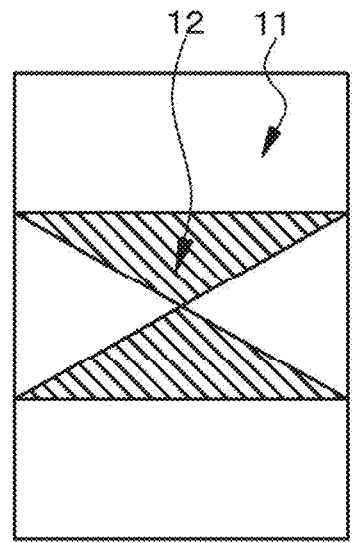
Figure 42C:
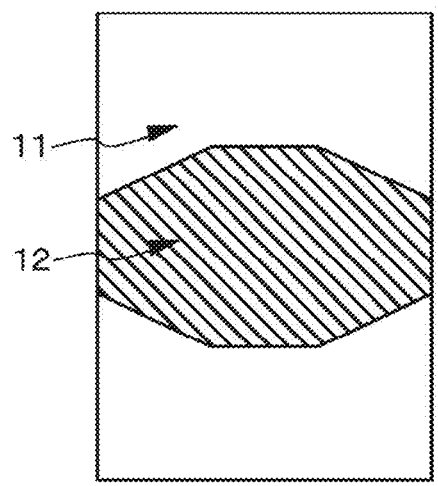
Figure 42D:
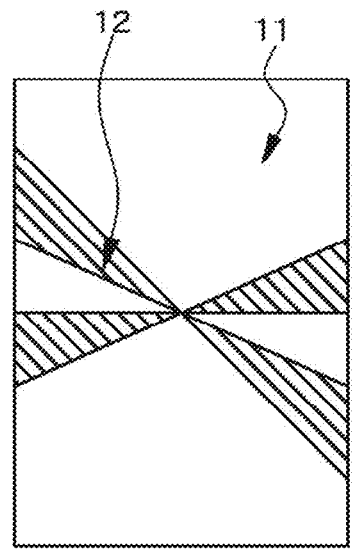
Figure 43:
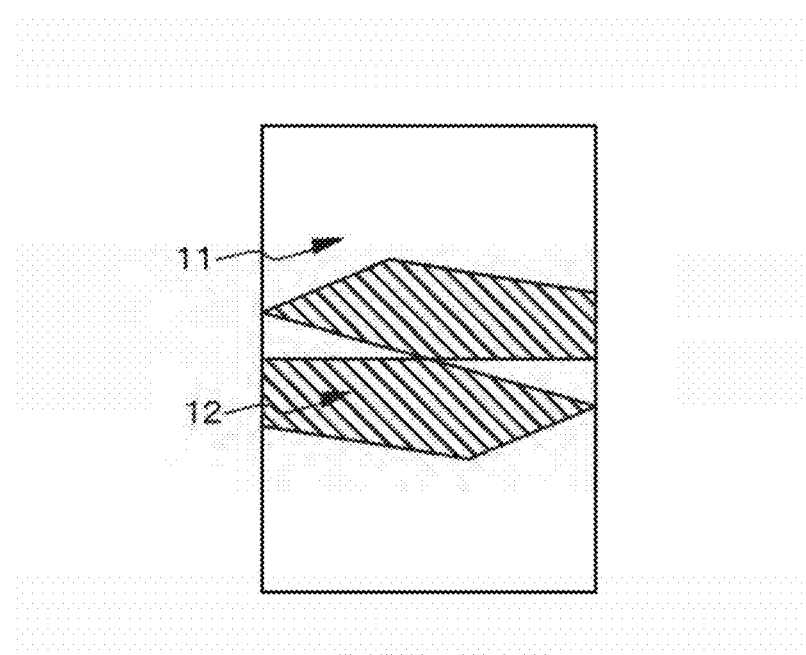
FIG. 43 is a diagram schematically showing a variant example of the slit region in the liquid-crystal display apparatus of Example 2.

A planar shape of the slit region 12 shown in FIG. 42A is a shape in which two approximately isosceles triangles are arranged in parallel. That is, it is a shape in which vertices of the two isosceles triangles occupy approximately the pixel center, bottom sides of the two isosceles triangles overlap the first side and the third side, respectively, and a vertex has an angle smaller than 45 degrees. A planar shape of the slit region 12 shown in FIG. 42B is a shape in which two approximately isosceles triangles are arranged in parallel. That is, vertices of the two isosceles triangles occupy approximately the pixel center and bottom sides of the two isosceles triangles are parallel to the second side and the fourth side, respectively. A planar shape of the slit region 12 shown in FIG. 42C is a hexagon. The planar shape of the slit region 12 shown in FIG. 42C is a shape in which two sides of the six sides, which are opposed to each other, overlap the first side and the third side, respectively. A planar shape of the slit region 12 shown in FIG. 42D is a shape in which N- (four in example shown in figure) polygons (triangles in example shown in figure) are arrayed, and vertices of the N-polygons occupy approximately the pixel center. (N/2)-polygons are rotationally symmetrical (point-symmetrical) to the other polygons by 180 degrees. A planar shape of the slit region 12 shown in FIG. 43 is a shape in which N- (two in example shown in figure) polygons (pentagon in example shown in figure) are arrayed and vertices of the N-polygons occupy approximately the pixel center. The (N/2)-polygons is rotationally symmetrical (point-symmetrical) to the other polygon by 180 degrees.

Figure 44A:
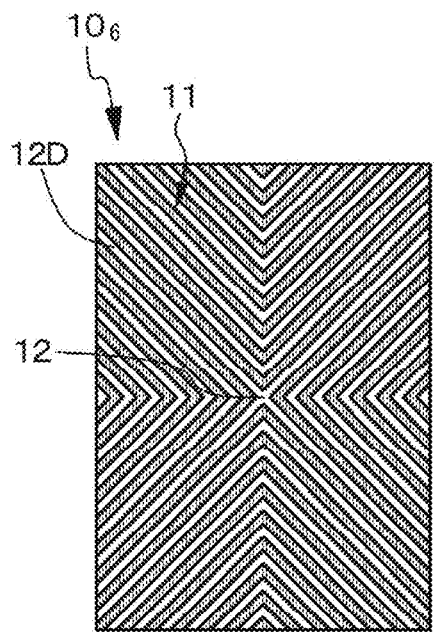
FIGS. 44A, 44B, and 44C are diagrams showing variant examples of the slit region in the liquid-crystal display apparatus of Example 5.
Figure 44B:
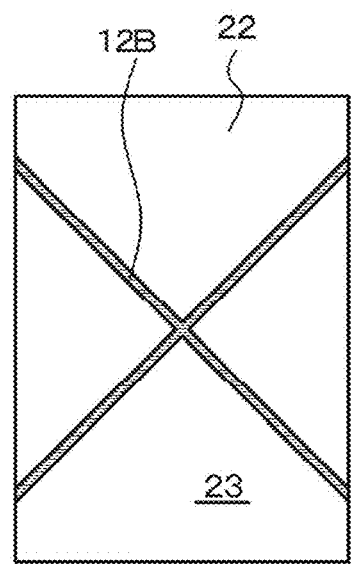
Figure 44C:
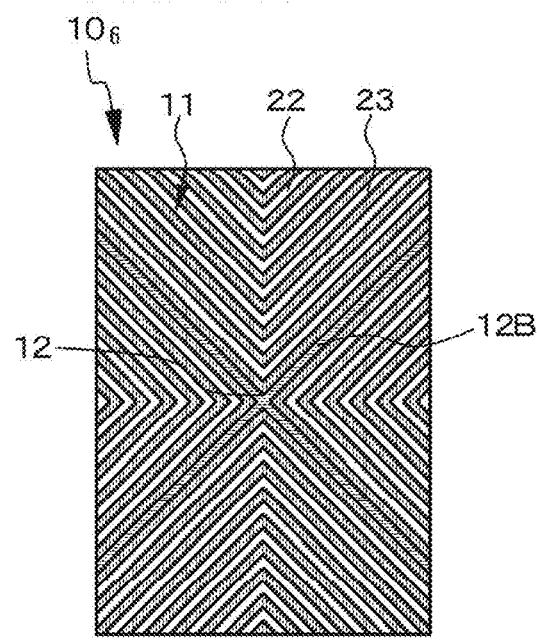
Figure 45A:
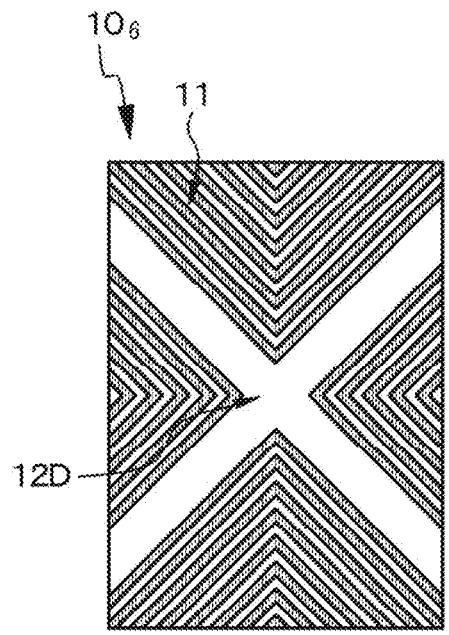
FIGS. 45A, 45B, and 45C are diagrams showing other variant examples of the slit region in the liquid-crystal display apparatus of Example 5.
Figure 45B:
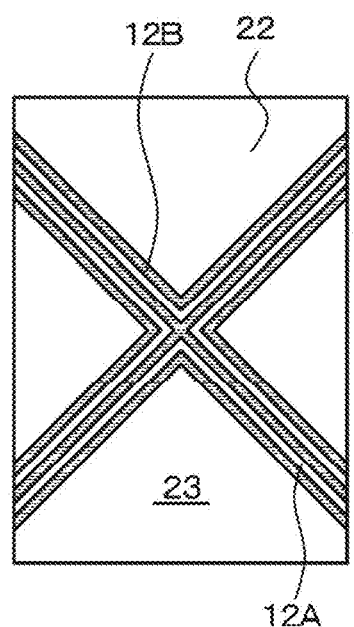
Figure 45C:
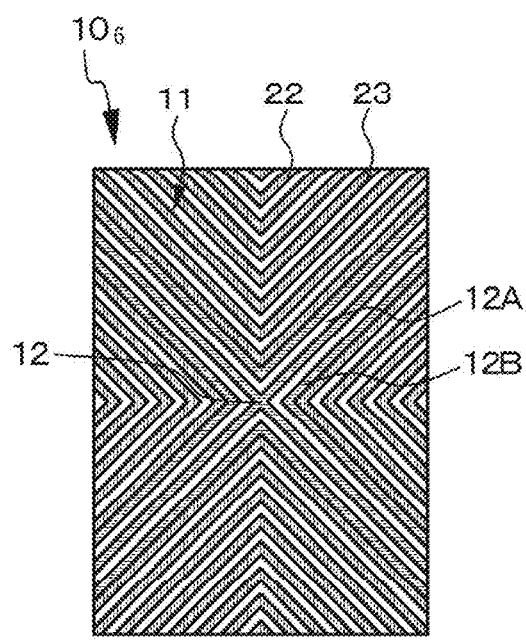

Variant examples of the slit region 12 in the liquid-crystal display apparatus of Example 6 are shown in FIGS. 44A, 44B, 44C, 45A, 45B, and 45C. As shown in FIGS. 44A, 44B, and 44C, the slit region 12 is formed in a single convex portion region 12D (specifically, on single branch convex portion 132) extending toward the central region (central portion) of the pixel, in each quadrant. Note that an arrangement state of the concave and convex portion 11 and the convex portion region 12D is schematically shown in FIG. 44A, an arrangement state of the space portion 12B provided in the first electrode 22 is schematically shown in FIG. 44B, and a diagram in which the concave and convex portion 11 and the slit region 12 overlap each other is shown in FIG. 44C. Alternatively, as shown in FIGS. 45A, 45B, and 45C, the slit region 12 is, in each quadrant, formed in the convex portion region 12D extending toward the central region (central portion) of the pixel. Note that an arrangement state of the convex portion region 12D and the concave and convex portion 11 is schematically shown in FIG. 45A, an arrangement state of the line portion 12A and the space portion 12B that are provided in the first electrode 22 is schematically shown in FIG. 45B, and a diagram in which the concave and convex portion 11 and the slit region 12 are overlap each other is shown in FIG. 45C. Note that those variants are also applicable to the liquid-crystal display apparatuses described in the other examples.

Note that the present disclosure can also take the following configurations.

[A01] <<Liquid-crystal display apparatus: first aspect>>

A liquid-crystal display apparatus, including:

a first substrate; and a second substrate, in which a plurality of pixels are arrayed between the first substrate and the second substrate in a two-dimensional matrix form in a first direction and a second direction extending in a direction orthogonal to the first direction, each pixel has a rectangular shape including a first side extending in the first direction, a third side opposed to the first side, a second side extending in the second direction, and a fourth side opposed to the second side, and includes a first electrode formed on an opposed surface of the first substrate, which is opposed to the second substrate, a first alignment film that covers the first electrode and the opposed surface of the first substrate, a second electrode formed on an opposed surface of the second substrate, which is opposed to the first substrate, a second alignment film that covers the second electrode and the opposed surface of the second substrate, and a liquid-crystal layer that is provided between the first alignment film and the second alignment film and contains liquid-crystal molecules, in each pixel, a pretilt is given to the liquid-crystal molecules, a slit region is formed in the first electrode and a concave and convex portion is formed in a region of the first electrode, in which the slit region is not formed, each pixel further includes, on the first substrate, a control circuit that controls application of a voltage on the first electrode, the plurality of pixels arrayed in the first direction are constituted of a first pixel group constituted of a plurality of odd-numbered pixels and a second pixel group constituted of a plurality of even-numbered pixels, in the vicinity of the first sides of the plurality of pixels arrayed in the first direction, a first data line that extends in the first direction and is for applying a voltage on the first electrode via the control circuit is provided closer to the first substrate than the first electrode, in the vicinity of the third sides of the plurality of pixels arrayed in the first direction, a second data line that extends in the first direction and is for applying a voltage on the first electrode via the control circuit is provided closer to the first substrate than the first electrode, the slit region is disposed above the first data line and the second data line, in each pixel that constitutes the first pixel group, a second data line extension extending from the second data line is provided adjacent to the first data line, and in each pixel that constitutes the second pixel group, a first data line extension extending from the first data line is provided adjacent to the second data line.

[A02] The liquid-crystal display apparatus according to [A01], in which in each pixel, the slit region extends toward the first side from a pixel center, extends toward the third side from the pixel center, extends halfway between the pixel center and the second side toward the second side, and extends halfway between the pixel center and the fourth side toward the fourth side.

[A03] The liquid-crystal display apparatus according to [A01] or [A02], in which assuming that a voltage applied on the first data line is $V_{D-1}$, a voltage applied on the second data line is $V_{D-2}$, and a voltage applied on the second electrode is $V_2$, the respective voltages are set to satisfy $$V_{D-1} - V_2 \geq 0 \text{ (volt)}$$

$$V_{D-2} - V_2 \leq 0 \text{ (volt)}.$$

[A04] The liquid-crystal display apparatus according to any one of [A01] to [A03], in which assuming that an axial line passing through a pixel center of each pixel and extending parallel to the first direction is an X-axis and an axial line passing through a pixel center of each pixel and extending parallel to the second direction is a Y-axis, in each pixel, the concave and convex portion is constituted of the stem convex portion extending on the X-axis and the Y-axis and the plurality of branch convex portions extending toward the peripheral portion of the pixel from lateral sides of the stem convex portion.

[A05] The liquid-crystal display apparatus according to any one of [A01] to [A03], in which assuming that an axial line passing through a pixel center of each pixel and extending parallel to the first direction is an X-axis and an axial line passing through the pixel center of each pixel and extending parallel to the second direction is a Y-axis, a plurality of convex portions occupying a first quadrant extend parallel to a direction in which a value of a Y-coordinate increases when a value of an X-coordinate increases, a plurality of convex portions occupying a second quadrant extend parallel to a direction in which the value of the Y-coordinate increases when the value of the X-coordinate decreases, a plurality of convex portions occupying a third quadrant extend parallel to a direction in which the value of the Y-coordinate decreases when the value of the X-coordinate decreases, and a plurality of convex portions occupying a fourth quadrant extend parallel to a direction in which the value of the Y-coordinate decreases when the value of the X-coordinate increases.

[A06] The liquid-crystal display apparatus according to [A05], in which some of the convex portions occupying the first quadrant and some of the convex portions occupying the fourth quadrant are formed in a connected state, others of the convex portions occupying the first quadrant and some of the convex portions occupying the second quadrant are formed in a connected state, others of the convex portions occupying the second quadrant and some of the convex portions occupying the third quadrant are formed in a connected state, and others of the convex portions occupying the third quadrant and others of the convex portions occupying the fourth quadrant are formed in a connected state.

[A07] The liquid-crystal display apparatus according to [A06], in which some of the convex portions occupying the first quadrant and some of the convex portions occupying the fourth quadrant are formed in a deviated state, others of the convex portions occupying the first quadrant and some of the convex portions occupying the second quadrant are formed in a deviated state, others of the convex portions occupying the second quadrant and some of the convex portions occupying the third quadrant are formed in a deviated state, and others of the convex portions occupying the third quadrant and others of the convex portions occupying the fourth quadrant are formed in a deviated state.

[A08] The liquid-crystal display apparatus according to [A07], in which assuming that a formation pitch of the convex portions along the X-axis is denoted by $P_X$ and a formation pitch of the convex portions along the Y-axis is denoted by $P_Y$, the some of the convex portions occupying the first quadrant and the some of the convex portions occupying the fourth quadrant are formed in a state deviated from each other by $(P_X/2)$, the others of the convex portions occupying the first quadrant and the some of the convex portions occupying the second quadrant are formed in a state deviated from each other by $(P_Y/2)$, the others of the convex portions occupying the second quadrant and the some of the convex portions occupying the third quadrant are formed in a state deviated from each other by $(P_X/2)$, and the others of the convex portions occupying the third quadrant and the others of the convex portions occupying the fourth quadrant are formed in a state deviated from each other by $(P_Y/2)$.

[A09] The liquid-crystal display apparatus according to [A05], in which some of the convex portions occupying the first quadrant and some of the convex portions occupying the fourth quadrant are not joined to each other, others of others of the convex portions occupying the first quadrant and some of the convex portions occupying the second quadrant are not joined to each other, others of the convex portions occupying the second quadrant and some of the convex portions occupying the third quadrant are not joined to each other, and others of the convex portions occupying the third quadrant and others of the convex portions occupying the fourth quadrant are not joined to each other.

[A10] The liquid-crystal display apparatus according to [A09], in which the some of the convex portions occupying the first quadrant and the some of the convex portions occupying the fourth quadrant are formed in a deviated state, the others of the convex portions occupying the first quadrant and the some of the convex portions occupying the second quadrant are formed in a deviated state, the others of the convex portions occupying the second quadrant and the some of the convex portions occupying the third quadrant are formed in a deviated state, and the others of the convex portions occupying the third quadrant and the others of the convex portions occupying the fourth quadrant are formed in a deviated state. [A11] The liquid-crystal display apparatus according to [A10], in which assuming that a formation pitch of the convex portions along the X-axis is denoted by $P_X$ and a formation pitch of the convex portions along the Y-axis is denoted by $P_Y$, the some of the convex portions occupying the first quadrant and the some of the convex portions occupying the fourth quadrant are formed in a state deviated from each other by $(P_X/2)$, the others of the convex portions occupying the first quadrant and the some of the convex portions occupying the second quadrant are formed in a state deviated from each other by $(P_Y/2)$, the others of the convex portions occupying the second quadrant and the some of the convex portions occupying the third quadrant are formed in a state deviated from each other by $(P_X/2)$, and the others of the convex portions occupying the third quadrant and the others of the convex portions occupying the fourth quadrant are formed in a state deviated from each other by $(P_Y/2)$.

[A12] The liquid-crystal display apparatus according to any one of [A01] to [A03], in which the concave and convex portion is constituted of a stem convex portion formed in a pixel peripheral portion in a frame-like shape and a plurality of branch convex portions extending toward a pixel inside from the stem convex portion.

[A13] The liquid-crystal display apparatus according to any one of [A01] to [A12], in which the concave and convex portion has a difference in level of $5 \times 10^{-8}$ m to $3 \times 10^{-7}$ m.

[A14] The liquid-crystal display apparatus according to any one of [A01] to [A13], in which the slit region includes a line-and-space structure constituted of a line portion in which a transparent conductive material layer that constitutes the first electrode is formed and a space portion in which the transparent conductive material layer is not formed.

[B01] <<Liquid-crystal display apparatus: second aspect>>

A liquid-crystal display apparatus, including:

a first substrate; and a second substrate, in which a plurality of pixels are arrayed between the first substrate and the second substrate in a two-dimensional matrix form in a first direction and a second direction extending in a direction orthogonal to the first direction, each pixel has a rectangular shape including a first side extending in the first direction, a third side opposed to the first side, a second side extending in the second direction, and a fourth side opposed to the second side, and includes a first electrode formed on an opposed surface of the first substrate, which is opposed to the second substrate, a first alignment film that covers the first electrode and the opposed surface of the first substrate, a second electrode formed on an opposed surface of the second substrate, which is opposed to the first substrate, a second alignment film that covers the second electrode and the opposed surface of the second substrate, and a liquid-crystal layer that is provided between the first alignment film and the second alignment film and contains liquid-crystal molecules, in each pixel, a pretilt is given to the liquid-crystal molecules, and a slit region is formed in the first electrode and a concave and convex portion is formed in a region of the first electrode, in which the slit region is not formed, each pixel further includes, on the first substrate, a control circuit that controls application of a voltage on the first electrode, in the vicinity of the first sides of the plurality of pixels arrayed in the first direction, a data line that extends in the first direction and is for applying a voltage on the first electrode via the control circuit is provided closer to the first substrate than the first electrode, and assuming that an area of the entire slit region is denoted by $S_1$ and an area of a portion of the slit region, which is provided in a portion of the first electrode, which is positioned above the data line is denoted by $S_2$, $0 < S_2/S_1 \leq 0.1$ is satisfied.

[B02] <<Liquid-crystal display apparatus: third aspect>>

A liquid-crystal display apparatus, including:

a first substrate; and a second substrate, in which a plurality of pixels are arrayed between the first substrate and the second substrate in a two-dimensional matrix form in a first direction and a second direction extending in a direction orthogonal to the first direction, each pixel has a rectangular shape including a first side extending in the first direction, a third side opposed to the first side, a second side extending in the second direction, and a fourth side opposed to the second side, and includes a first electrode formed on an opposed surface of the first substrate, which is opposed to the second substrate, a first alignment film that covers the first electrode and the opposed surface of the first substrate, a second electrode formed on an opposed surface of the second substrate, which is opposed to the first substrate, a second alignment film that covers the second electrode and the opposed surface of the second substrate, and a liquid-crystal layer that is provided between the first alignment film and the second alignment film and contains liquid-crystal molecules, in each pixel, a pretilt is given to the liquid-crystal molecules, and a slit region is formed in the first electrode and a concave and convex portion is formed in a region of the first electrode, in which the slit region is not formed, each pixel further includes, on the first substrate, a control circuit that controls application of a voltage on the first electrode, in the vicinity of the first sides of the plurality of pixels arrayed in the first direction, a data line that extends in the first direction and is for applying a voltage on the first electrode via the control circuit is provided closer to the first substrate than the first electrode, and the slit region is not formed in a portion of the first electrode, which is positioned above the data line.

[B03] The liquid-crystal display apparatus according to [B01] or [B02], in which in each pixel, the slit region extends toward the first side from a pixel center, extends toward the third side from the pixel center, extends halfway between the pixel center and the second side toward the second side, and extends halfway between the pixel center and the fourth side toward the fourth side.

[B04] The liquid-crystal display apparatus according to any one of [B01] to [B03], in which assuming that an axial line passing through a pixel center of each pixel and extending parallel to the first direction is an X-axis and an axial line passing through the pixel center of each pixel and extending parallel to the second direction is a Y-axis, in each pixel, the concave and convex portion is constituted of a stem convex portion extending on the X-axis and the Y-axis and a plurality of branch convex portions extending toward a peripheral portion of the pixel from lateral sides of the stem convex portion.

[B05] The liquid-crystal display apparatus according to any one of [B01] to [B03], in which assuming that an axial line passing through a pixel center of each pixel and extending parallel to the first direction is an X-axis and an axial line passing through the pixel center of each pixel and extending parallel to the second direction is a Y-axis, a plurality of convex portions occupying a first quadrant extend parallel to a direction in which a value of a Y-coordinate increases when a value of an X-coordinate increases, a plurality of convex portions occupying a second quadrant extend parallel to a direction in which the value of the Y-coordinate increases when the value of the X-coordinate decreases, a plurality of convex portions occupying a third quadrant extend parallel to a direction in which the value of the Y-coordinate decreases when the value of the X-coordinate decreases, and a plurality of convex portions occupying a fourth quadrant extend parallel to a direction in which the value of the Y-coordinate decreases when the value of the X-coordinate increases.

[B06] The liquid-crystal display apparatus according to [B05], in which some of the convex portions occupying the first quadrant and some of the convex portions occupying the fourth quadrant are formed in a connected state, others of the convex portions occupying the first quadrant and some of the convex portions occupying the second quadrant are formed in a connected state, others of the convex portions occupying the second quadrant and some of the convex portions occupying the third quadrant are formed in a connected state, and others of the convex portions occupying the third quadrant and others of the convex portions occupying the fourth quadrant are formed in a connected state.

[B07] The liquid-crystal display apparatus according to [B06], in which some of the convex portions occupying the first quadrant and some of the convex portions occupying the fourth quadrant are formed in a deviated state, others of the convex portions occupying the first quadrant and some of the convex portions occupying the second quadrant are formed in a deviated state, others of the convex portions occupying the second quadrant and some of the convex portions occupying the third quadrant are formed in a deviated state, and others of the convex portions occupying the third quadrant and others of the convex portions occupying the fourth quadrant are formed in a deviated state.

[B08] The liquid-crystal display apparatus according to [B07], in which assuming that a formation pitch of the convex portions along the X-axis is denoted by $P_X$ and a formation pitch of the convex portions along the Y-axis is denoted by $P_Y$, the some of the convex portions occupying the first quadrant and the some of the convex portions occupying the fourth quadrant are formed in a state deviated from each other by $(P_X/2)$, the others of the convex portions occupying the first quadrant and the some of the convex portions occupying the second quadrant are formed in a state deviated from each other by $(P_Y/2)$, the others of the convex portions occupying the second quadrant and the some of the convex portions occupying the third quadrant are formed in a state deviated from each other by $(P_X/2)$, and the others of the convex portions occupying the third quadrant and the others of the convex portions occupying the fourth quadrant are formed in a state deviated from each other by $(P_Y/2)$.

[B09] The liquid-crystal display apparatus according to [B05], in which some of the convex portions occupying the first quadrant and some of the convex portions occupying the fourth quadrant are not joined to each other, others of others of the convex portions occupying the first quadrant and some of the convex portions occupying the second quadrant are not joined to each other, others of the convex portions occupying the second quadrant and some of the convex portions occupying the third quadrant are not joined to each other, and others of the convex portions occupying the third quadrant and others of the convex portions occupying the fourth quadrant are not joined to each other.

[B10] The liquid-crystal display apparatus according to [B09], in which the some of the convex portions occupying the first quadrant and the some of the convex portions occupying the fourth quadrant are formed in a deviated state, the others of the convex portions occupying the first quadrant and the some of the convex portions occupying the second quadrant are formed in a deviated state, the others of the convex portions occupying the second quadrant and the some of the convex portions occupying the third quadrant are formed in a deviated state, and the others of the convex portions occupying the third quadrant and the others of the convex portions occupying the fourth quadrant are formed in a deviated state.

[B11] The liquid-crystal display apparatus according to [B10], in which assuming that a formation pitch of the convex portions along the X-axis is denoted by $P_X$ and a formation pitch of the convex portions along the Y-axis is denoted by $P_Y$, the some of the convex portions occupying the first quadrant and the some of the convex portions occupying the fourth quadrant are formed in a state deviated from each other by $(P_X/2)$, the others of the convex portions occupying the first quadrant and the some of the convex portions occupying the second quadrant are formed in a state deviated from each other by $(P_Y/2)$, the others of the convex portions occupying the second quadrant and the some of the convex portions occupying the third quadrant are formed in a state deviated from each other by $(P_X/2)$, and the others of the convex portions occupying the third quadrant and the others of the convex portions occupying the fourth quadrant are formed in a state deviated from each other by $(P_Y/2)$.

[B12] The liquid-crystal display apparatus according to any one of [B01] to [B03], in which the concave and convex portion is constituted of a stem convex portion formed in a pixel peripheral portion in a frame-like shape and a plurality of branch convex portions extending toward a pixel inside from the stem convex portion.

[B13] The liquid-crystal display apparatus according to any one of [B01] to [B12], in which
the concave and convex portion has a difference in level of $5 \times 10^{-8}$ m to $3 \times 10^{-7}$ m.

[B14] The liquid-crystal display apparatus according to any one of [B01] to [B13], in which
the slit region includes a line-and-space structure constituted of a line portion in which the transparent conductive material layer that constitutes the first electrode is formed and a space portion in which the transparent conductive material layer is not formed.

[C01] <<Method of giving a pretilt to liquid-crystal molecules>>

A method of giving a pretilt to liquid-crystal molecules in the liquid-crystal display apparatus according to any one of [A01] to [B14], including:
provisionally giving the pretilt to the liquid-crystal molecules by applying a first predetermined voltage on a first electrode from a data line via a control circuit and applying a second predetermined voltage on a second electrode; and then fixing a pretilt state of the liquid-crystal molecules in a state in which the application of the first predetermined voltage on the first electrode from the data line via the control circuit is suspended and a potential of the first electrode is retained at the first predetermined voltage.

REFERENCE SIGNS LIST 10, 10A, 10B, 10C, $10_R$, $10_G$, $10_B$, $10_R{}'$, $10_G{}'$, $10_B{}'$, $10_1$, $10_5$, $10_6$, $10_7$, $10_8$, $10_{12}$, $10_{13}$ pixel
11 concave and convex portion
12 slit region
12A line portion
12B space portion
12C portion of first electrode in which slit region is not formed
12D convex portion region
13 convex structure
20 first substrate
20A portion of first substrate that is positioned between pixels
20B portion of first substrate that corresponds to pixel peripheral portion
21 first alignment film
22 first electrode (pixel electrode)
23 transparent conductive material layer
24 color filter layer
30 TFT
30' TFT layer
30" interlayer insulating layer
31 gate electrode
32 gate insulating layer
33 semiconductor layer (channel formation region)
34A, 34B source/drain electrode
35 connection hole (contact hole)
41 first data line
41A first data line extension
42 second data line
42A second data line extension
43 data line
44 cutout
50 second substrate
51 second alignment film
52 second electrode (opposed electrode)
60 liquid-crystal layer
61, 61A, 61B, 61C liquid-crystal molecule
80 display region
81 source driver
82 gate driver
83 timing controller
84 power supply circuit
91 source line
92 gate line
93 capacitor
131 stem convex portion
132 branch convex portion
132a part of branch convex portion that is joined to stem convex portion
132b tip end portion of branch convex portion
133, 143 concave portion
134 convex portion
134a joined part of convex portion
134b projection
135 depression
135A outer edge of depression
141 stem convex portion
142 convex portion (branch convex portion)
144 stem concave portion
145 second stem convex portion
145a part of second stem convex portion that is not joined to convex portion
145b lateral-side portion of second stem convex portion
150 base layer
151 convex-portion top surface of base layer
152 concave-portion bottom surface of base layer
$PG_1$ first pixel group
$PG_2$ second pixel group

The invention claimed is:
1. A liquid-crystal display apparatus, comprising:
a first substrate; and
a second substrate,
wherein a plurality of pixels are between the first substrate and the second substrate in a two-dimensional matrix in a first direction and a second direction, wherein the second direction extends in a direction orthogonal to the first direction,
wherein each pixel of the plurality of pixels has a rectangular shape, wherein the rectangular shape includes a first side that extends in the first direction, a third side opposed to the first side, a second side that extends in the second direction, and a fourth side opposed to the second side, and
wherein each pixel of the plurality of pixels includes a first electrode on an opposed surface of the first substrate, wherein the first substrate is opposed to the second substrate,
a first alignment film that covers the first electrode and the opposed surface of the first substrate,
a second electrode on an opposed surface of the second substrate,
a second alignment film that covers the second electrode and the opposed surface of the second substrate, and
a liquid-crystal layer between the first alignment film and the second alignment film, wherein the liquid-crystal layer contains tilted liquid-crystal molecules,
wherein each pixel of the plurality of pixels further includes:
a slit region in the first electrode,
a concave and convex portion in a first region of the first electrode, wherein the first region excludes the slit region of the first electrode, and a control circuit configured to control application of a voltage on the first electrode, wherein the plurality of pixels in the first direction comprises a first pixel group and a second pixel group, wherein the first pixel group includes a plurality of odd-numbered pixels and the second pixel group includes a plurality of even-numbered pixels, wherein a vicinity of the first side of each pixel of the plurality of pixels in the first direction includes a first data line closer to the first substrate than the first electrode, wherein the first data line extends in the first direction for the application of a first voltage on the first electrode via the control circuit, wherein a vicinity of the third side of each pixel of the plurality of pixels in the first direction includes a second data line closer to the first substrate than the first electrode, wherein the second data line extends in the first direction for application of a second voltage on the first electrode via the control circuit, wherein the slit region is above the first data line and the second data line, wherein each pixel of the plurality of pixels that includes the first pixel group includes a second data line extension, wherein the second data line extension extends from the second data line that is provided adjacent to the first data line, and wherein each pixel of the plurality of pixels that includes the second pixel group includes a first data line extension, wherein the first data line extension extends from the first data line.

2. The liquid-crystal display apparatus according to claim 1, wherein in each pixel of the plurality of pixels, the slit region extends toward the first side from a pixel center, extends toward the third side from the pixel center, extends halfway between the pixel center and the second side toward the second side, and extends halfway between the pixel center and the fourth side toward the fourth side.

3. The liquid-crystal display apparatus according to claim 1, wherein an axial line that passes through a pixel center of each pixel of the plurality of pixels and extends parallel to the first direction is an X-axis, and an axial line that passes through the pixel center of each pixel of the plurality of pixels and extends parallel to the second direction is a Y-axis, the concave and convex portion of each pixel of the plurality of pixels includes a stem convex portion that extends on the X-axis and the Y-axis, and a plurality of branch convex portions that extends toward a peripheral portion of each pixel of the plurality of pixels from lateral sides of the stem convex portion.

4. The liquid-crystal display apparatus according to claim 1, wherein an axial line that passes through a pixel center of each pixel and extends parallel to the first direction is an X-axis, and an axial line that passes through the pixel center of each pixel and extends parallel to the second direction is a Y-axis, a plurality of convex portions that occupy a first quadrant extend parallel to a direction in which a value of a Y-coordinate increases based on increase in a value of an X-coordinate, a plurality of convex portions that occupy a second quadrant extend parallel to a direction in which the value of the Y-coordinate increases based on decrease in the value of the X-coordinate, a plurality of convex portions that occupy a third quadrant extend parallel to a direction in which the value of the Y-coordinate decreases based on decrease in the value of the X-coordinate, and a plurality of convex portions that occupy a fourth quadrant extend parallel to a direction in which the value of the Y-coordinate decreases based on increase in the value of the X-coordinate.

5. The liquid-crystal display apparatus according to claim 1, wherein the concave and convex portion includes:

a stem convex portion in a pixel peripheral portion in a frame-like shape; and a plurality of branch convex portions that extend toward a pixel inside from the stem convex portion.

6. A method, comprising:

in a liquid crystal display, comprising:

a first substrate; and a second substrate, wherein a plurality of pixels are between the first substrate and the second substrate in a two-dimensional matrix in a first direction and a second direction, wherein the second direction extends in a direction orthogonal to the first direction, wherein each pixel of the plurality of pixels has a rectangular shape, wherein the rectangular shape includes a first side that extends in the first direction, a third side opposed to the first side, a second side that extends in the second direction, and a fourth side opposed to the second side, and wherein each pixel of the plurality of pixels includes a first electrode on an opposed surface of the first substrate, wherein the first substrate is opposed to the second substrate, a first alignment film that covers the first electrode and the opposed surface of the first substrate, a second electrode on an opposed surface of the second substrate, a second alignment film that covers the second electrode and the opposed surface of the second substrate, and a liquid-crystal layer between the first alignment film and the second alignment film, wherein the liquid-crystal layer contains liquid-crystal molecules, wherein each pixel of the plurality of pixels further includes:

a slit region in the first electrode, a concave and convex portion in a first region of the first electrode, wherein the first region excludes the slit region of the first electrode, and a control circuit configured to control application of a voltage on the first electrode, wherein the plurality of pixels in the first direction comprises a first pixel group and a second pixel group, wherein the first pixel group includes a plurality of odd-numbered pixels and the second pixel group includes a plurality of even-numbered pixels, wherein a vicinity of the first side of each pixel of the plurality of pixels in the first direction includes a first data line closer to the first substrate than the first electrode, wherein the first data line extends in the first direction for the application of a first voltage on the first electrode via the control circuit, wherein a vicinity of the third side of each pixel of the plurality of pixels in the first direction includes a second data line closer to the first substrate than the first electrode, wherein the second data line extends in the first direction for application of a second voltage on the first electrode via the control circuit, wherein the slit region is above the first data line and the second data line, wherein each pixel of the plurality of pixels that includes the first pixel group includes a second data line extension, wherein the second data line extension extends from the second data line that is provided adjacent to the first data line, and wherein each pixel of the plurality of pixels that includes the second pixel group includes a first data line extension, wherein the first data line extension extends from the first data line:

tilting the liquid-crystal molecules based on application of the first voltage on the first electrode from the first data line via the control circuit; and applying the second voltage on the second electrode; and fixing a tilt state of the liquid-crystal molecules in a state in which the application of the first voltage on the first electrode is suspended and a potential of the first electrode is retained at the first voltage.

* * * * *